US007921642B2

(12) United States Patent
Ino et al.

(10) Patent No.: US 7,921,642 B2
(45) Date of Patent: Apr. 12, 2011

(54) INERTIAL BODY DRIVE SYSTEM

(75) Inventors: Kazuyuki Ino, Sakuragawa (JP); Katsumi Ueno, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 285 days.

(21) Appl. No.: 12/092,202

(22) PCT Filed: Apr. 18, 2007

(86) PCT No.: PCT/JP2007/058891

§ 371 (c)(1), (2), (4) Date: Apr. 30, 2008

(87) PCT Pub. No.: WO2007/125933

PCT Pub. Date: Nov. 8, 2007

(65) Prior Publication Data

US 2009/0235658 A1 Sep. 24, 2009

(30) Foreign Application Priority Data

Apr. 27, 2006 (JP) ................................ 2006-123672

(51) Int. Cl.
*F16D 31/02* (2006.01)

(52) U.S. Cl. ........................................................ 60/468

(58) Field of Classification Search ..................... 60/468
See application file for complete search history.

(56) References Cited

U.S. PATENT DOCUMENTS

| | | | | |
|---|---|---|---|---|
| 4,520,625 A * | 6/1985 | Sato et al. | ...................... | 60/468 |
| 5,419,132 A * | 5/1995 | Sato et al. | ...................... | 60/468 |

FOREIGN PATENT DOCUMENTS

| | | |
|---|---|---|
| EP | 0603421 A1 | 6/1994 |
| JP | 5-27304 | 4/1993 |
| JP | 58-20704 | 4/1993 |
| JP | 5-321906 | 12/1993 |
| JP | 8-6722 | 1/1996 |
| JP | 9-310701 | 12/1997 |
| WO | 94/01682 | 1/1994 |

* cited by examiner

*Primary Examiner* — F. Daniel Lopez
(74) *Attorney, Agent, or Firm* — Mattingly & Malur, P.C.

(57) ABSTRACT

A pressure selector valve (13) is provided between a hydraulic motor (1) and a directional control valve (5) to connect one of the main conduits (4A), (4B) on a high pressure side to a high pressure conduit (14) while connecting the other of the main conduits on a low pressure side to a low pressure conduit (15). As an inertial body approaches a stop position, a spool valve (16) is switched to an open position (e), bringing a branch passage (14A) of the high pressure conduit (14) into communication with the low pressure conduit. When the pressure difference between the main conduits becomes small, the pressure selector valve is automatically returned to a neutral position to cut off communication between the main conduits, suppressing a reversing movement of the hydraulic motor so that an inertial body can be brought to a stop smoothly.

10 Claims, 28 Drawing Sheets

INERTIAL BODY DRIVE SYSTEM

TECHNICAL FIELD

This invention relates to an inertial body drive system which is suitable for use on a construction machine like a hydraulic excavator, and more particularly to an inertial body drive system which is adapted to suppress a reversing movement which occurs to an inertial body like an upper revolving structure of a hydraulic excavator upon stopping its rotational movement.

BACKGROUND ART

Generally, construction machines like hydraulic excavators have an upper revolving structure rotatably mounted on a vehicular lower structure, the upper revolving structure being put in swing motions under control of an inertial body drive system which is adapted to suppress a reversing movement which occurs to the upper revolving structure upon stopping a swing motion (e.g., see WO 94/01682 or Japanese Patent Publication Gazette No. H8-6722).

The inertial body drive system of the prior art of this sort is provided with an anti-reversing spool valve and a pressurized oil supply means between first and second main conduits which are connected to a swing-drive hydraulic motor. As a braking pressure is dropped by opening and closing operations of an overload relief valve during an inertial rotation of an upper revolving structure of an excavator, the spool valve is temporarily opened by a pressurized oil (a pilot pressure) which is supplied from an oil reservoir chamber of the pressurized oil supply means.

As a consequence, the above-mentioned first and second main conduits are brought into communication with each other through the spool valve, a pressure difference between these two main conduits is abruptly diminished, bringing the swinging hydraulic motor to a stop and suppressing a reversing movement of the upper revolving structure which would normally occur upon stopping an inertial rotation.

In the above-mentioned prior art, an anti-reversing spool valve is directly connected between the first and second main conduits, and a throttle as a flow resisting means is provided in the way of a conduit which connect an oil reservoir chamber of the pressurizing oil supply means with a tank, thereby controlling the length of an open time period of the spool valve by way of a sectional flow passage area of the throttle.

The spool valve is provided with a valve spring which is adapted to bias a spool constantly toward a closed position. For this valve spring, a relatively weak spring is employed for the purpose of prolonging an open time period of the spool valve. In addition, a sectional flow passage area in the above-mentioned throttle is reduced for the purpose of elongation of an open time period of the spool valve.

However, when stopping a swing motion of an upper revolving structure in a cold district where operating oil is at a higher viscosity due to low ambient temperature, the flow rate of operating oil through the throttle drops to a smaller rate to elongate the open time period of the spool valve. Therefore, in a cold district, it takes an extra time for the spool valve to return from an opened position to a closed position at the time of stopping a swing motion of an upper revolving structure of a hydraulic excavator.

In this connection, the open time period of the spool valve is determined in relation with the inertial mass (inertial energy) of the upper revolving structure. Namely, there is a conspicuous difference in inertial mass between an upper revolving structure which is loaded with a large amount of soil in a bucket and an upper revolving structure which is barely loaded with soil (or which is loaded with no soil) in a bucket.

When the inertial mass of an upper revolving structure is relatively large, it is necessary to elongate the open time period of the above-mentioned spool valve to absorb energy of an inertial rotation to a sufficient degree for the purpose of suppressing a reversing movement of the upper revolving structure. However, if a sectional flow passage area of the above-mentioned throttle is reduced for elongation of the open time period of the spool valve, it will give rise to a following problem in case an upper revolving structure of an excavator is small in inertial mass.

Namely, when an upper revolving structure is small in inertial mass, the spool valve is kept open even after it has absorbed energy of an inertial rotation, as a result taking an unnecessarily long time in stopping the upper revolving structure and causing a delay of its stoppage.

DISCLOSURE OF THE INVENTION

In view of the above-discussed problems with the prior art, it is an object of the present invention to provide an inertial body drive system which is capable of bringing an inertial body like an upper revolving structure of a hydraulic excavator smoothly to a stop even when put in operation in a cold district, without causing a delay to stoppage of the inertial body.

It is another object of the present invention to provide an inertial body drive system which can bring an inertial body smoothly to a stop without a delay irrespective of the magnitude of inertial energy of the inertial body.

(1) In order to achieve the above-stated objectives, according to the present invention, there is provided an inertial body drive system comprising: a hydraulic pressure source; a hydraulic motor supplied with pressurized oil from the hydraulic pressure source to rotationally drive an inertial body; first and second main conduits connecting the hydraulic motor with the hydraulic pressure source; a directional control valve connected between the main conduits and adapted to open the supply of pressurized oil to the hydraulic motor from the hydraulic pressure source when switched from a neutral position to a changeover position and to stop the supply of pressurized oil to the hydraulic motor when returned to the neutral position; and overload relief valves connected between the main conduits at a position between the directional control valve and the hydraulic motor to limit a maximum pressure in the main conduits to a first preset pressure value.

The inertial body drive system according to the present invention is characterized in that the inertial body drive system comprises: a pressure selector means connected between the main conduits at a position between the directional control valve and the hydraulic motor to connect one of the main conduits on a high pressure side to a high pressure conduit while connecting the other main conduit on a low pressure side to a low pressure conduit when switched from a neutral position to a changeover position; a valve means connected between the high pressure conduit and the low pressure conduit and comprised of a spool to be put in sliding displacement between an open position and a closed position and said spool being constantly biased toward said closed position under a biasing action of a biasing member, and the spool being switched from the closed position to the open position against the biasing action of the biasing member upon pressurization of oil in an oil pressure chamber; a pressurized oil supply means comprised of an oil reservoir chamber in communication with the oil pressure chamber of the valve means and adapted to supply pressurized oil in the oil reservoir chamber to the oil pressure chamber of the valve means as soon as a pressure in the high pressure conduit drops below a second pressure value lower than a first pressure value preset by the overload relief valves; a passage connecting the oil reservoir chamber of the pressurized oil supply means and the oil pressure chamber of the valve means constantly to a low pressure reservoir; and a flow resisting means provided in the passage to throttle a flow of operating oil to be discharged toward the reservoir.

With the above arrangements according to the present invention, until an inertial body is stopped after starting the hydraulic motor, a pressure difference occurs between the first and second main conduits, and, according to this pressure difference, the pressure selector means operates to connect a high pressure conduit to one of main conduits which is on a high pressure side, while connecting a low pressure conduit to the other main conduit which is on a low pressure side. In this state, as the hydraulic motor starts to stop its inertial rotation, bringing the pressure in the high pressure conduit to a level below a second pressure value, pressurized oil can be supplied to the oil pressure chamber of the valve means from the oil reservoir chamber of the pressurized oil supply means. As a consequence, the spool of the valve means in a closed position is switched to an open position against the action of the biasing member, bringing the high pressure conduits and the low pressure conduits into communication with each other via the spool of the valve means. Therefore, the main conduit on a high pressure side is communicated with the main conduit on a low pressure side by way of the pressure selector means to minimize the pressure difference between the two main conduits.

Further, in this state, the spool of the valve means is biased toward the oil pressure chamber by the biasing member to discharge operating oil in the oil pressure chamber to the side of reservoir through a passage. At this time, the flow of operating oil through the passage is throttled by the flow resisting means thereby to prolong an open time period of the spool, holding the two main conduits in communication with each other over the prolonged open time period to minimize the pressure difference between the two main conduits in an assured manner.

As soon as a pressure difference between the two main conduits becomes small, the high pressure conduit and low pressure conduit of the pressure selector means are blocked against communication with the respective main conduits. Therefore, even if the spool is opened redundantly over a prolonged time period, communication between the main conduits is automatically blocked by the pressure selector means to suppress a reversing movement of the hydraulic motor.

Accordingly, when an inertial body like an upper revolving structure of a hydraulic excavator is stopped during an operation in a cold district in a place of low ambient temperature, for example, despite the redundantly prolonged open time period of the spool, communication between the two main conduits can be blocked by the pressure selector means as soon as a pressure difference between the two main conduits becomes small, bringing the inertial body to a stop without a delay of stoppage. Besides, by presetting the open time period of the spool on the basis of the maximum expected inertial mass of an inertial body (inertial energy) irrespective of ambient temperature or other environmental conditions, communication between the two main conduits can be blocked by way of the pressure selector means as soon as a pressure difference between the two main conduits becomes small. That is to say, an inertial body can be brought to a stop smoothly regardless of the scale of inertial mass of the inertial body and without a time delay.

(2) Further, according to the present invention, preferably the pressure selector means is constituted by a pressure selector valve adapted to be switched from a neutral position to one of changeover positions according to a pressure difference between the main conduits, the pressure selector valve blocking the high pressure conduit and the low pressure conduit against communication with the main conduits when returned to the neutral position.

With the arrangements just described, when the pressure selector valve is returned to a neutral position due to a small pressure difference between the first and second main conduits before stoppage of inertial rotation of the hydraulic motor, the high pressure conduit as well as the low pressure conduit can be blocked against communication with the main conduits. Therefore, even in case the open time period of the spool is prolonged to a redundant degree, communication between the two main conduits can be appropriately blocked by the pressure selector valve for suppression of a reversing movement of the hydraulic motor.

(3) Further, according to the present invention, preferably the hydraulic pressure source includes a tank holding a stock of operating oil, and a hydraulic pump operative to suck up operating oil from the tank and supply pressurized oil, and the reservoir is constituted by the tank.

With the arrangements just described, at least either the oil reservoir chamber of the pressurized oil supply means or the oil pressure chamber of the valve means can be connected to the oil storage tank through a passage, giving a higher degree of freedom in design.

(4) On the other hand, according to the present invention, of the passages connected to the reservoir, a passage which is located between the flow resisting means and the reservoir is connected to the low pressure conduit.

With the arrangement just described, for example, when operating oil in the oil pressure chamber of the valve means is discharged toward the reservoir by way of the flow resisting means, this operating oil can also be discharged to a main conduit on a low pressure side from the low pressure conduit. Operating oil can be replenished to the reservoir from a main conduit on a low pressure side via the low pressure conduit, permitting to arrange replenishing and discharging routes in a compact form.

(5) Further, according to the present invention, the pressurized oil supply means is composed of a casing forming an outer shell, a piston slidably received in the casing in such a way as to define the oil reservoir chamber by one axial end thereof and a spring chamber by the other axial end thereof, and a pressure setting spring provided in the spring chamber adapted to bias the piston toward the oil reservoir chamber with a spring force corresponding to the second pressure value, and the reservoir is constituted by the spring chamber.

With the arrangements just described, when a driving pressure or braking pressure of the hydraulic motor is increased beyond the second pressure value, and the pressure setting spring is pressed by the piston to undergo a flexural deformation (compressive deformation), operating oil can be sucked into the oil reservoir chamber at one end of the casing from the above-mentioned spring chamber. On the other hand, when the piston is pushed back by the action of the pressure setting spring, operating oil (pressurized oil) in the oil reservoir chamber can be slowly discharged to the spring chamber by way of the above-mentioned passage and flow resisting means. That is to say, there is no need any longer for connecting the spring chamber of the pressurized oil supply means to the tank by way of a drain pipe or the like. This means that the number of component parts including conduit pipes can be reduced from the standpoint of enhancing efficiency of an assembling work.

(6) Further, according to the present invention, preferably the piston of the pressurized oil supply means is internally provided with a spool sliding bore (78D or 118D) to slidably receive therein the spool of the valve means, defining the oil pressure chamber of the valve means in the spool sliding bore at one end of the spool to receive a supply of pressurized oil from the oil reservoir chamber.

In this case, by provision of a spool sliding bore within the piston of the pressurized oil supply means, the spool of the valve means can be located in a coaxial position internally of the piston of the pressurized oil supply means. Besides, in addition to and together with the piston, the spool and oil pressure chamber of the valve means can be incorporated into the casing of the pressurized oil supply means in a compact form. Thus, it becomes possible to downsize and reduce the weight of the drive system through simplification of the construction of the hydraulic circuitry as a whole.

(7) Further, according to the present invention, preferably a hydraulic pilot portion is provided between the casing and the piston of the pressurized oil supply means in communication with the high pressure conduit, the piston being put in a sliding displacement against the action of the pressure setting spring to suck operating oil into the oil reservoir chamber from the spring chamber, as soon as a pressure in excess of the second pressure value is supplied to the hydraulic pilot portion from the high pressure conduit.

Thus, as soon as a pressure in excess of the second pressure value, as defined by the pressure setting spring, is supplied to the hydraulic pilot portion from the side of the high pressure conduit, the piston is put in a sliding displacement against the action of the pressure setting spring to suck operating oil into the oil reservoir chamber from the spring chamber. In case the pressure in the hydraulic pilot portion drops below the second pressure value, the piston is pushed back by the action of the pressure setting spring to discharge operating oil in the oil reservoir chamber toward the spring chamber slowly through a passage and a flow resisting means.

(8) Further, according to the present invention, preferably the piston is in the form of a stepped tube having an annular stepped portion around an outer periphery thereof, and the hydraulic pilot portion is constituted by an annular pilot oil chamber formed in the casing in such a way as to circumvent the stepped portion of the piston radially from outside.

In this case, a pressure of pressurized oil, which is drawn into the pilot oil chamber from the side of the high pressure conduit, is applied to the stepped portion of the piston, putting the piston in a sliding displacement against the action of the above-mentioned pressure setting spring as soon as the pressure becomes higher than the second pressure value.

(9) On the other hand, according to the present invention, the flow resisting means is constituted by a pressure compensation type flow control valve provided in the way of the passage.

In this case, even if the viscosity of operating oil is varied under the influence of ambient temperature, the pressure compensation type flow control valve functions to suppress variations in duration which would otherwise occur to an open time period of the spool, preventing the spool from being opened over a redundantly prolonged time period.

(10) Furthermore, according to the present invention, a check valve is connected to the passage parallel with the flow resisting means, permitting a flow of operating oil in the direction toward the oil reservoir chamber from the side of the reservoir and blocking a reverse flow of operating oil.

In this case, the above-mentioned check valve is opened, for example, at the time of sucking operating oil into the oil reservoir chamber of the pressurized oil supply means from the reservoir, permitting operating oil to flow into the oil reservoir chamber smoothly from the side of the reservoir and sucking operating oil into the oil reservoir chamber quickly in a shortened time period. On the other hand, the check valve is closed, for example, at the time of discharging pressurized oil from the oil pressure chamber and oil reservoir chamber of the valve means toward the reservoir, prohibiting an oil flow through the check valve and permitting to discharge pressurized oil from the oil pressure chamber and oil reservoir chamber slowly toward the reservoir through the flow resisting means.

BEST MODE FOR CARRYING OUT THE INVENTION

Figure 1:
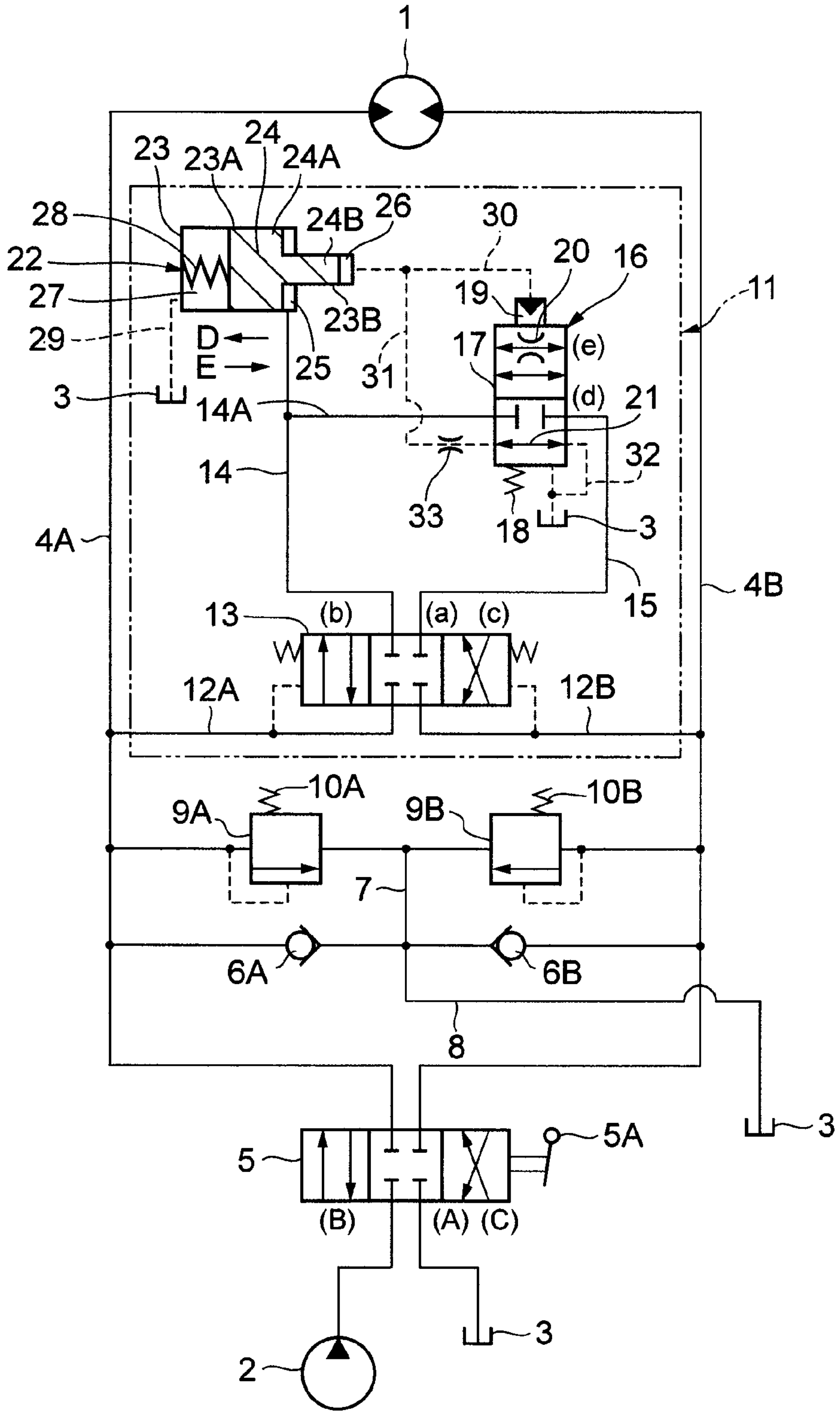
FIG. 1 is a hydraulic circuit diagram showing a swing-drive hydraulic motor of a hydraulic excavator and an inertial body anti-reversing valve applied to a first embodiment of the inertial body drive system according to the present invention.

Hereafter, the present invention is described more particularly by way of its preferred embodiment applying the inertial body drive system of the invention to a hydraulic revolving drive circuit of a hydraulic excavator, with reference to FIGS. 1 through 28 of the accompanying drawings.

Referring first to FIGS. 1 through 7, there is shown a first embodiment of the inertial body drive system according to the present invention.

In these figures, indicated at 1 is a hydraulic motor for revolving drive. By way of two main conduits 4A and 4B which will be described later on, this hydraulic motor 1 is connected to a hydraulic pump 2 and a tank 3 of a pressure source. The hydraulic motor 1 is rotationally driven by pressurized oil which is supplied to and discharged from the hydraulic pump 2, thereby driving an inertial body like an upper revolving structure of a hydraulic excavator into swinging motions on a vehicular lower structure (not shown) of the excavator.

Indicated at 4A and 4B are first and second main conduits which connect the hydraulic motor 1 with the hydraulic pump 2 and a tank 3, respectively. Indicated at 5 is a directional control valve which is provided in the way of the main conduits 4A and 4B. This directional control valve 5 is manually switched by an operator by use of a operating lever 5A from a neutral position (A) to either one of right and left changeover positions (B) and (C).

In this instance, the directional control valve 5 is switched to the changeover position (B) or (C) to change the direction of pressurized oil supply from the hydraulic pump 2 to the hydraulic motor 1. The supply and discharge of pressurized oil against the hydraulic motor 1 is stopped as soon as the directional control valve 5 is returned to the neutral position (A).

Denoted at 6A and 6B are a pair of charging check valves (hereinafter referred to simply as "check valves 6A and 6B") which are connected between the main conduits 4A and 4B at a position between the hydraulic motor 1 and the directional control valve 5. The check valves 6A and 6B are connected to a tank 3 through an auxiliary conduit 7 and a tank conduit 8. When a pressure in the main conduit 4A or 4B drops to a negative level during inertial rotation of the hydraulic motor 1, operating oil is supplied from the tank 3 to the main conduit 4A or 4B through the check valve 6A or 6B.

Indicated at 9A and 9B are a pair of overload relief valves which are provided respectively in the way of the main conduits 4A and 4B, at a position between the hydraulic motor 1 and the directional control valve 5. These overload relief valves 9A and 9B are connected to the tank 3 through the auxiliary conduit 7 and to the inlet ports of the check valves 6A and 6B, respectively.

Figure 7:
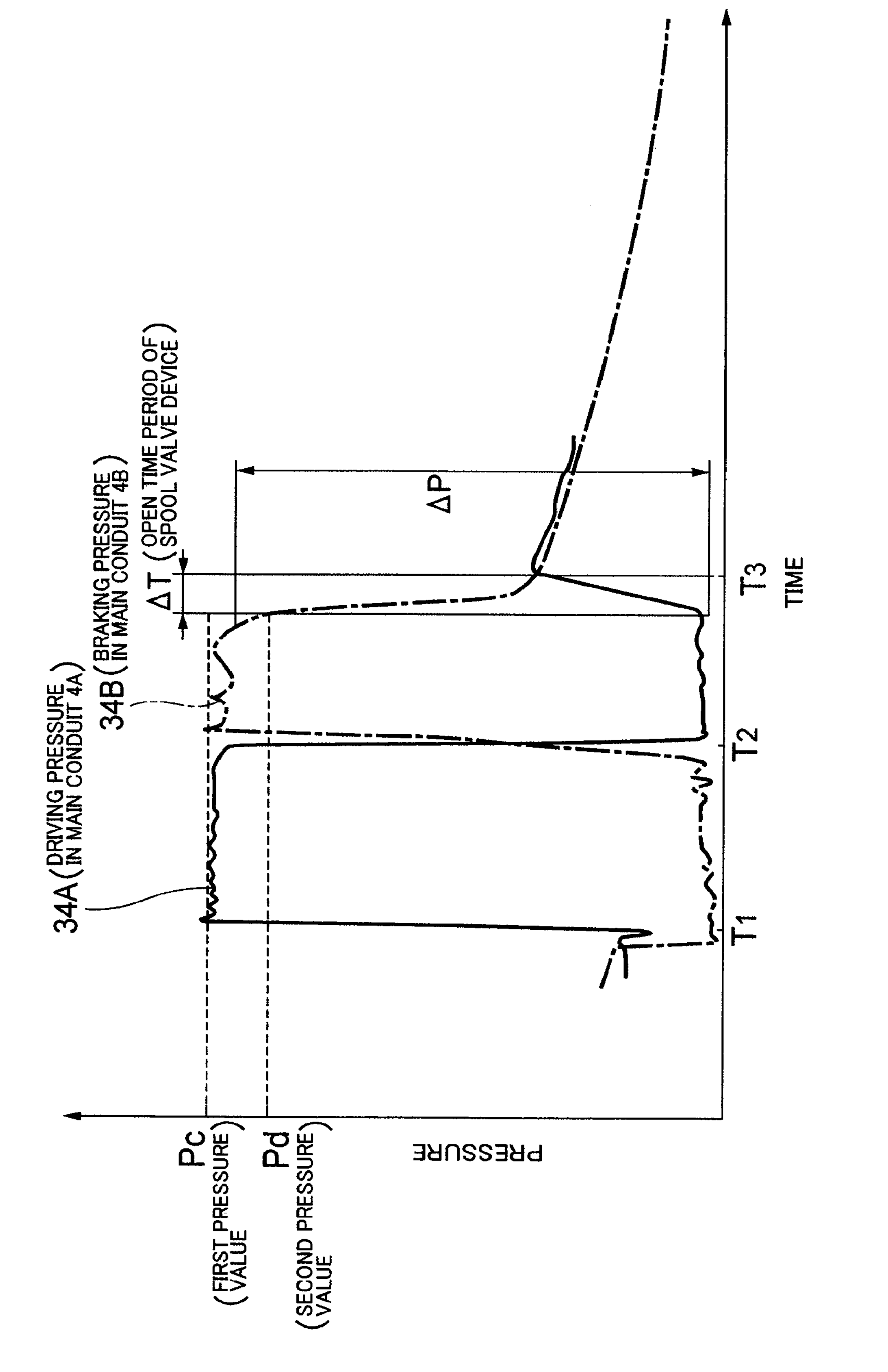
FIG. 7 is a diagram showing pressure characteristics curves of motor driving pressure and braking pressure which occur in a pair of main conduits.

In this instance, a preset relief pressure (a valve opening pressure) of the overload relief valves 9A and 9B is set as a first preset pressure value Pc which is determined by a spring 10A or 10B (see FIG. 7). Namely, the overload relief valve 9A (9B) is opened as soon as an overpressure in excess of the pressure value Pc is developed in the main conduit 4A (4B) during inertial rotation of a hydraulic motor 1. Upon opening the overload relief valve 9A (9B), an overpressure is relieved to the other main conduit 4B (4A) through a check valve 6B (6A) to limit a maximum pressure in the main conduits 4A and 4B to a level below the pressure value Pc.

Indicated at 11 is an inertial body anti-reversing valve which is adopted in the present embodiment. The inertial body anti-reversing valve 11 is composed of a pressure selector valve 13 serving as a pressure selector means, a spool valve device 16 serving as a valve means, and a cylinder device 22 serving as a pressurized oil supply means, which will be described respectively in greater detail hereinafter. The inertial body anti-reversing valve 11 is built in a housing (not shown) of the hydraulic motor 1 together with the check valves 6A and 6B and the overload relief valves 9A and 9B.

Indicated at 12A and 12B are a pair of bypass conduits which are branched off the main conduits 4A and 4B at a position between the hydraulic motor 1 and the directional control valve 5, one side bypass conduit (12A) of the bypass conduits 12A and 12B connecting the main conduit 4A to a port of a pressure selector valve 13 which will be described later on. The other side bypass conduit 12B connects the main conduit 4B to another port of the pressure selector valve 13.

Denoted at 13 is a pressure selector valve which is provided as a pressure selector means. More particularly, the pressure selector valve 13 is provided between the hydraulic motor 1 and directional control valve 5 and constituted by a hydraulically piloted directional control valve. The pressure selector valve 13 is connected between the main conduits 4A and 4B through the bypass conduits 12A and 12B. In this instance, normally the pressure selector valve 13 is in a neutral position (a), and is switched to one of left and right changeover positions (b) and (c) according to a pressure difference between the bypass conduits 12A and 12B which are in communication with the main conduits 4A and 4B, respectively.

When the pressure selector valve 13 is switched to either one of the changeover positions (b) and (c), a main conduit which is on a high pressure side is connected to a high pressure conduit 14, while a main conduit which is on a low pressure side is connected to a low pressure conduit 15. As a pressure difference between the main conduits 4A and 4B, that is to say, a pressure difference between the bypass conduits 12A and 12B becomes small, the pressure selector valve 13 is returned to the neutral position (a) to block communication of the high pressure conduit 14 and the low pressure conduit 15 with the bypass conduits 12A and 12B (i.e., with the main conduits 4A and 4B).

Figure 2:
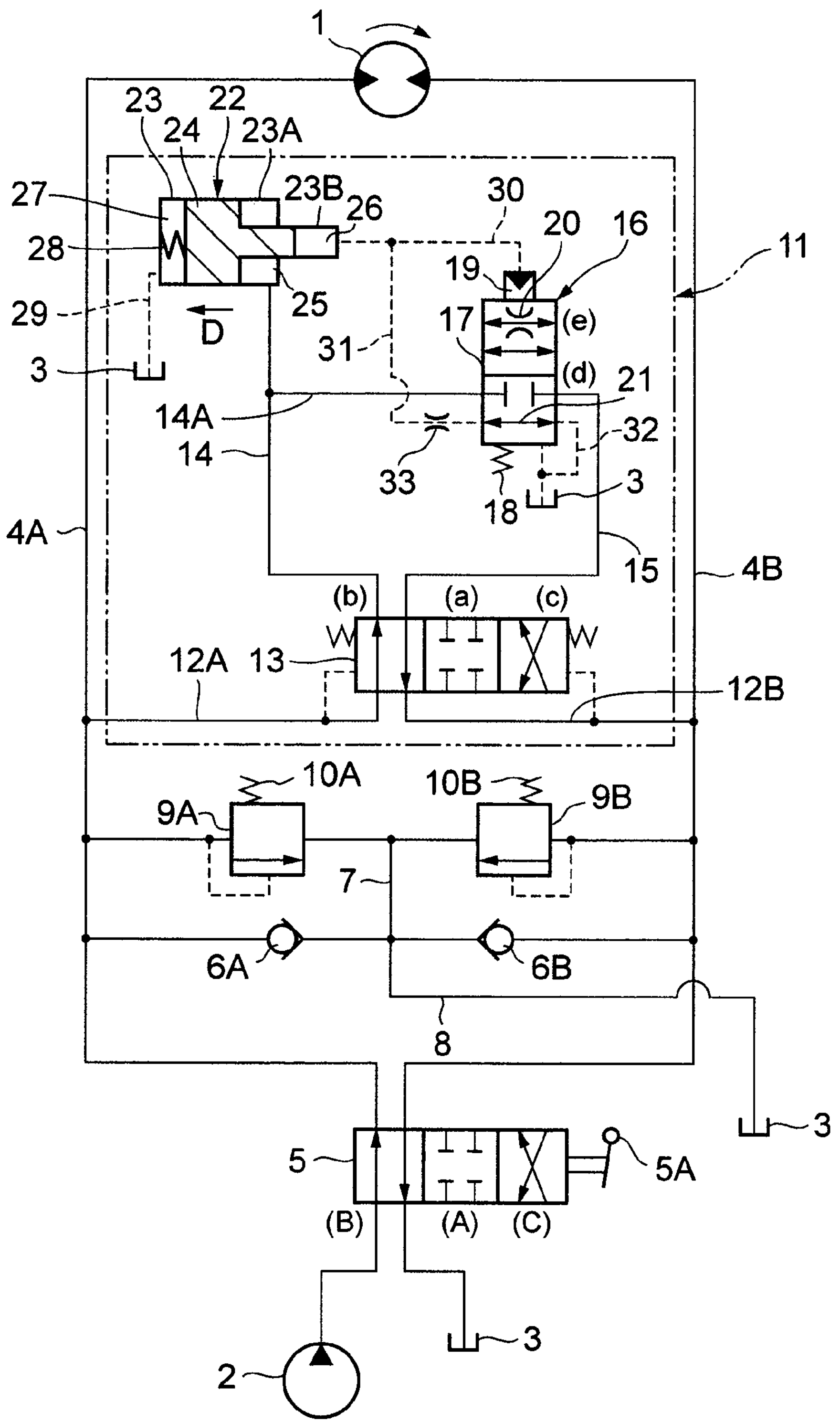
FIG. 2 is a hydraulic circuit diagram showing an operational phase in which a directional control valve is switched to a changeover position from a neutral position.
Figure 3:
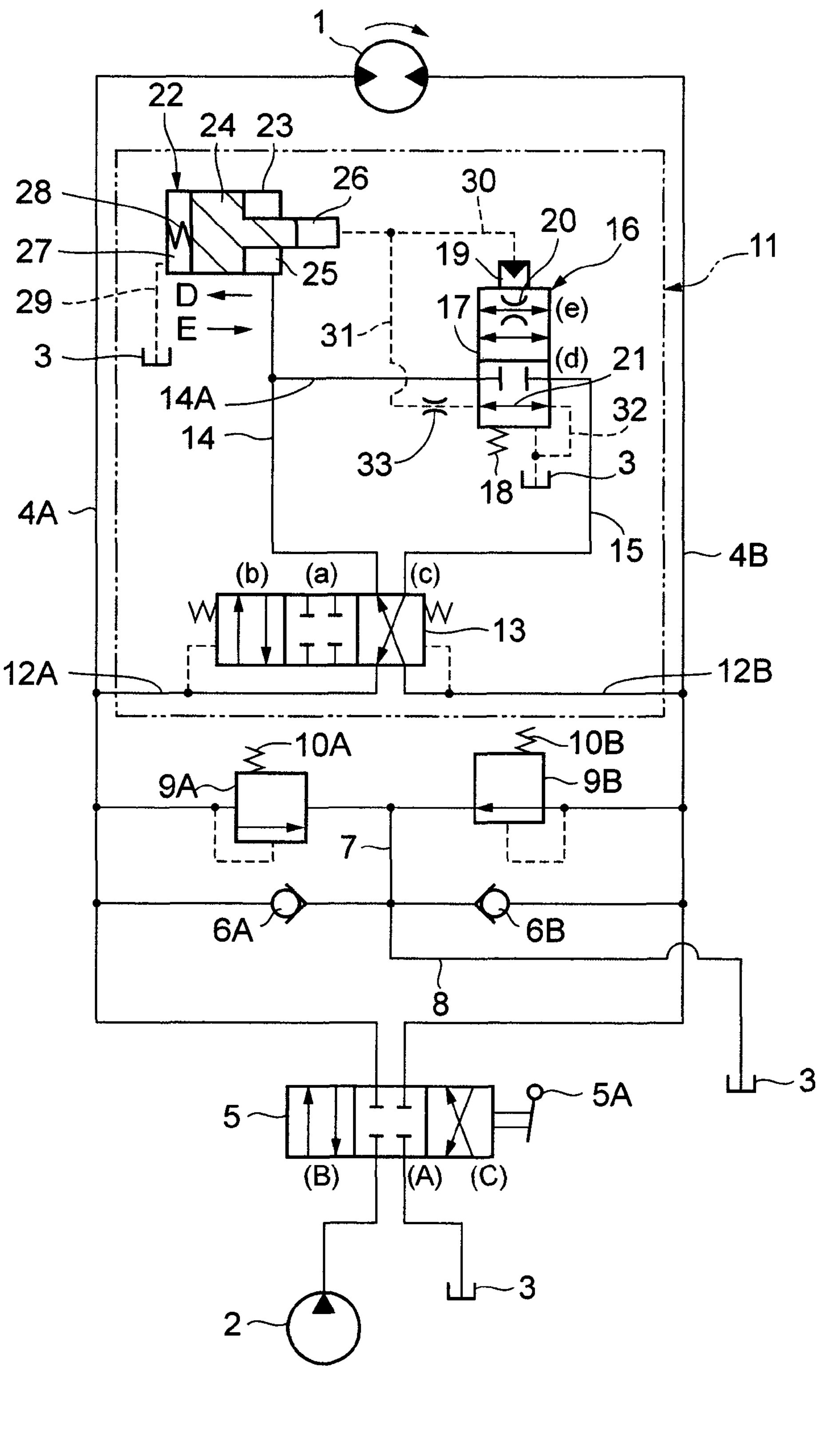
FIG. 3 is a hydraulic circuit diagram showing an operational phase in which the directional control valve is returned to the neutral position, putting the hydraulic motor in inertial rotation.

Indicated at 14 is a high pressure conduit which is connectable to a main conduit which is on a high pressure side, through the pressure selector valve 13. As shown in FIG. 1, the high pressure conduit 14 is connected at one end to the pressure selector valve 13 and at the other end to a pilot oil chamber 25 of a cylinder device 22 which will be described hereinafter. When the pressure selector valve 13 is switched to one of the changeover positions (b) and (c) as shown in FIGS. 2 and 3, the high pressure conduit 14 is connected to either one of the main conduits 4A and 4B (i.e., to either one of the bypass conduits 12A and 12B) whichever is on a high pressure side. As a consequence, pressurized oil is drawn into the high pressure conduit 14 from either the main conduit 4A or 4B which is on a high pressure side.

On the other hand, when the pressure selector valve 13 is returned to the neutral position (a) as shown in FIG. 1, the high pressure conduit 14 is blocked against communication with neither one of the bypass conduits 12A and 12B, that is to say, with neither one of the main conduits 4A and 4B. At this time, the high pressure conduit 14 is retained out of communication with the low pressure conduit 15, which will be described hereinafter. Provided in the way of the high pressure conduit 14 is a branch passage 14A to be brought into and out of communication with the low pressure conduit 15 through a spool valve device 16, which will be described later on.

Indicated at 15 is a low pressure conduit which is connectable to a main conduit which is on a low pressure side, through the pressure selector valve 13. This low pressure conduit 15 is provided between the pressure selector valve 13 and a spool valve device 16 which will be described hereinafter. When the pressure selector valve 13 is switched to either one of the changeover positions (b) and (c) as shown in FIGS. 2 and 3, the low pressure conduit 15 is communicated with either one of the main conduits 4A and 4B (with either one of the bypass conduits 12A and 12B) which is on a low pressure side. As a consequence, the low pressure conduit 15 is retained at a low pressure level akin to a tank pressure.

Figure 4:
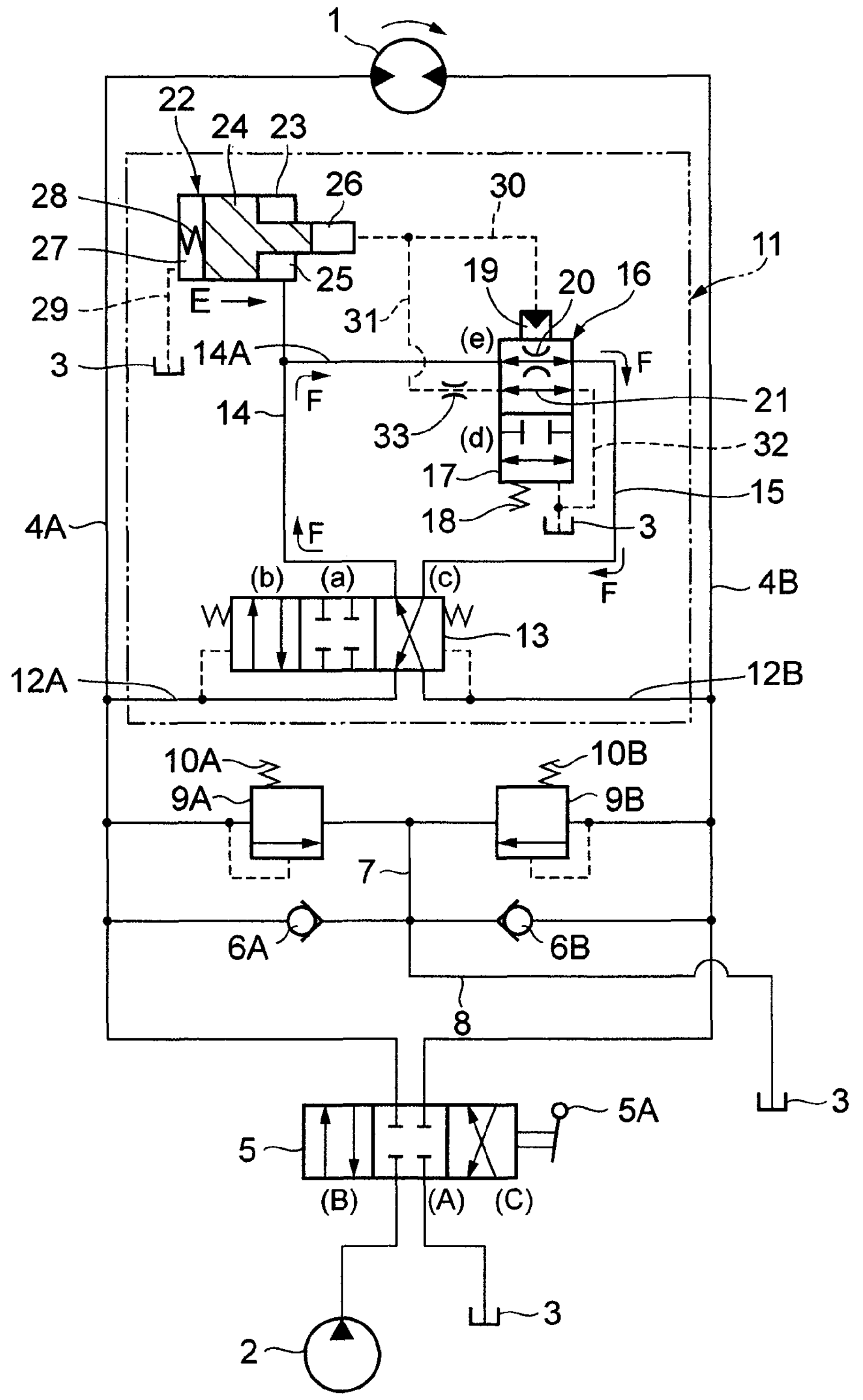
FIG. 4 is a hydraulic circuit diagram showing an operational phase in which a spool valve device of the inertial body anti-reversing valve is switched from a closed position to an open position to stop the inertial rotation.
Figure 5:
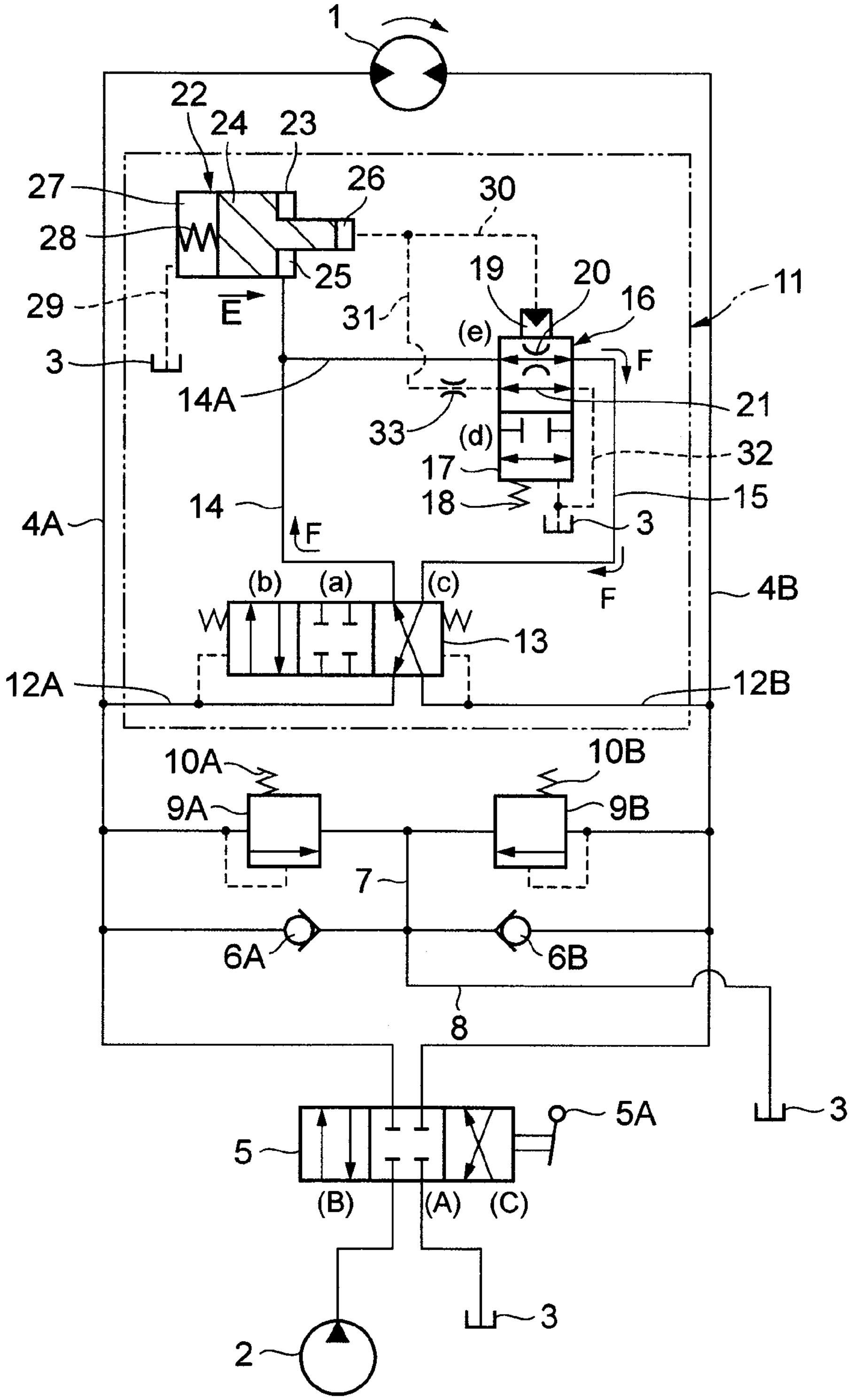
FIG. 5 is a hydraulic circuit diagram showing an operational phase in which operating oil is discharged further from an oil reservoir chamber of FIG. 4.

Namely, when a spool valve device 16, which will be described hereinafter, is switched to an open position (e) as shown in FIGS. 4 and 5, the low pressure conduit 15 permits pressurized oil in the high pressure conduit 14 to flow toward the low pressure conduit 15 and a main conduit on a low pressure side (e.g., toward the main conduit 4A). As soon as the pressure selector valve 13 is returned to the neutral position (a) as shown in FIG. 1, the low pressure conduit 15 is retained out of communication with both of the bypass conduits 12A and 12B (with both of the main conduits 4A and 4B) and with the high pressure conduit 14 as well.

Denoted at 16 is a spool valve device which is provided as a valve means between the branch passage 14A from the high pressure conduit 14 and the low pressure conduit 15. For example, this spool valve device 16 is constituted by a spool type 4-port 2-position changeover valve, and built in a housing (not shown) of the hydraulic motor 1, together with the check valves 6A and 6B, the overload relief valves 9A and 9B and the cylinder device 22, which will be described hereinafter.

In this instance, the spool valve device 16 is composed of a spool 17 provided between the branch passage 14A of the high pressure conduit 14 and the low pressure conduit 15 and put in sliding displacements between a closed position (d) and an open position (e) to establish or block communication between the high and low pressure conduits 14 and 15, a valve spring 18 as a biasing member adapted to bias the spool 17 constantly toward the closed position (d), and an oil pressure chamber 19 serving to apply a pressure on the spool 17 for a sliding displacement from the closed position (d) to the open position (e) against the valve spring 18.

Through a communication passage 30, the oil pressure chamber 19 of the spool valve device 16 is connected to an oil reservoir chamber 26 which will be described later on. Pressurized oil is supplied to or discharged from the oil reservoir chamber 26 to the oil pressure chamber 19. Therefore, the spool 17 is put in a sliding displacement between the closed position (d) and the open position (e).

The spool valve device 16 is further provided with a throttle passage 20 for throttling a flow of pressurized oil (operating oil) by communicating the branch passage 14A of the high pressure conduit 14 with the low pressure conduit 15 when the spool 17 is displaced from the closed position (d) to the open position (e), along with a communication passage 21 for constantly communicating the tank passage 32 with an intake/discharge passage 31, which will be described hereinafter.

Indicated at 22 is a cylinder device as a pressurized oil supply means to supply and discharge pressurized oil to the oil pressure chamber 19 of the spool valve device 16. This cylinder device 22 is constituted by a stepped cylinder 23 forming an outer shell (casing) of the cylinder device 22 and having a large diameter cylinder portion 23A and a small diameter cylinder portion 23B, a stepped piston 24 having a large diameter portion 24A and a small diameter portion 24B slidably fitted in the large and small diameter cylinder portions 23A and 23B of the stepped cylinder 23, respectively, a pilot oil chamber 25, oil reservoir chamber 26, a spring chamber 27 and a pressure setting spring 28, which will be described hereinafter.

Indicated at 25 is a pilot oil chamber serving as a hydraulic pilot portion of the pressurized oil supply means. This pilot oil chamber 25 is defined as an annular oil chamber between the large diameter cylinder portion 23A of the stepped cylinder 23 and the large diameter portion 24A of the piston 24. In this instance, the pilot oil chamber 25 is constantly connected to the high pressure conduit 14. As described in greater detail hereinafter, by a pressurized oil (a pilot pressure) which is supplied to the pilot oil chamber 25 from the high pressure conduit 14, the piston 24 is pushed and put in a sliding displacement in the stepped cylinder 23 against the action of the pressure setting spring 28, which will be described later on.

Designated at 26 is an oil reservoir chamber which is formed between the small diameter cylinder portion 23B of the stepped cylinder 23 and the small diameter portion 24B of the piston 24. As the piston 24 is put in a sliding displacement within the stepped cylinder 23, operating oil is sucked into the oil reservoir chamber 26 or pressurized oil is supplied from the oil reservoir chamber 26 to the oil pressure chamber 19 of the spool valve device 16. Namely, the oil reservoir chamber 26 has a volumetric capacity (the amount of the accumulating oil) varying in proportion with the extent of sliding displacement of the piston 24.

Indicated at 27 is a spring chamber which is formed between the large diameter cylinder portion 23A of the stepped cylinder 23 and the large diameter portion 24A of the piston, and indicated at 28 is a pressure setting spring which is provided in the spring chamber 27. By the pressure setting spring 28, the piston 24 is constantly biased toward the pilot oil chamber 25. The spring chamber 27 is connected to the tank 3 through a drain conduit 29 and filled with low pressure operating oil.

In this instance, the pressure setting spring 28 is arranged to have a spring force corresponding to a second preset pressure value Pd which is, for example, approximately 75% to 85% of the afore-mentioned first pressure value Pc at which the overload relief valves 9A and 9B are opened. That is to say, the pressure setting spring 28 is resiliently deformed when a pilot pressure, which is supplied to the pilot oil chamber 25 through the high pressure conduit 14, exceeds the second pressure value Pd of FIG. 7 (e.g., $Pd \approx 0.80 \times Pc$), to permit a sliding displacement of the piston 24 toward the spring chamber 27.

As shown in FIG. 2, when the piston 24 is put in a sliding displacement toward the spring chamber 27, the cylinder device 22 sucks operating oil into the oil reservoir chamber 26 from the tank 3 through the communication passage 30, the intake/discharge passage 31 and tank passage 32, which will be described hereinafter, storing a relatively large amount of operating oil in the oil reservoir chamber 26.

As soon as the pilot pressure in the pilot oil chamber 25 drops below the second pressure value Pd, the piston 24 is pushed and put in a sliding displacement toward the oil reservoir chamber 26 by the action of the pressure setting spring 28. As a result, operating oil in the oil reservoir chamber 26 is pressurized by the small diameter portion 24B of the piston 24 to supply pressurized oil to the oil pressure chamber 19 of the spool valve device 16 through a communication passage 30 which will be described hereinafter.

At this time, part of pressurized oil (operating oil) which is supplied to the communication passage 30 is discharged to the tank 3 through the intake/discharge passage 31 and tank passage 32. However, the flow of operating oil in this route is limited by the throttle 33, which will be described hereinafter. Therefore, a major part of pressurized oil in the oil reservoir chamber 26 is supplied to the oil pressure chamber 19 of the spool valve device 16.

By the supply of pressurized oil to the oil pressure chamber 19, a pressure is applied to an end face of the spool 17, putting the spool 17 in a sliding displacement against the action of the valve spring 18. As a result, the spool valve device 16 is switched from a closed position (d) to an open position (e) as shown in FIG. 4, bringing the high and low pressure conduits 14 and 15 into communication with each other through the throttle passage 20.

Indicated at 30 is a communication passage which is provided between the oil pressure chamber 19 of the spool valve device 16 and the oil reservoir chamber 26 of the cylinder device 22, holding the oil reservoir chamber 26 constantly in communication with the oil pressure chamber 19. Oil pressure in the communication passage 30 and oil pressure chamber 19 is varied according to pressure variations in the oil reservoir chamber 26 to put the spool 17 of the spool valve device 16 in a displacement to either the closed position (d) or the open position (e).

Denoted at 31 is an intake/discharge passage which is branched off the portion in the way of the communication passage 30. This intake/discharge passage 31 is connected to the tank passage 32 through the communication passage 21 of the spool valve device 16. Further, the tank passage 32 is connected to the tank 3 which serves as a reservoir. Operating oil in the tank 3 is fed to and discharged from the oil reservoir chamber 26 of the cylinder device 22 through the tank passage 32, communication passage 21 and intake/discharge passage 31.

Indicated at 33 is a throttle which is provided in the way of the intake/discharge passage 31 as a flow resisting means. This throttle 33 limits the flow rate of oil by its throttling action, for example, throttling a flow of oil from the oil pressure chamber 19 to the tank 3 via the intake/discharge passage 31, communication passage 21 and tank passage 32. Thus, the throttle 33 serves to prolong the time length which is taken by the spool 17 of the spool valve device 16 in returning to the closed position (d) from the open position (e).

Therefore, as shown in FIGS. 4 and 5, a delay occurs to the spool valve device 16 in returning from the open position (e) to the closed position (d). Namely, an open time period of the spool valve device 16 is prolonged by $\Delta T$ as exemplified in FIG. 7 ($\Delta T$=0.2-0.4 sec.). Over this open time period $\Delta T$, the main conduits 4A and 4B are held in communication with each other through the pressure selector valve 13, high pressure conduit 14, throttle passage 20 of the spool valve device 16 and low pressure conduit 15.

Characteristics curves 34A and 34B which are exemplified in FIG. 7 are pressure variations in the main conduits 4A and 4B, respectively. Namely, the characteristics curve 34A indicates pressure characteristics in the main conduit 4A by a solid line, while the characteristics curve 34B indicates pressure characteristics in the main conduit 4B by a one-dot chain line. By switching the position of the directional control valve 5 in the manner as described hereinafter, a motor driving pressure is generated in the main conduit 4A along the characteristics curve 34A during a time period of T1-T2 of FIG. 7, and, after the time point T2, for example, a braking pressure is generated in the main conduit 4B along the characteristics curve 34B.

With the arrangements as described above, the hydraulic swing-drive circuit of the present embodiment gives the following performances in operation when applied to a hydraulic excavator.

(1) Firstly, describing the operational actions taking place in driving hydraulic motor 1.

As soon as the directional control valve 5 in the neutral position (A) is switched to the changeover position (B) as shown in FIG. 2 (e.g., see time point T1 in FIG. 7), pressurized oil (motor driving pressure) from the hydraulic pump 2 is fed to the hydraulic motor 1 through the main conduit 4A. By the supplied pressurized oil, the hydraulic motor 1 drives an upper revolving structure as an inertial body into a swinging motion in a rightward direction, for example. At this time, return oil from the hydraulic motor 1 is discharged into the tank 3 through the main conduit 4B.

Therefore, by switching the position of the directional control valve 5, the pressures in the main conduits 4A and 4B are varied largely after the time point T1 as indicated by the characteristics curves 34A and 34B in FIG. 7. In the main conduit 4A on a high pressure side, a motor driving pressure is generated between the time points T1 and T2 along the characteristics curve 34A in FIG. 7, and, in the main conduit 4B on a low pressure side, a low pressure level is maintained between the time points T1 and T2 as indicated by the characteristics curve 34B of one-dot chain line.

Further, at this time, by a pressure difference between the main conduits 4A and 4B, namely, by a pressure difference between the bypass conduits 12A and 12B, the pressure selector valve 13 is switched to a changeover position (b) from a neutral position (a). As a result, as shown in FIG. 2, the high pressure conduit 14 is communicated with the main conduit 4A on a high pressure side through the bypass conduit 12A, while the low pressure conduit 15 is communicated with the main conduit 4B on a low pressure side through the bypass conduit 12B. Thus, pressurized oil (part of motor driving pressure) is drawn into the high pressure conduit 14 from the main conduit 4A on a high pressure side, and this pressurized oil is supplied to the pilot oil chamber 25 of the cylinder device 22 as a pilot pressure.

As a consequence, within the stepped cylinder 23 of the cylinder device 22, the piston 24 is put in a sliding displacement in the direction of arrow D of FIG. 2 against the action of the pressure setting spring 28. In step with the sliding displacement of the piston 24, the volumetric capacity of the oil reservoir chamber 26 of the cylinder device 22 is increased, and pressurized oil in the tank 3 is sucked into the oil reservoir chamber 26 from the tank 3, for example, through the tank passage 32, communication passage 21, intake/discharge passage 31 and throttle 33.

That is to say, the oil reservoir chamber 26 is fully filled with oil from the tank 3. However, the spool 17 of the spool valve device 16 is retained in the closed position (d) by the biasing action of the valve spring 18, blocking communication between the branch passage 14A of the high pressure conduit 14 and the low pressure conduit 15.

(2) Describing the operational actions taking place during inertial rotation of hydraulic motor 1.

In the operating conditions as described above, as soon as the directional control valve 5 is returned to the neutral position (A) from the changeover position (B) of FIG. 3 to stop movement of an upper revolving structure (see the time point T2 in FIG. 7), the directional control valve is now in a position to block the supply of pressurized oil from the hydraulic pump 2 to the hydraulic motor 1 via the main conduit 4A. As a consequence, the pressure in the main conduit 4A is abruptly dropped at the time point T2 and onward as indicated by the characteristics curve 34A shown in FIG. 7, to turn off the driving force of the hydraulic motor 1 which has been applied the upper revolving structure.

However, under the influence of the inertial force of the upper revolving structure, the hydraulic motor 1 is put in inertial rotation, and pressurized oil in the main conduit 4A is discharged to the side of the main conduit 4B by a pumping action of the hydraulic motor 1. As soon as the pressure in the main conduit 4A is reduced to a negative level as a result of the inertial rotation of the hydraulic motor 1, operating oil in the tank 3 is supplied toward the main conduit 4A through the tank conduit 8 and check valve 6A.

By a large amount of pressurized oil which is trapped in the main conduit 4B between the hydraulic motor 1 and the directional control valve 5, a braking pressure is generated in the main conduit 4B, acting to stop the inertial rotation of the hydraulic motor 1. After the time point T2 in FIG. 7, if this braking pressure exceeds the opening pressure (the first pressure value Pc) of the overload relief valve 9B as indicated by the characteristics curve 34B of one-dot chain line, the overload relief valve 9B is opened against the biasing action of the spring 10B. As soon as the overload relief valve 9B is opened, the braking pressure in the main conduit 4B is relieved toward the main conduit 4A through the auxiliary conduit 7 and the check valve 6A.

At this time, by a pressure difference between the main conduits 4A and 4B, that is to say, by a pressure difference between the bypass conduits 12A and 12B, the pressure selector valve 13 is switched to the changeover position (c) shown in FIG. 3. As a result, the high pressure conduit 14 is brought into communication with the main conduit 4B which is now on a high pressure side because of the braking pressure, while the main conduit 4A which is now on a low pressure side is communicated with the low pressure conduit 15.

Since the pressure in the main conduit 4B has now increased close to the first pressure value Pc, pressurized oil in the main conduit 4B is supplied to the pilot oil chamber 25 of the cylinder device 22 through the bypass conduit 12B and high pressure conduit 14 to resiliently deform (compress) the pressure setting spring 28. Accordingly, the piston 24 of the cylinder device 22 is pushed in the direction of arrow D in the same way as described hereinbefore to take a large amount of pressurized oil continuously into the oil reservoir chamber 26, holding the spool valve device 16 in the closed position (d).

In this instance, the pressure selector valve 13 is switched from the changeover position (b) of FIG. 2 to the other changeover position (c) of FIG. 3 past the neutral position (a). At the moment when the pressure selector valve 13 is switched by selecting the braking pressure on the side of the main conduit 4B instead of the driving pressure on the side of the main conduit 4A, there may occur an instantaneous drop to the pilot pressure in supply to the pilot oil chamber 25, dropping below the preset pressure (the second pressure value Pd) of the pressure setting spring 28.

At that moment, a small amount of pressurized oil is supplied from the oil reservoir chamber 26 of the cylinder device 22 to the oil pressure chamber 19, causing the spool 17 of the spool valve device 16 to move slightly in a downward direction against the valve spring 18. However, the spool 17 is provided with a dead zone between the closed position (d) and the open position (e), so that the spool valve device 16 can prevent inadvertent communications between the branch passage 14A on the side of the high pressure conduit 14 and the low pressure conduit 15.

The inertial rotation of the hydraulic motor 1 is once stopped upon closing the overload relief valve 9B which has been opened to apply brakes to the inertial rotation of the hydraulic motor 1. At this time, as exemplified in FIG. 7, a pressure difference ΔP occurs between the main conduit 4A and the main conduit 4B which is now on a high pressure side, arousing a reversing movement of the hydraulic motor 1.

(3) Describing the operational actions and effects in stopping the hydraulic motor 1 without allowing repeated reversing movements.

However, when the hydraulic motor 1 is about to start a reversing movement, pressurized oil in the main conduit 4B, which is now on a high pressure side, is leaked through a gap or interstice in the hydraulic motor 1 (e.g., through an infinitesimally narrow gap between the cylinder block and piston of the hydraulic motor 1) and discharged into the tank 3 via the motor housing. As a result, the pressure in the main conduit 4B drops to a level which is approximately 75% to 85% of the pressure value Pc for the overload relief valve 9B.

As a consequence, the pilot pressure which is led into the pilot oil chamber 25 from the main conduit 4B through the high pressure conduit 14 dips to a level lower than the preset pressure of the pressure setting spring 28 (the second pressure value Pd), and the piston 24 of the cylinder device 22 is pushed by the action of the spring 28 toward the oil reservoir chamber 26 in the direction of arrow E in FIG. 3, pressurized oil in the oil reservoir chamber 26 and supplying same to the oil pressure chamber 19 of the spool valve device 16 through the communication passage 30.

At this time, part of pressurized oil is discharged into the tank 3 from the communication passage 30 through the intake/discharge passage 31 and communication passage 21 and tank passage 32. However, this flow of discharging oil is limited by the throttle 33 which is provided in the way of the intake/discharge passage 31. Therefore, a relatively high pressure remains in the communication passage 30 which is located upstream of the throttle 33, and this relatively high pressure is applied to the oil pressure chamber 19 of the spool valve device 16.

As a result, by the oil pressure supplied to the oil pressure chamber 19, the spool 17 is put in a sliding displacement against the valve spring 18 to switch its position from the closed position (d) to the open position (e) as shown in FIG. 4. Thus, the branch passage 14A on the side of the high pressure conduit 14 is brought into communication with the low pressure conduit 15 through the throttle passage 20 of the spool valve device 16.

At this time, by the valve spring 18, the spool 17 of the spool valve device 16 is biased toward the oil pressure chamber 19 to push the pressurized oil out of the oil pressure chamber 19 and to let the pressurized oil flow into the tank 3 through the communication passage 30, intake/discharge passage 31, communication passage 21 and tank passage 32. However, this flow of pressurized oil from the oil pressure chamber 19 to the tank 3 via the intake/discharge passage 31 and tank passage 32 is limited or suppressed by the throttling action of the throttle 33 which is provided in the way of the intake/discharge passage 31.

Therefore, the open time period of the spool valve device 16 until the return of the spool 17 from the open position (e) of FIGS. 4 and 5 to the closed position (d) of FIG. 1 can be prolonged by open time period ΔT (e.g., ΔT=0.2-0.4 sec.). That is to say, the main conduits 4A and 4B can be held in communication with each other over a relatively long time period through the pressure selector valve 13 in the changeover position (c), high pressure conduit 14, throttle passage 20 of the spool valve device 16 and low pressure conduit 15.

The spool valve device 16 which is in the open position (e) can now let a high pressure (a braking pressure) in the main conduit 4B and bypass conduit 12B escape in the direction of arrows F in FIGS. 4 and 5 toward the low pressure conduit 15, bypass conduit 12A and main conduit 4A by way of the high pressure conduit 14 and the throttle passage 20, under the throttling effects of the latter.

Thus, by way of the spool valve device 16, the pressure difference ΔP (see FIG. 7) generated between the main conduits 4A and 4B can be reduced through the throttle passage 20 and so forth. As soon as the pressure difference ΔP becomes small, the pressure selector valve 13 is returned to the neutral position (a) as described hereinafter, blocking communication between the main conduits 4A and 4B (between the bypass conduits 12A and 12B) to prevent repeated reversing movements of the hydraulic motor 1.

On the other hand, the spool 17 of the spool valve device 16 is gradually pushed toward the oil pressure chamber 19 by the action of the spring 18, and returned to the closed position (d) of FIG. 1 to block communication between the branch passage 14A of the high pressure conduit 14 and the low pressure conduit 15. When returned to the closed position (d), the spool valve device 16 can block communication between the main conduits 4A and 4B (between the bypass conduits 12A and 12B), holding the hydraulic motor 1 in a standstill state and preventing the spool valve device 16 from being inadvertently opened at the time of a next driving operation of the hydraulic motor 1.

(4) Describing the operational actions and effects when operating oil is at a higher viscosity under the influence of ambient temperature in a cold district.

By the way, in stopping a swing motion of an upper revolving structure in a cold district, it is necessary to take into consideration that operating oil is at a higher viscosity due to low temperature. That is to say, under the influence of ambient temperature, the flow rate of operating oil through the throttle 33 becomes lower, relatively prolonging the open time period ΔT of the spool valve device 16 in the open position (e) shown in FIGS. 4 and 5. Therefore, in a cold district, it may take an extra time in returning the spool 17 of the spool valve device 16 in the open position to the closed position at the time of stopping an upper revolving structure, causing a delay to the stoppage of the upper revolving structure.

To cope with this problem, according to the present embodiment, the pressure selector valve 13 is connected between the main conduits 4A and 4B through the bypass conduits 12A and 12B at a position between the hydraulic motor 1 and the directional control valve 5. This pressure selector valve 13 is switched to the right and left changeover position (b) or (c) from the neutral position (a) according to a pressure difference between the main conduits 4A and 4B, namely, a pressure difference between the bypass conduits 12A and 12B. The pressure selector valve 13 is so arranged as to connect the high and low pressure conduits 14 and 15 with the bypass conduits 12A and 12B when switched to the changeover position (b) or (c).

Namely, when the pressure selector valve 13 is switched to the changeover position (b) or (c), either one of the main conduits 4A and 4B which is on a high pressure side is brought into communication with the high pressure conduit 14, while the other main conduit on a low pressure side is brought into communication with the low pressure conduit 15. Further, as shown in FIGS. 1 to 5, the spool valve device 16 is so arranged as to open and block communication of the branch conduit 14A of the high pressure conduit 14 with the low pressure conduit 15. When the pressure selector valve 13 is returned to the neutral position (a), it blocks communication of the high and low pressure conduits 14 and 15 with the main conduits 4A and 4B.

Figure 6:
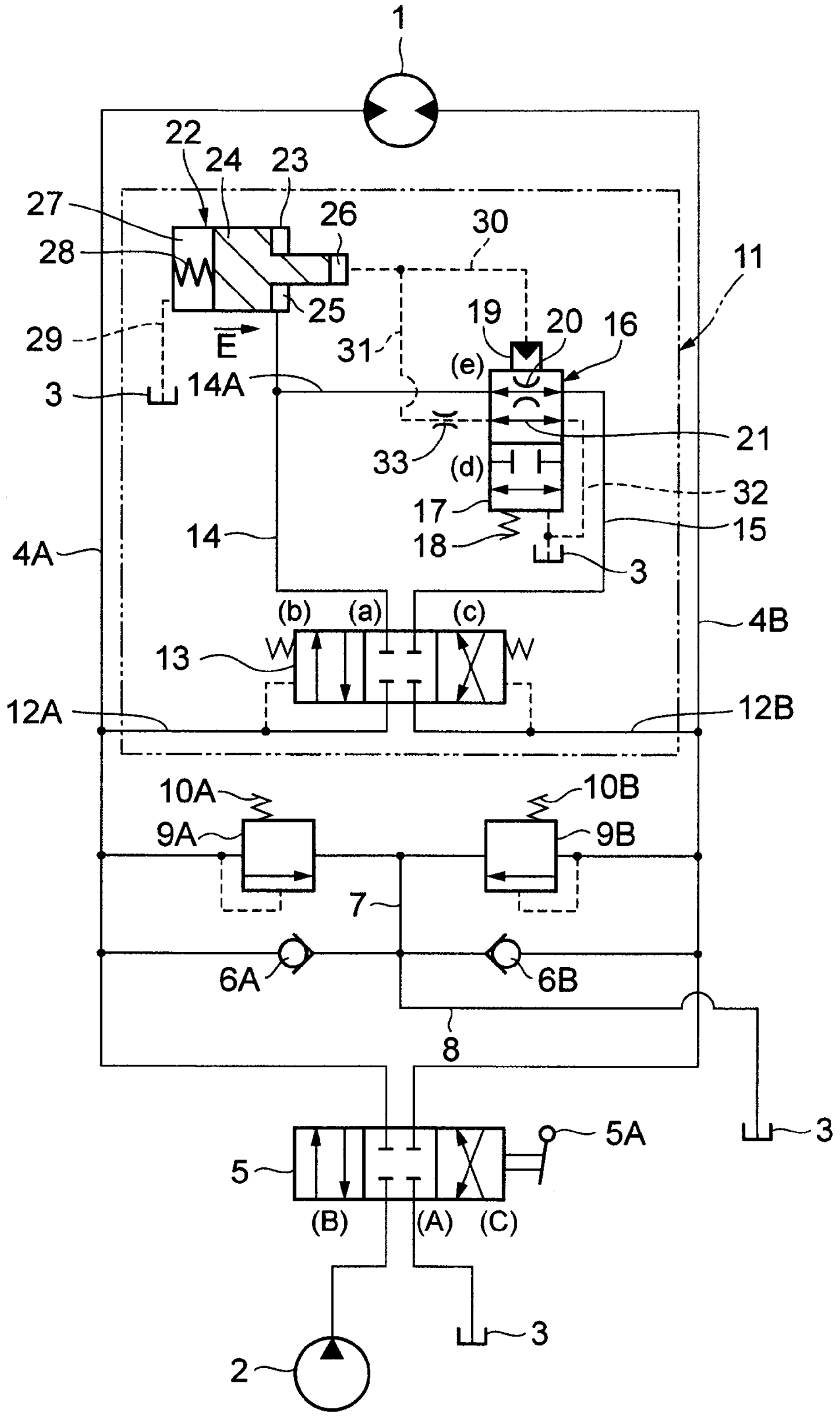
FIG. 6 is a hydraulic circuit diagram showing an operational phase in which the pressure selector valve in FIG. 5 is returned to a neutral position at the time of stopping the inertial rotation, blocking communication between the main conduits.

Therefore, for example, when stopping a movement of a driven inertial body like an upper revolving structure in a cold district, the open time period ΔT of the spool valve device 16 can be prolonged, permitting the spool valve device 16 to retain the open position (e) over an extended time period. On the other hand, in case the pressure difference between the two main conduits 4A and 4B becomes small, the pressure selector valve 13 is automatically returned to the neutral position (a) as shown in FIG. 6, although the spool valve device 16 is still in the open position (e). Thus, even when the spool valve device 16 is in the open position (e), communication between the main conduits 4A and 4B (between the bypass conduits 12A and 12B) can be forcibly blocked by the pressure selector valve 13.

In this manner, the pressure selector valve 13 is automatically returned to the neutral position (a) as shown in FIG. 6 as soon as the pressure difference between the main conduits 4A and 4B becomes small, even if the open time period ΔT of the spool valve device 16 is redundantly prolonged under the influence of ambient temperature, keeping the two main conduits 4A and 4B (the bypass conduits 12A and 12B) in communication with each other through the high pressure conduit 14, throttle passage 20 and low pressure conduit 15 as shown in FIG. 5. Thus, irrespective of movements of the spool valve device 16, communication between the main conduits 4A and 4B can be blocked by the means of the pressure selector valve 13.

The cutoff of communication between the main conduits 4A and 4B by the pressure selector valve 13 takes place, for example, after the time point T3 in FIG. 7, and pressures in the main conduits 4A and 4B gradually drop as indicated by characteristics curves of FIG. 7 due to pressure leaks in the hydraulic motor 1, suppressing a reversing motion of an upper revolving structure to bring same smoothly to a stop.

Thus, even if the open time period ΔT of the spool valve device 16 is redundantly prolonged under the influence of a low ambient temperature in a cold district, communication between the bypass conduits 12A and 12B, that is to say, communication between the main conduits 4A and 4B can be cut off by the use of the pressure selector valve 13 bringing an upper revolving structure to a stop smoothly without a time delay.

(5) Describing the operational actions and effects in coping with variations in inertial mass of upper revolving structure.

The open time period ΔT of the spool valve device 16 is determined on the basis of inertial mass (inertial energy) of an upper revolving structure, and there is a large difference in inertial mass between an upper revolving structure which is loaded with a large amount of soil in a bucket or the like and an upper revolving structure which is loaded with only a small amount of soil (or which is loaded with no soil) in a bucket.

However, irrespective of environmental conditions such as ambient temperature, the open time period of the spool valve device 16 is determined on the basis of maximum inertial mass, for example, by weakening the biasing force of the valve spring 18 or narrowing a flow passage diameter of the throttle 33 beforehand. By so doing, even if the spool valve device 16 is in the open position (e), communication between the main conduits 4A and 4B can be automatically cut off by the pressure selector valve 13 when a pressure difference between the two main conduits 4A and 4B becomes small.

Thus, even if the inertial mass of the upper revolving structure is varied largely depending upon the amount of load on a bucket, an upper revolving structure (an inertial body) can be stopped smoothly regardless of the value of inertial mass, preventing a time delay in stopping the upper revolving structure.

Figure 8:
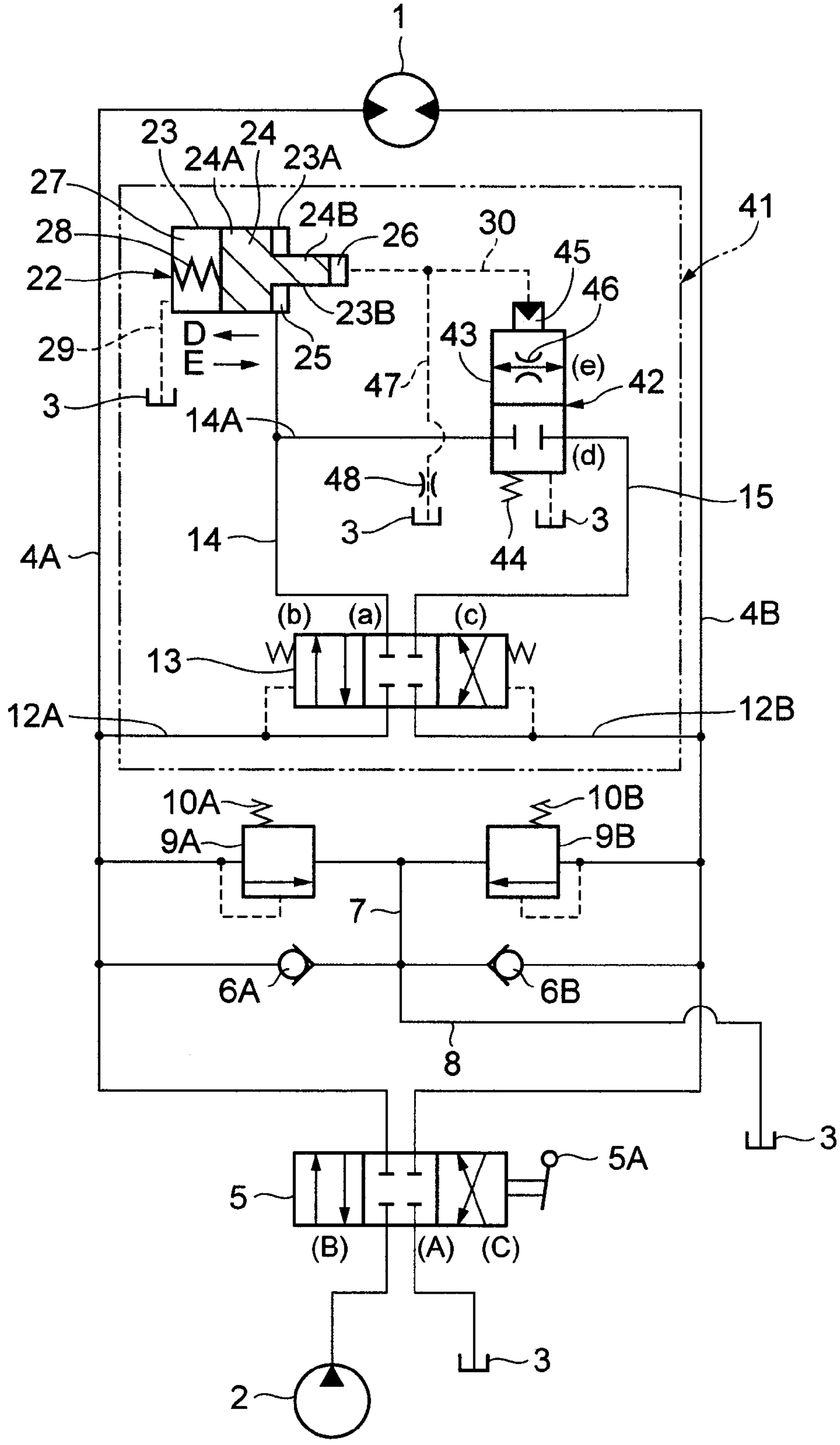
FIG. 8 is a hydraulic circuit diagram showing an inertial body anti-reversing valve adapted in a second embodiment of the invention.

Now, turning to FIG. 8, there is shown a second embodiment of the present invention. In the following description of the second embodiment, those component parts which are identical with the counterparts in the foregoing first embodiment are simply designated by the same reference numerals or characters to avoid repetitions of same explanations. The second embodiment has a feature in that the spool valve device 42 as a valve means composing a part of an inertial body anti-reversing valve 41 is constituted by a spool type 2-port 2-position changeover valve.

In this instance, the spool valve device 42 is arranged substantially in the same way as the spool valve device 16 in the first embodiment, including a spool 43, a valve spring 44 as a biasing member, an oil pressure chamber 45 and a throttle passage 46. The oil pressure chamber 45 of the spool valve device 42 is connected to the oil reservoir chamber 26 of the cylinder device 22 through a communication passage 30 to supply and discharge pressurized oil therebetween, putting the spool 43 of the spool valve device 42 in a sliding displacement between a closed position (d) and an open position (e).

An intake/discharge passage 47 for operating oil which is branched off the communication passage 30 is directly connected to the tank 3 at its fore end, without taking a route via the spool 43 of the spool valve device 42. A throttle 48 is provided in the way of the intake/discharge passage 47 to serve as a flow resisting means. The throttle 48 is arranged in the same way as the throttle 33 described in the first embodiment.

Being arranged in the manner as described above, this second embodiment of the invention can produce substantially the same operational effects as the first embodiment in bringing an upper revolving structure smoothly to a stop without a delay. However, in the present embodiment, the spool valve device 42 is arranged as a spool type 2-port 2-position changeover valve.

As mentioned above, the intake/discharge passage 47 is directly connected to the tank 3 at its fore end without intervened by the spool 43 of the spool valve device 42. Therefore, the spool valve device 42 and the intake/discharge passage 47 can be arranged in separate positions, permitting a higher degree of freedom in layout designing.

Figure 9:
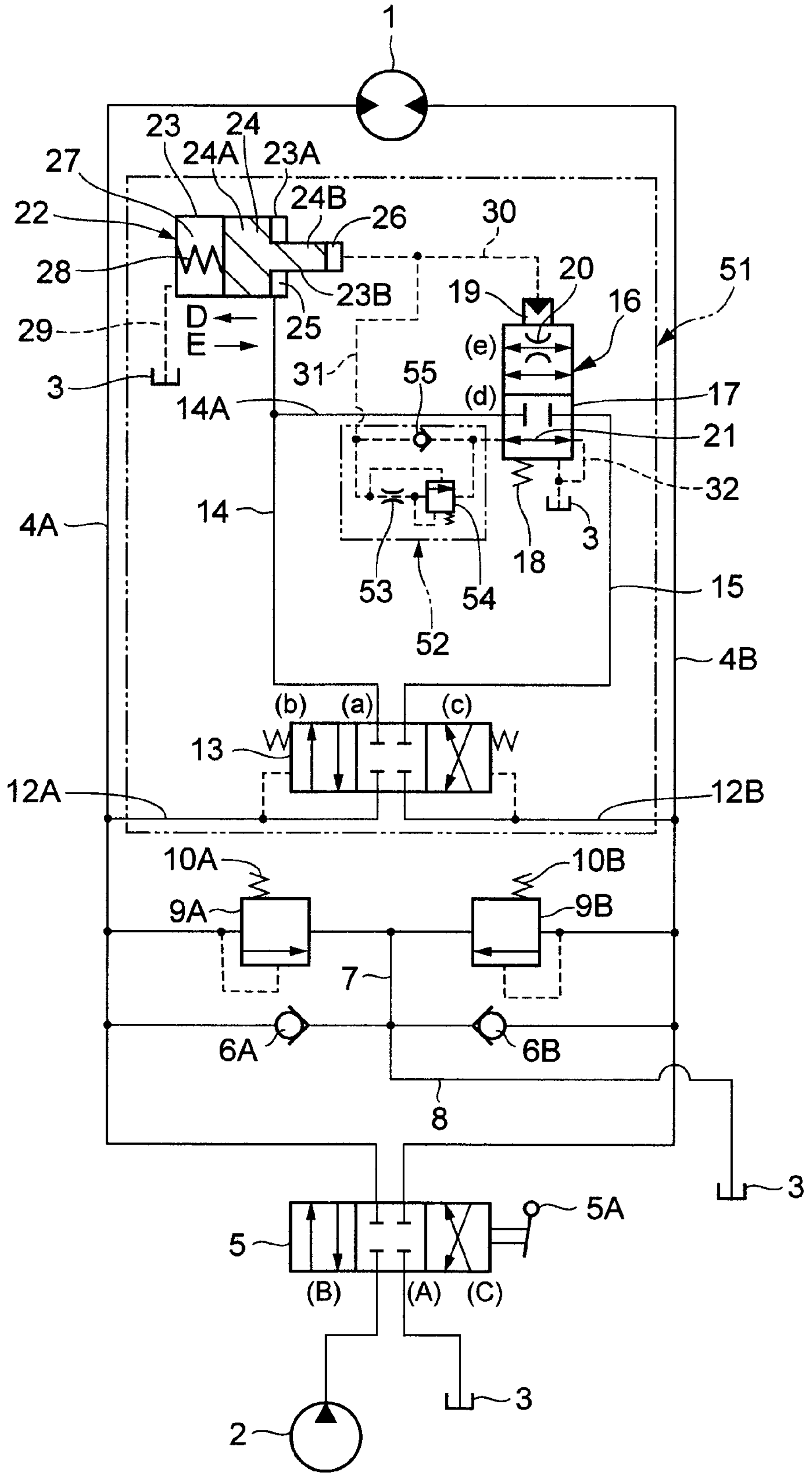
FIG. 9 is a hydraulic circuit diagram showing an inertial body anti-reversing valve adopted in a third embodiment of the invention.

Now, turning to FIG. 9, there is shown a third embodiment of the present invention. In the following description of the third embodiment, those component parts which are identical with the counterparts in the foregoing first embodiment are simply designated by the same reference numerals or characters to avoid repetitions of same explanations. The third embodiment has a feature in that a pressure compensation type flow control valve 52 is incorporated into an inertial body anti-reversing valve 51 as a flow resisting means.

Here, the pressure compensation type flow control valve 52 is provided in the way of the intake/discharge passage 31, in place of the throttle 33 described in the first embodiment. The pressure compensation type flow control valve 52 is constituted by a reducing valve 54 which is opened and closed according to a pressure difference across the throttle 53, and a check valve 55 which is connected parallel with the reducing valve 54 and throttle 53.

In this case, the check valve 55 is opened when taking operating oil into the oil reservoir chamber 26 of the cylinder device 22 from the tank 3, permitting operating oil to flow into the oil reservoir chamber 26 from the side of the tank passage 32 through the communication passage 21 of the spool valve device 16, check valve 55 and intake/discharge passage 31. However, the check valve 55 blocks a reverse flow of operating oil toward the tank passage 32 from the side of the intake/discharge passage 31, discharging operating oil toward the tank 3 through the reducing valve 54.

Namely, the reducing valve 54 of the pressure compensation type flow control valve 52 is opened when a pressure difference across the throttle 53 becomes large, regardless of variations occurring to operating oil temperature and viscosity under the influence of ambient temperature, and closed as soon as that pressure different becomes small. Thus, the reducing valve 54 is repeatedly opened and closed in such a way as to maintain a constant pressure difference across the throttle 53, thereby to adjust the flow rate of operating oil in the intake/discharge passage 31 when it is discharged toward the tank 3 from the oil reservoir chamber 26 of the cylinder device 22.

Thus, when operating oil flows out toward the communication passage 30 from the oil reservoir chamber 26 of the cylinder device 22, a pressure corresponding to the pressure difference across the throttle 53 is supplied to the oil pressure chamber 19 of the spool valve device 16 through the communication passage 30. By this pressure, the spool 17 of the spool valve device 16 in a closed position (d) is switched to an open position (e).

Being arranged in the manner as described above, the third embodiment of the invention can produce substantially the same operational effects as the foregoing first embodiment, in bringing an upper revolving structure smoothly to a stop without a time delay. However, in the case of the present embodiment, the pressure compensation type flow control valve 52 is provided in the way of the intake/discharge passage 31.

By employing the pressure compensation type flow control valve 52 in this manner, the flow rate of operating oil which is discharged from the communication passage 30 to the tank passage 32 through the intake/discharge passage 31 is kept free from fluctuations which might otherwise occur under the influence of ambient temperature. Accordingly, the open time period ΔT (see FIG. 7) of the spool valve device 16 is invariably fixed, stabilizing operational characteristics of the inertial body anti-reversing valve 51 and making matching adjustments of the hydraulic circuit easier.

Further, the check valve 55, which constitutes part of the pressure compensation type flow control valve 52, is opened at the time of taking operating oil into the oil reservoir chamber 26 of the cylinder device 22 from the tank 3, allowing operating oil in the tank 3 to smoothly flow into the oil reservoir chamber 26 from the tank passage 32 via the communication passage 21 of the spool valve device 16, the check valve 55 and the intake/discharge passage 31. Thus, the operating oil intake action can be completed in a short time period, preventing to spend a redundantly long time in taking operating oil into the oil reservoir chamber 26.

Now, turning to FIGS. 10 through 20, there is shown a fourth embodiment of the present invention. The fourth embodiment has a feature in that a low pressure reservoir is substituted for the spring chamber of the pressurized oil supply means (the cylinder device), and a passage connected to the reservoir is communicated with the low pressure conduit as well. In the following description of the fourth embodiment, those component parts which are identical with the counterparts in the foregoing first embodiment are simply designated by the same reference numerals and characters to avoid repetitions of similar explanations.

In the drawings, indicated at 61 is an inertial body anti-reversing valve which is adopted in the fourth embodiment. This inertial body anti-reversing valve 61 is provided in a casing 62 which is a common outer shell also shared by a pressure selector valve 67 and a cylinder device 77, which will be described hereinafter. As described in connection with the first embodiment, the casing 62 is formed integrally with a housing (not shown) of the hydraulic motor 1.

The inertial body anti-reversing valve 61 is constituted by a pressure selector valve 67, cylinder device 77 and a spool valve device 86, which are built into the casing 62 as described hereinafter. Further, as shown in FIG. 10, check valves 6A and 6B and overload relief valves 9A and 9B are also built into the casing 62.

Figure 10:
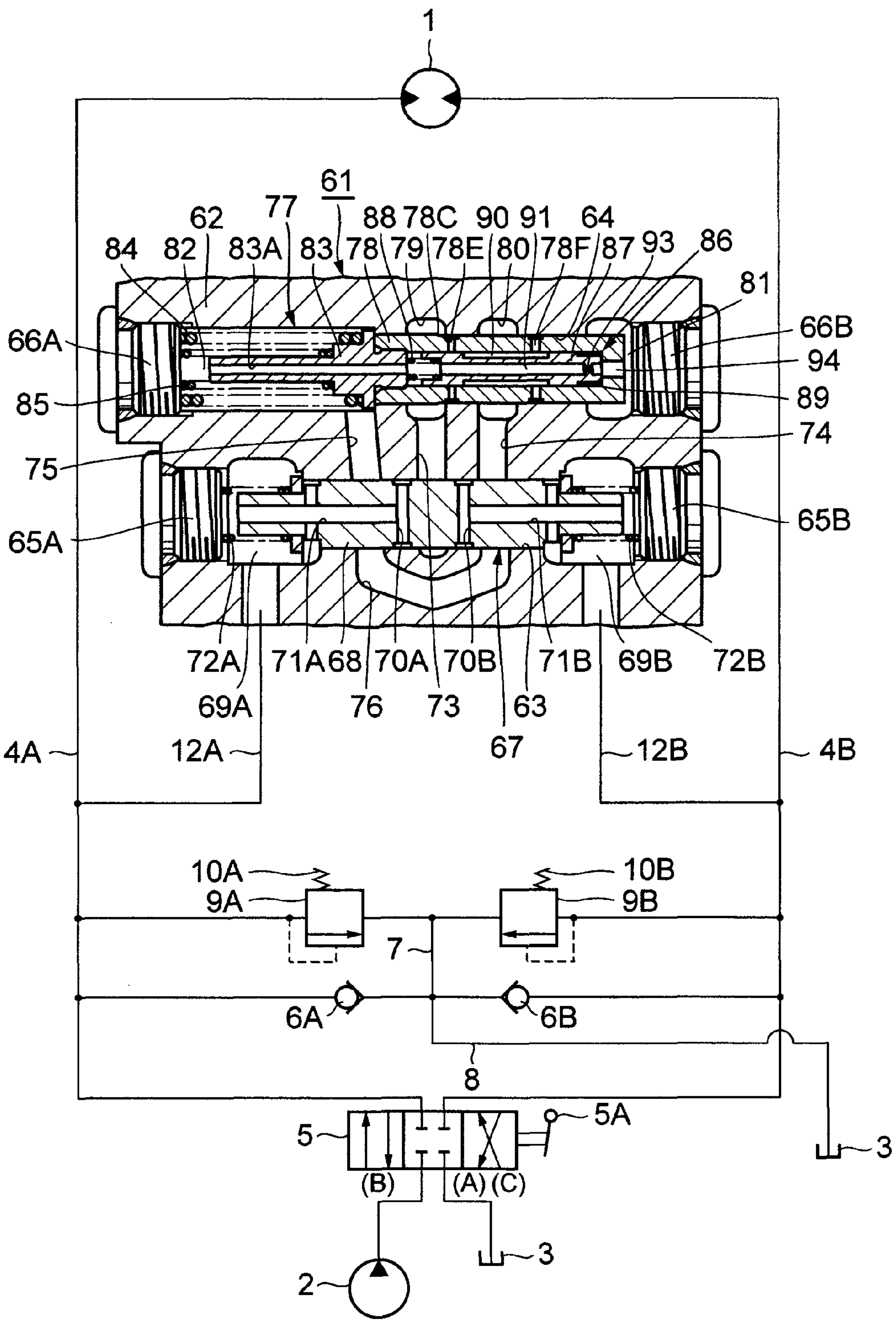
FIG. 10 is a hydraulic circuit diagram showing general construction of an inertial body anti-reversing valve adopted in a fourth embodiment of the invention.
Figure 11:
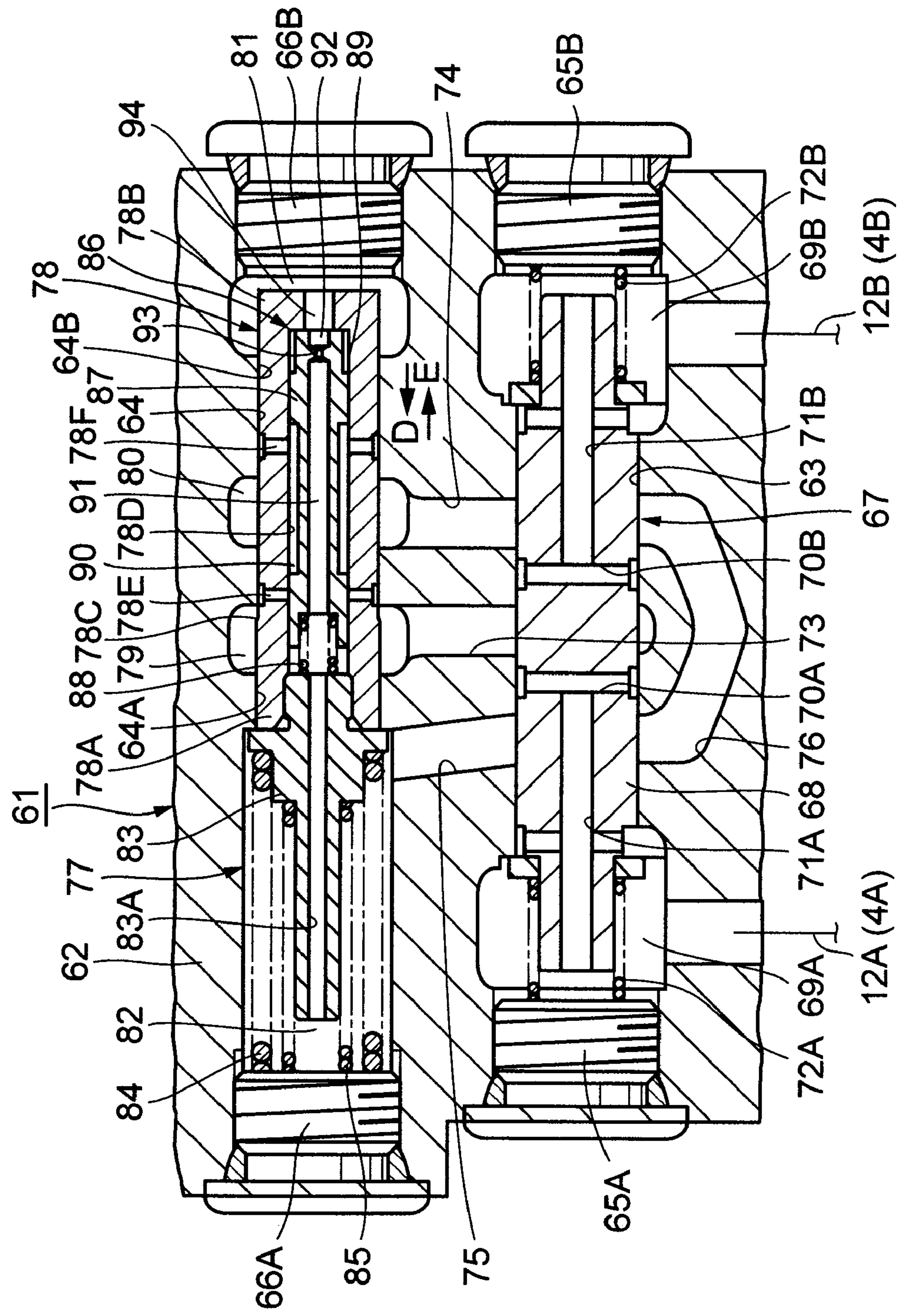
FIG. 11 is a sectional view showing essential parts of FIG. 10 on an enlarged scale.

As shown in FIGS. 10 and 11, a valve sliding bore 63 and a piston sliding bore 64 are extended laterally in rightward and leftward directions (in an axial direction) within the casing 62 in parallel relation with each other. Formed between the valve sliding bore 63 and piston sliding bore 64 are a high pressure conduit 73 and a low pressure conduit 74, which will be described later on, to communicate the two bores in a radial direction.

Figure 15:
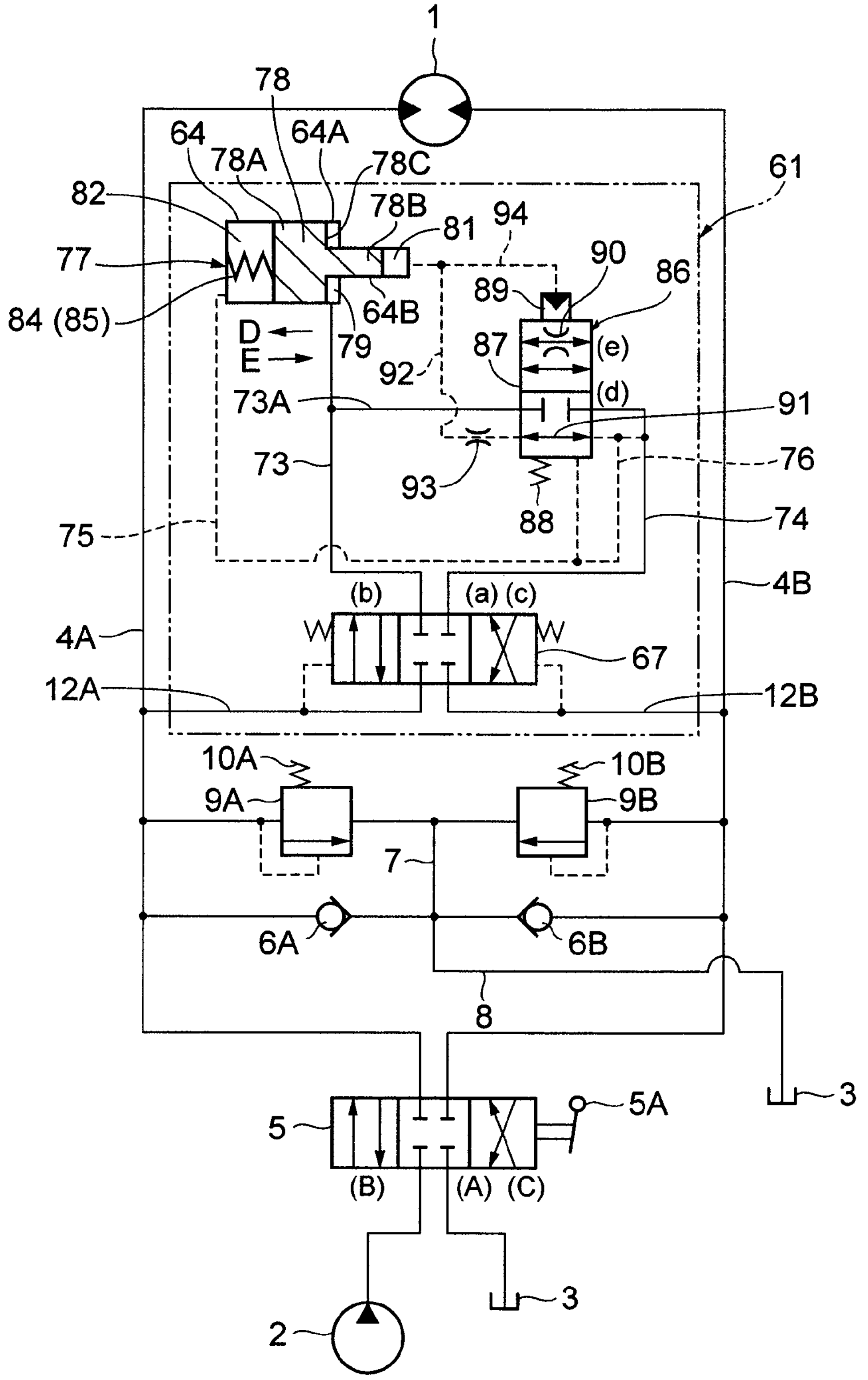
FIG. 15 is a hydraulic circuit diagram corresponding to FIG. 10, showing an inertial body anti-reversing valve adopted in a fourth embodiment of the invention.

Further, opposite ends of the valve sliding bore 63 in the casing 62 are closed with closure members 65A and 65B, while opposite ends of the piston sliding bore 64 are similarly closed with closure members 66A and 66B. In this instance, the piston sliding bore 64 has substantially the same functions as the stepped cylinder 23 in the first embodiment, and, as shown in FIGS. 11 and 15, formed in the shape of a stepped bore including a large diameter bore portion 64A and a small diameter bore portion 64B corresponding to the large and small diameter cylinder portions, respectively.

The pressure selector valve 67 which is adopted in the fourth embodiment as a pressure selector means is arranged in the manner as follows.

Similarly to the pressure selector valve 13 in the first embodiment, this pressure selector valve 67 is constituted by a hydraulically piloted directional control valve. Here, as shown in FIGS. 10 and 15 to 20, the pressure selector valve 67 is located at a position between the hydraulic motor 1 and the directional control valve 5 and connected between the main conduits 4A and 4B through bypass conduits 12A and 12B. According to a pressure difference between the main conduits 4A and 4B, the pressure selector valve 67 is switched to one of right and left changeover positions (b) and (c) from a neutral position (a).

In this instance, the pressure selector valve 67 is constituted by a spool valve body 68 which is fitted in the valve sliding bore 63 in the casing 62. The pressure selector valve 67 is provided with a pair of oil chambers 69A and 69B at the opposite ends of the spool valve body 68, i.e., between the opposite ends of the spool valve body 68 and the confronting closure members 65A and 65B. These oil chambers 69A and 69B are in the form of annular oil chambers which are formed in the casing 62 at the opposite axial ends of the valve sliding bore 63. Of the two oil chambers 69A and 69B, one oil chamber 69A is communicated with the main conduit 4A through the bypass conduit 12A, while the other oil chamber 69B is communicated with the main conduit 4B through the bypass conduit 12B.

Further, the spool valve body 68 of the pressure selector valve 67 is provided with a pair of radial passage holes 70A and 70B at axially spaced intermediate positions (spaced from each other in rightward and leftward directions in FIG. 11), along with a pair of axial passage holes 71A and 71B which are extended axially as far as the opposite end face of the spool valve body 68 from the radial passage holes 70A and 70B, respectively. Of the two axial passage holes 71A and 71B, one axial passage hole 71A is constantly communicated with the oil chamber 69A, while the other axial passage hole 71B is constantly communicated with the oil chamber 69B.

Springs 72A and 72B are set in the oil chambers 69A and 69B at the opposite ends of the spool valve body 68, between the opposite ends of the spool valve body 68 and closure members 65A and 65B. By these springs 72A and 72B, the spool valve body 68 is biased from right and left sides to return the pressure selector valve 67 to the neutral position (a) shown in FIG. 5.

Figure 12:
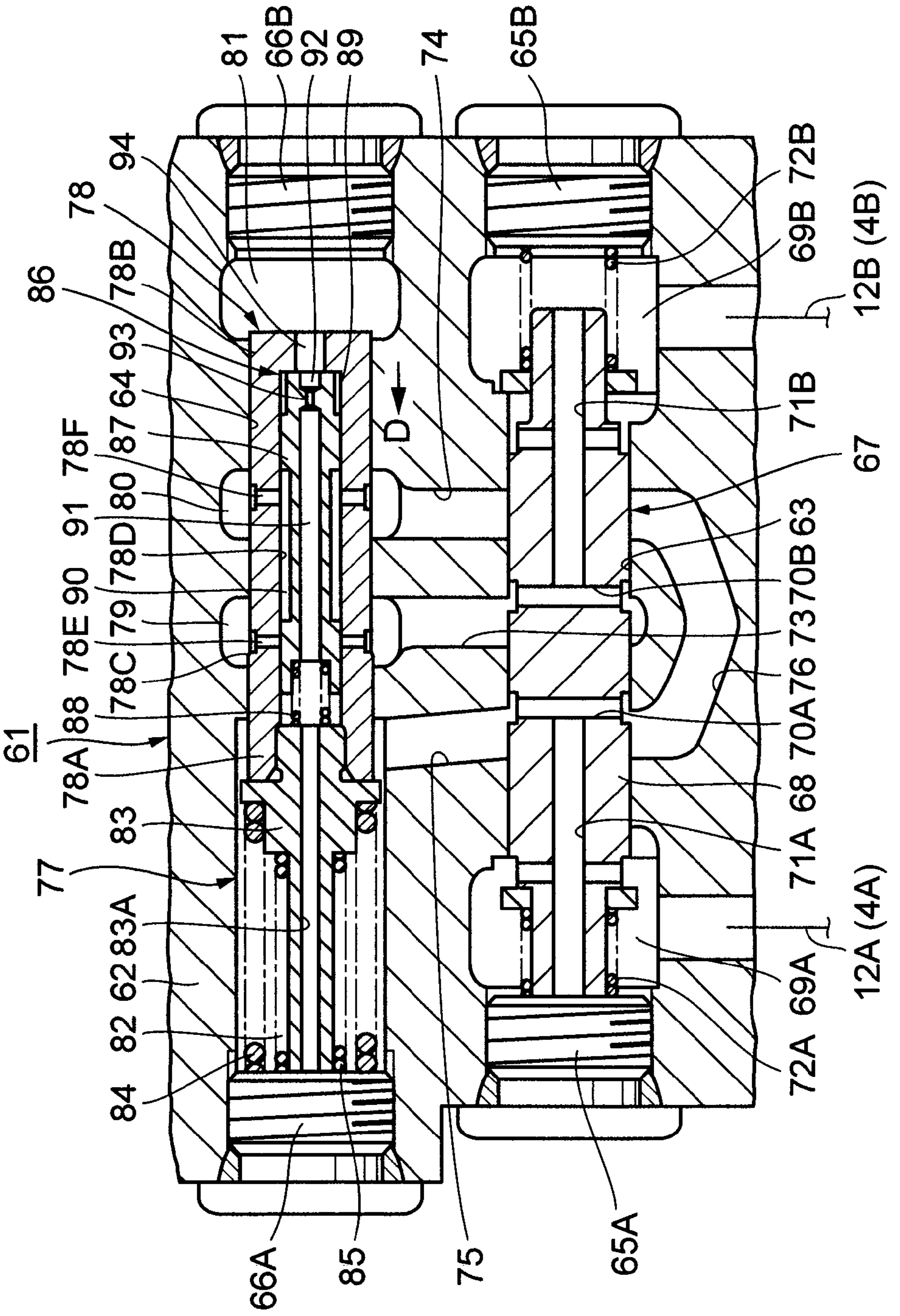
FIG. 12 is a sectional view showing an operational phase in which oil is taken into an oil reservoir chamber by a piston which has been displaced as far as its stroke end by inertial rotation of the hydraulic motor.

Indicated at 73 is a high pressure conduit which is communicated with a main conduit on a high pressure side through the pressure selector valve 67. As shown in FIG. 11, one end of this high pressure conduit 73 is connected (opened) to the valve sliding bore 63 at an axially intermediate position (at a position between the axial passage holes 71A and 71B), while the other end is connected to a pilot oil chamber 79 of a cylinder device 77, which will be described hereinafter. The high pressure conduit 73 is brought into communication with one of the radial passage holes 70A and 70B (e.g., with the radial passage hole 70B) when the spool valve body 68 is switched by an axial sliding displacement as shown in FIG. 12. As a result, the high pressure conduit 73 is brought into communication with a main conduit on high pressure side (e.g., with the main conduit 4B) through the axial passage hole 71B.

Figure 16:
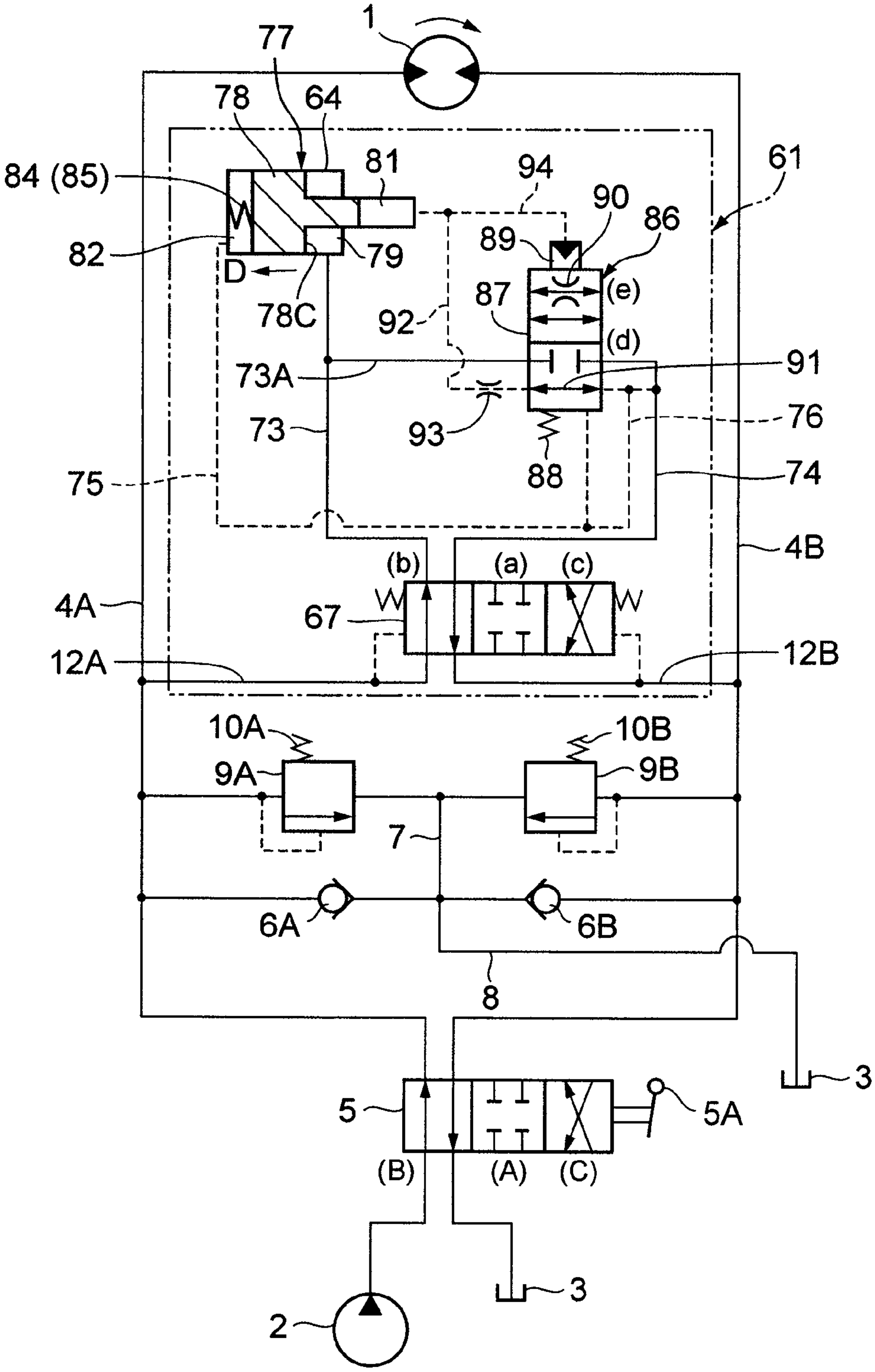
FIG. 16 is a hydraulic circuit diagram in an operational phase in which a directional control valve in FIG. 15 is switched to a changeover position from a neutral position.
Figure 17:
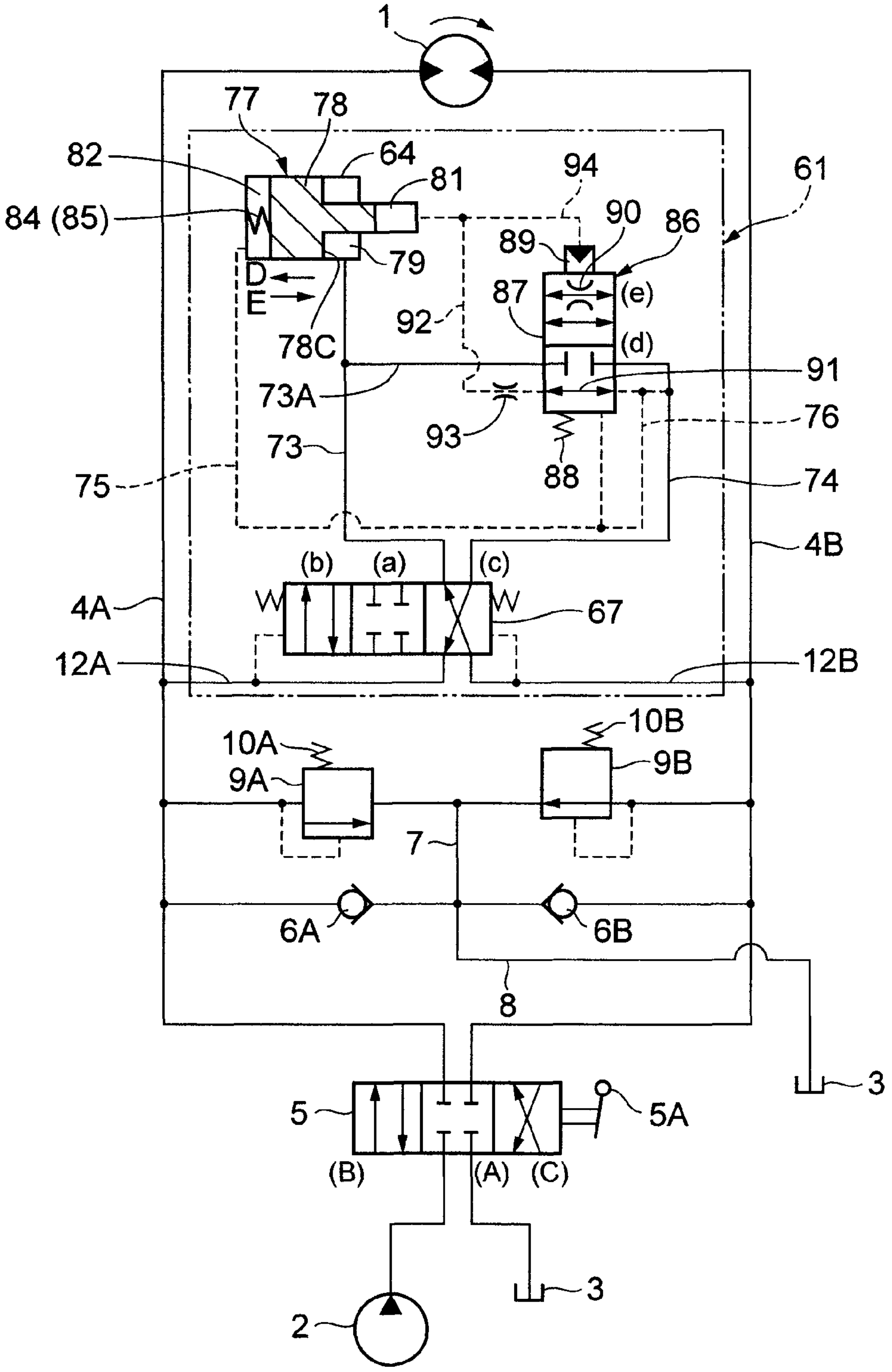
FIG. 17 is a hydraulic circuit diagram corresponding to FIG. 12, showing an operational phase in which the directional control valve is returned to the neutral position, putting the hydraulic motor in inertial rotation.

Namely, when the pressure selector valve 67 is switched to either one of the changeover positions (b) and (c) shown in FIGS. 16 and 17, the high pressure conduit 73 is communicated with either one of the main conduits 4A and 4B whichever is on a high pressure side to draw pressurized oil into the high pressure conduit 73 from the high pressure side.

On the other hand, when the pressure selector valve 67 is returned to the neutral position (a) as shown in FIG. 15, the high pressure conduit 73 is blocked against communication with both of the main conduits 4A and 4B. As shown in FIG. 15, a branch passage 73A is branched off the high pressure conduit 73. This branch passage 73A is brought into and out of communication with the low pressure conduit 74 by way of a spool valve device 86, which will be described hereinafter.

Indicated at 74 is a low pressure conduit which is communicated with a main conduit on a low pressure side through the pressure selector valve 67. As shown in FIGS. 10 and 11, this low pressure conduit 74 is located in a spaced position on the right side of the high pressure conduit 73 and extended between the valve sliding bore 63 and the piston sliding bore 64 substantially in parallel relation with the high pressure conduit 73. One end of the low pressure conduit 74 on the side of the piston sliding bore 64 is communicated with a low pressure chamber 80, which will be described later on, and the other end of the low pressure conduit 74 on the side of the valve sliding bore 63 is communicated with a bypass passage 76, which will be described later on.

In this instance, when the spool valve body 68 is put in a sliding displacement by an inertial rotation axially in a leftward direction (in the direction of arrow D) as shown in FIG. 12, for example, the low pressure conduit 74 is brought into communication with one of the radial passage holes 70A and 70B (e.g., with the radial passage hole 70A) through the bypass passage 76, which will be described hereinafter. As a result, the low pressure conduit 74 is communicated with a main conduit on a low pressure side (e.g., with the main conduit 4A) through the axial passage hole 71A. As soon as a spool 87, which will be described hereinafter, is put in a sliding displacement to the position of FIG. 13, the low pressure conduit 74 permits pressurized oil in the high pressure conduit 73 to circulate toward the bypass passage 76 and a main conduit on low pressure side (e.g., the main conduit 4A) through a pilot oil chamber 79, annular groove 90 and low pressure chamber 80, which will be described hereinafter.

Figure 18:
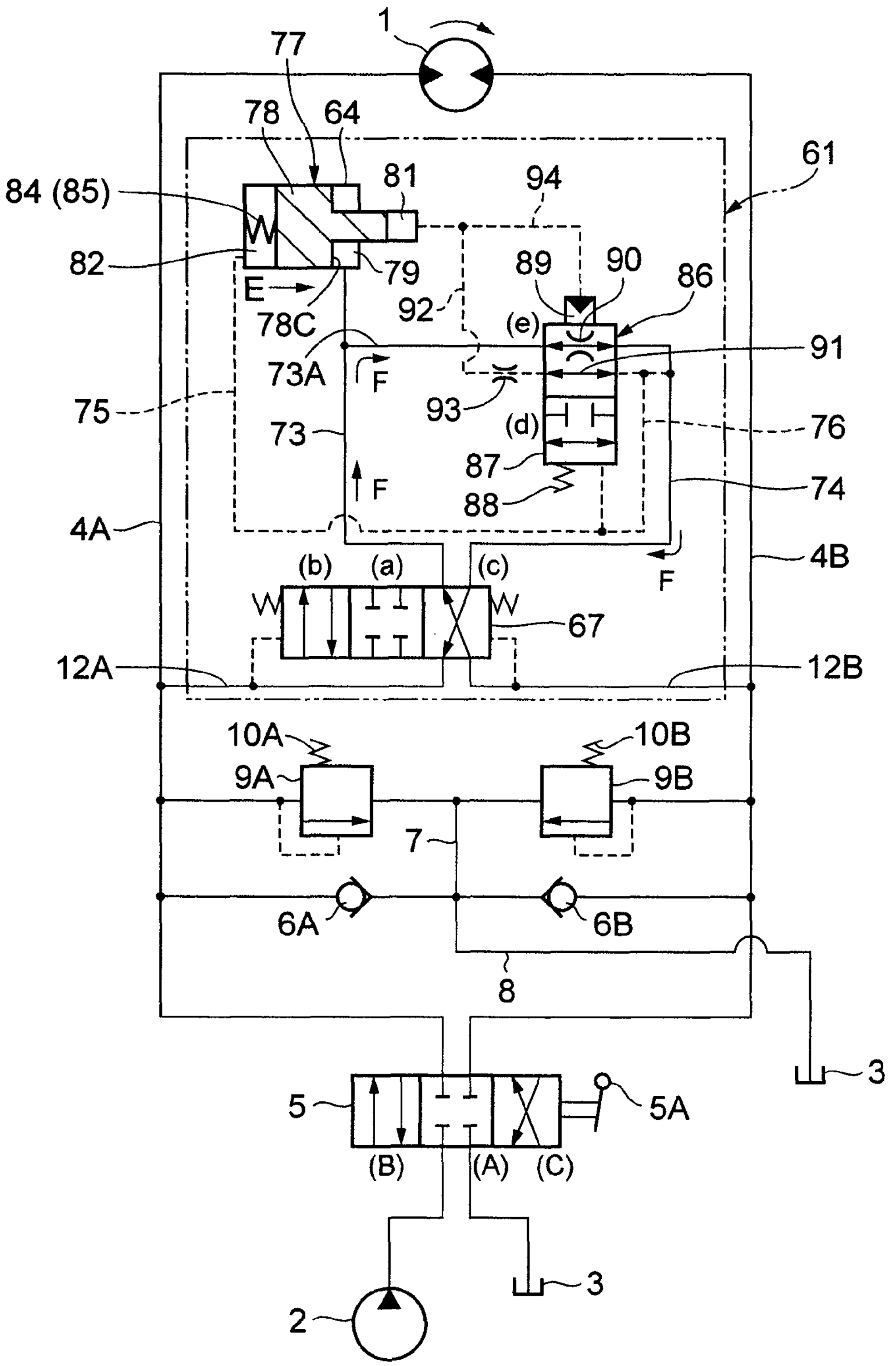
FIG. 18 is a hydraulic circuit diagram corresponding to FIG. 13, showing an operational phase in which, in order to stop the inertial rotation, a spool valve device of the inertial body anti-reversing valve is switched from a closed position to an open position.
Figure 19:
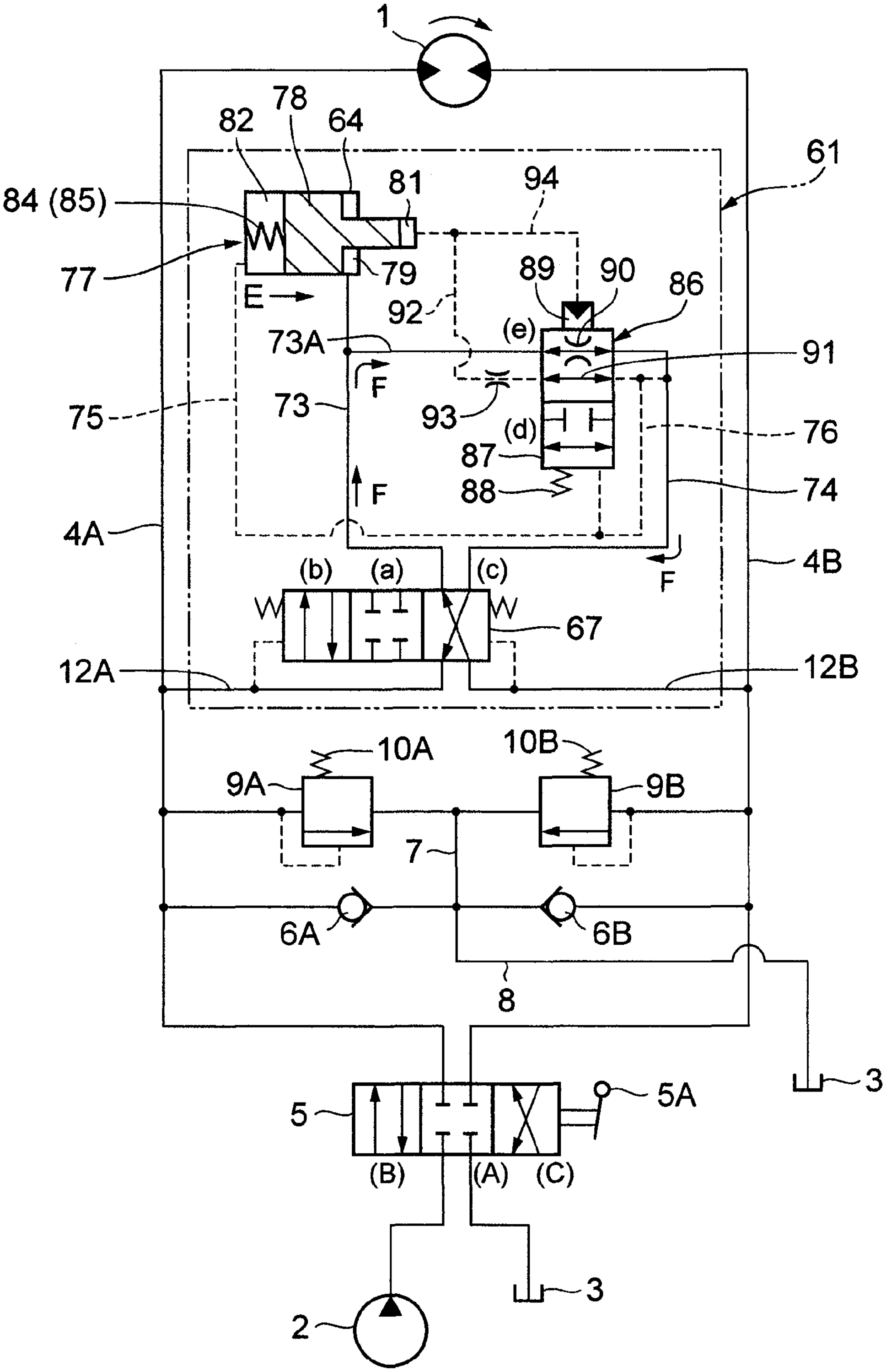
FIG. 19 is a hydraulic circuit diagram corresponding to FIG. 14, showing an operational phase in which the piston of FIG. 18 is pushed back toward an oil reservoir chamber to further discharge operating oil from the oil reservoir chamber.

Namely, when the pressure selector valve 67 is in either one of the changeover positions (b) and (c) shown in FIGS. 16 and 17, the low pressure conduit 74 is brought into communication with one of the main conduits 4A and 4B whichever is on a low pressure side to keep the low pressure conduit 74 at a low pressure level akin to a tank pressure. When a spool valve device 86, which will be described hereinafter, is switched to an open position (e) as shown in FIGS. 18 and 19, the low pressure conduit 74 permits pressurized oil in the high pressure conduit 73 to circulate toward the low pressure conduit 74 and a main conduit on a low pressure side (e.g., the main conduit 4A) through the branch passage 73A.

Further, the spool valve body 68 of the pressure selector valve 67 is returned to the position shown in FIGS. 10 and 11 by the biasing actions of the springs 72A and 72B. When the pressure selector valve 67 is returned to the neutral position (a) as shown in FIG. 15, the low pressure conduit 74 is blocked against communication with neither one of the main conduits 4A and 4B. At this time, the low pressure conduit 74 is kept out of communication with the high pressure conduit 73 as well.

Indicated at 75 is a spring chamber passage which is provided on the other side of the low pressure conduit 74, across the high pressure conduit 73. As shown in FIGS. 10 and 11, the spring chamber passage 75 is located in an axially spaced position on the left side of the high pressure conduit 73, and extended between the valve sliding bore 63 and a spring chamber 82, which will be described hereinafter, substantially in parallel relation with the high pressure conduit 73. In this instance, one end of the spring chamber passage 75 is communicated with the spring chamber 82, and the other end is communicated with a bypass passage 76 at a position of the valve sliding bore 63, which is described below.

Indicated at 76 is a bypass passage which communicates the low pressure conduit 74 with the spring chamber passage 75. This bypass passage 76 is formed substantially in U-shape as a passage hole on the other side of the low pressure conduit 74 and the spring chamber passage 75, across the valve sliding bore 63. By way of this bypass passage 76 which is bypassed the high pressure conduit 73 around the valve sliding bore 63, the low pressure conduit 74 is constantly communicated with the spring chamber passage 75.

Designated at 77 is a cylinder device having a stepped piston 78 fitted in the piston sliding bore 64 in the casing 62 to constitute a pressurized oil supply means as described in greater detail below.

Namely, the cylinder device 77 of the fourth embodiment is constituted by a piston sliding bore 64 corresponding to the stepped cylinder 23 in the first embodiment, a piston 78 slidably fitted in the piston sliding bore 64, a pilot oil chamber 79, an oil reservoir chamber 81, a spring chamber 82 and pressure setting springs 84 and 85, which will be described hereinafter.

Here, as seen in FIG. 11, the piston 78 is in the form of a spool valve body in a stepped cylindrical shape, having a large diameter portion 78A fitted in a large diameter bore portion 64A of the piston sliding bore 64 and a small diameter portion 78B fitted in a small diameter bore portion 64B of the piston sliding bore 64. In this case, for example, the diameter of the large diameter portion 78A is larger than that of the small diameter portion 78B approximately by 0.2 mm to 0.4 mm.

The piston 78 is provided with an annular stepped portion 78C around its circumference between the large and small diameter portions 78A and 78B. This stepped portion 78C is, for example, in the form of an annular step measuring approximately 0.1 mm to 0.2 mm. Further, provided internally of the piston 78 is a spool sliding bore 78D to receive a spool 87 which will be described hereinafter. On the other hand, a pair of radial oil passage holes 78E and 78F is bored at axially spaced positions in the small diameter portion 78B of the piston 78.

In this instance, the piston 78 is displaced in axial directions (in the directions of arrows D and E in FIG. 11) within the piston sliding bore 64 against the pressure setting springs 84 and 85, which will be described hereinafter, by the pressure in the pilot oil chamber 79 which is applied to the aforementioned annular stepped portion 78C. On such an axial displacement of the piston 78, one oil passage hole 78E of the oil passage holes 78E and 78F whichever is located closer to the stepped portion 78C is brought into and out of communication with the pilot oil chamber 79. The other oil passage hole 78F, for example, is brought into and out of communication with a low pressure chamber 80, which will be described later on.

By axial sliding displacements of the piston 78 between an initial position shown in FIG. 11 and a stroke end position shown in FIG. 12, the cylinder device 77 supplies pressurized oil to and discharges from an oil pressure chamber 89 of a spool valve device 86, which will be described hereinafter, thereby controls opening and closing the spool valve device 86.

Indicated at 79 is a pilot oil chamber serving as a hydraulic pilot portion of the cylinder device 77 (a pressurized oil supply means). This pilot oil chamber 79 is defined by an annular groove which is formed in an inner peripheral wall of the piston sliding bore 64. The pilot oil chamber 79 is formed as an annular oil chamber at a position as to circumvent the stepped portion 78C of the piston 78 radially from outer side. In this instance, as shown in FIG. 11, the pilot oil chamber 79 is constantly held in communication with the high pressure conduit 73. The stepped portion 78C of the piston 78 is applied pressurized oil from the high pressure conduit 73 as a pilot pressure in the pilot oil chamber 79 to put the piston 78 in a sliding displacement within the piston sliding bore 64 against the actions of the pressure setting springs 84 and 85, which will be described hereinafter.

Indicated at 80 is a low pressure chamber which is formed around the piston sliding bore 64 in communication with the low pressure conduit 74. Similarly to the pilot oil chamber 79, this low pressure chamber 80 is defined by an annular groove which is formed in an inner peripheral wall of the piston sliding bore 64, at a position which is spaced from the pilot oil chamber 79 in the rightward direction (in the axial direction) in FIG. 11. By way of the low pressure chamber 80, the low pressure conduit 74 is temporarily communicated with the high pressure conduit 73 (the pilot oil chamber 79) through the oil passage holes 78E and 78F and an annular groove 90, which will be described hereinafter, when the spool 87 is put in a sliding displacement as far as the position shown in FIG. 13.

Denoted at 81 is an oil reservoir chamber which is formed around the piston sliding bore 64, at a position between the small diameter portion 78B of the piston 78 and the closure member 66B. In this instance, by an axial displacement of the piston 78 within the piston sliding bore 64, operating oil is sucked into the oil reservoir chamber 81 through a throttle 93 from a spring chamber 82, which will be described hereinafter, or sucked operating oil is supplied from the oil reservoir chamber 81 to an oil pressure chamber 89 of the spool valve device 86 as pressurized oil. The volumetric capacity (oil storage capacity) of the oil reservoir chamber 81 is varied in proportion with sliding displacement of the piston 78.

Denoted at 82 is a spring chamber which is defined at an opposite axial end of the oil reservoir chamber 81, across the piston 78. This spring chamber 82 is defined between the large diameter portion 78A of the piston 78 and the closure member 66A as a cylindrical space with a large volumetric capacity at a position of other side of the piston sliding bore. The spring chamber 82, serving as a low pressure reservoir, is communicated with the low pressure conduit 74 through the spring chamber passage 75 and bypass passage 76. Further, the spring chamber 82 is communicated with the oil pressure chamber 89 and oil reservoir chamber 81 through communication passage holes 83A, 91 and throttle 93, which will be described hereinafter, and filled with low pressurized operating oil.

Indicated at 83 is a movable spring seat which is located in the spring chamber 82. As shown in FIGS. 10 to 14, the movable spring seat 83 is detachably fitted in an end portion (in the large diameter portion 78A) of the piston 78, and displaced in the piston sliding bore 64 together with the piston 78. A communication passage hole 83A is bored axially through the movable spring seat 83 to hold the spring chamber 82 constantly in communication with a communication passage hole 91 in the spool 87, which will be described hereinafter.

Denoted at 84 and 85 are pressure setting springs which are set in the spring chamber 82 together with the movable spring seat 83. Similarly to the pressure setting spring 28 in the first embodiment, these pressure setting springs 84 and 85 are adjusted to the second pressure value Pd (see FIG. 7). By the action of the pressure setting springs 84 and 85, the piston 78 is constantly biased toward the oil reservoir chamber 81 in the direction of arrow E in FIG. 11. For the pressure setting springs 84 and 85, the fourth embodiment employs a coil spring of a relatively large diameter (the spring 84) in combination with a coil spring of a relatively small diameter (the spring 85).

In the case of the present embodiment, a spool valve device 86 is constructed in the manner as described below, having a spool 87 slidably fitted in a spool sliding bore 78D of the piston 78 to serve as a valve means.

Namely, the spool valve device 86 in the fourth embodiment is arranged substantially in the same manner as the spool valve device 16 in the foregoing first embodiment to bring the high pressure conduit 73 and the low pressure conduit 74 into and out of communication with each other through an annular groove 90, which will be described hereinafter.

In this instance, the spool valve device 86 is constituted by a spool 87 which is fitted in a spool sliding bore 78D in the piston 78, a valve spring 88 which is placed in the spool sliding bore 78D in the piston 78 and interposed between the spool 87 and the movable spring seat 83 as a biasing member to bias the spool 87 in the rightward direction in FIG. 11 (in the direction of arrow E), and an oil pressure chamber 89 which is formed between the spool sliding bore 78D of the piston 78 and an end face of the spool 87 to put the spool 87 in a sliding displacement in the leftward direction (in the direction of arrows D) against the action of the valve spring 88.

Figure 13:
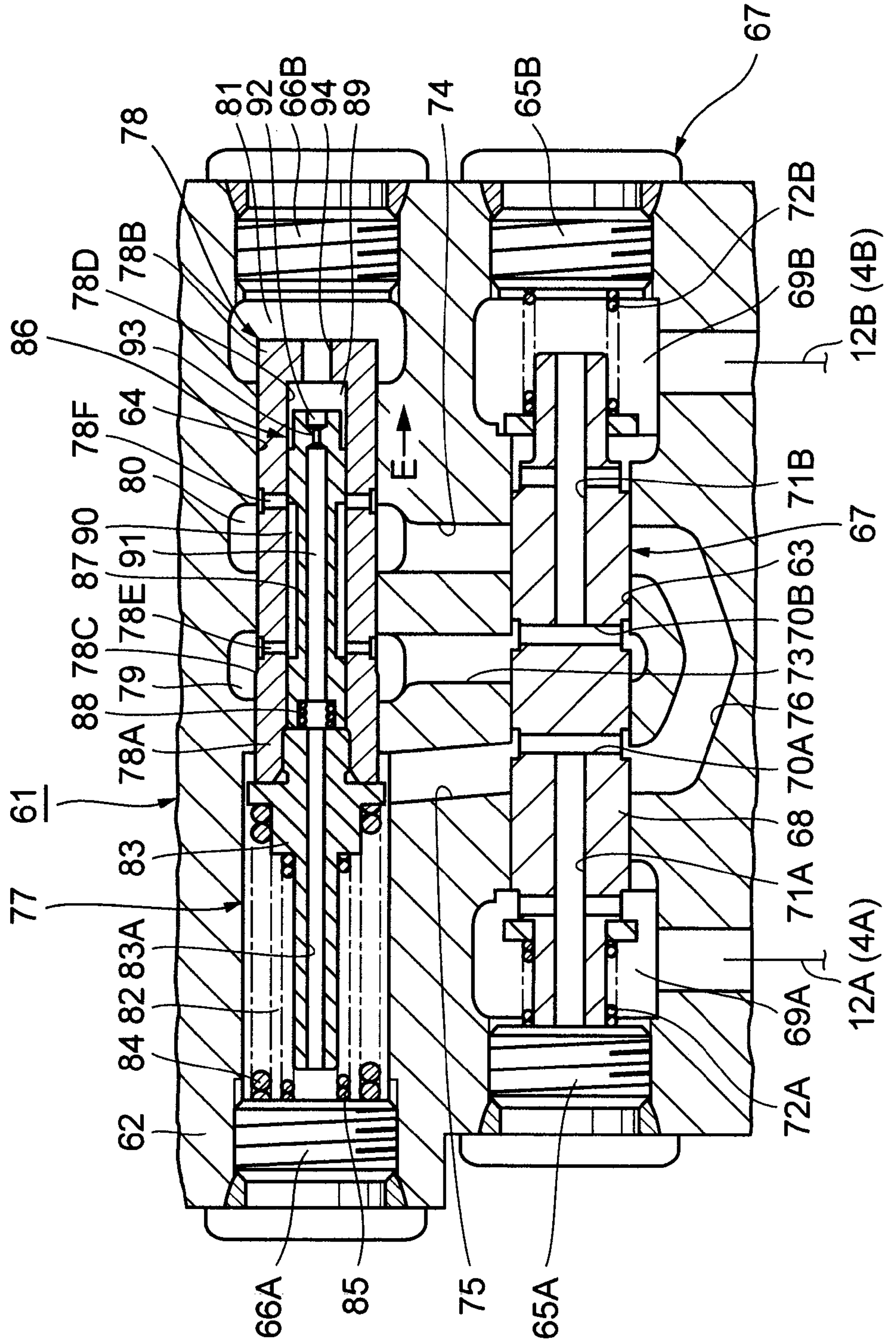
FIG. 13 is a sectional view showing an operational phase in which, in order to stop inertial rotation, a high pressure conduit and a low pressure conduit are brought into communication with each other by a sliding displacement of a spool within a piston under the influence of influent operating oil from the oil reservoir chamber.
Figure 14:
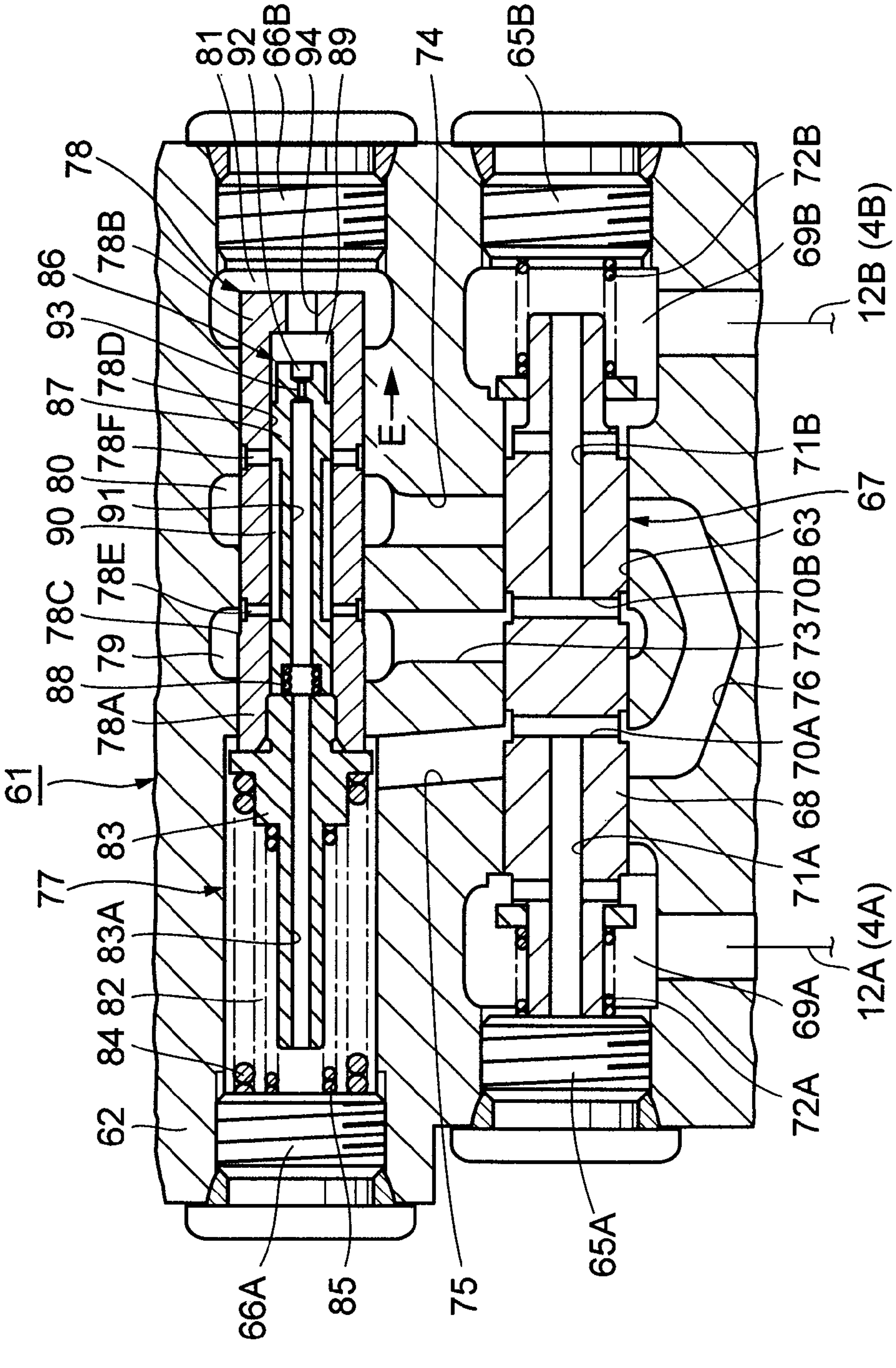
FIG. 14 is a sectional view showing an operational phase in which the piston is pushed back toward the oil reservoir chamber succeedingly to the operational phase of FIG. 13.

Further, an annular groove 90 is formed around the outer circumference of the spool 87 axially between the oil passage holes 78E and 78F of the piston 78. As the piston 78 and the spool 87 are axially displaced relative to each other as shown in FIGS. 12 to 14, the pilot oil chamber 79 and the low pressure chamber 80 are brought into and out of communication with each other by the annular groove 90 through the oil passage holes 78E and 78F.

Namely, these oil passage holes 78E and 78F and annular groove 90 have substantially the same functions as the throttle passage 20 in the first embodiment. As the spool 87 is put in a sliding displacement in an axial direction, the spool valve device 86 is switched to either the closed position (d) or the open position (e), as shown in FIGS. 15 to 19. For example, as soon as the spool valve device 86 is switched to the open position (e), the branch passage 73A of the high pressure conduit 73 is brought into communication with the low pressure conduit 74 through the annular groove 90.

The oil pressure chamber 89 of the spool valve device 86 is communicated (connected) with the oil reservoir chamber 81 through a communication passage 94, which will be described hereinafter. As pressurized oil is supplied to or discharged from the pressure chamber 89 by way of the oil reservoir chamber 81, the spool 87 is axially displaced within the spool sliding bore 78D of the piston 78 to switch the spool valve device 86 selectively between the closed position (d) and the open position (e) as shown in FIGS. 15 to 19.

Indicated at 91 is a communication passage hole which is formed internally of the spool 87 to serve as an axial hole. One axial end of the communication passage hole 91 is communicated with the oil reservoir chamber 81 and pressure chamber 89 through a throttle 93, which will be described hereinafter, while the other axial end is communicated with a communication passage hole 83A in the movable spring seat 83 through a valve spring 88. The communication passage hole 91 has substantially the same functions as the communication passage 21 in the first embodiment. By way of the communication passage hole 91, operating oil is sucked into and out of the spring chamber 82 and the oil reservoir chamber 81 through the throttle 93.

Indicated at 92 is a port which is dug into one axial end face of the spool 87 in front of the oil pressure chamber 89. This port 92 has substantially the same functions, for example, as the intake/discharge passage 31 in the foregoing first embodiment. By way of the port 92, operating oil is sucked into and out of the spring chamber 82 and the oil reservoir chamber 81 through the throttle 93.

Indicated at 93 is a throttle which is provided internally of the spool 87 as a flow resisting means. As shown in FIG. 11, the throttle 93 is constituted by an oil passage of a small diameter which is bored axially of the spool 87 between the communication passage hole 91 and the port 92. The throttle 93 has substantially the same functions as the throttle 33 in the first embodiment, and is constantly communicated with the oil pressure chamber 89 and a communication passage 94, which will be described hereinafter, through the port 92.

Namely, the throttle 93 limits the flow rate of effluent oil from the oil pressure chamber 89 by its throttling action, for example, when oil in the pressure chamber 89 flows toward the spring chamber 82 through the port 92 and the communication passage holes 91 and 83A. That is to say, the throttle 93 acts to prolong the time period over which the spool 87 of the spool valve device 86 is returned to the closed position (d) from the open position (e).

Denoted at 94 is a communication passage in the form of an oil hole bored through an end wall of the piston 78. The communication passage 94 has the same functions as the communication passage 30 in the first embodiment, constantly communicating the oil pressure chamber 89 of the spool valve device 86 with the oil reservoir chamber 81 of the cylinder device 77.

Being arranged in the manner as described above, the inertial body anti-reversing valve 61 of the fourth embodiment operates in the same manner as the counterpart in the first embodiment in basic operating principles. However, in the present embodiment, the spring chamber 82 of the cylinder device 77 is used as a low pressure reservoir.

The spring chamber 82 is communicated with the low pressure conduit 74 through the spring chamber passage 75 and bypass passage 76. The spring chamber 82 is also communicable with the oil reservoir chamber 81 and oil pressure chamber 89 through a communication passage hole 91 in the spool 87 and throttle 93 to produce the following operational effects.

Namely, the directional control valve 5 is switched to the changeover position (B) as shown in FIG. 16 to put the hydraulic motor 1 in operation for driving an upper revolving structure into a swinging motion. Thereafter, to stop the swinging motion of the upper revolving structure, as shown in FIG. 17, the directional control valve 5 is returned to the neutral position (A) from the changeover position (B). In the position of FIG. 17, the piston 78 is displaced in the direction of arrow D against the action of the pressure setting springs 84 and 85 for the reason as explained below.

In this instance, after switching the directional control valve 5 to the neutral position, if the hydraulic motor 1 is continually put in an inertial rotation under the influence of the upper revolving structure (an inertial body), a braking pressure is generated in the main conduit 4B to stop the inertial rotation of the hydraulic motor 1. As soon as this braking pressure becomes higher than the preset operational criterion pressure value for opening the overload relief valve 9B, the brake pressure in the main conduit 4B is relieved through the opened overload relief valve 9B.

On the other hand, by the brake pressure which is generated in the main conduit 4B as a result of an inertial rotation of the hydraulic motor 1, the pressure selector valve 67 is switched to the changeover position (c) as shown in FIG. 17. As a result, the high pressure conduit 73 is brought into communication with the main conduit 4B which is now on a high pressure side because of the braking pressure, and the low pressure conduit 74 is communicated with the main conduit 4A on a low pressure side. At this time, the spool valve body 68 of the pressure selector valve 67 is displaced in a leftward direction in FIG. 12 (in the direction of arrow D) against the action of the spring 72A.

As the spool valve body 68 is displaced in a leftward direction in this manner, the radial passage hole 70B is brought into communication with the high pressure conduit 73. As a result, a high pressure (the braking pressure) in the main conduit 4B is drawn into the high pressure conduit 73 and pilot oil chamber 79 through the oil chamber 69B and axial passage hole 71B. Further, by the radial and axial passages 70A and 71A of the spool valve body 68, the main conduit 4A on a low pressure side is brought into communication with the low pressure conduit 74 through the bypass passage 76, and at the same time with the spring chamber 82 of the cylinder device 77 through the spring chamber passage 75.

As a consequence, the pressure in the pilot oil chamber 79 is applied to the annular stepped portion 78C of the piston 78 of the cylinder device 77, putting the piston 78 in a sliding displacement in the direction of arrow D in FIG. 12 as far as a stroke end within the piston sliding bore 64 against the action of the pressure setting springs 84 and 85, until the movable spring seat 83 is abutted against the closure member 66A.

At this time, operating oil is drawn into the oil reservoir chamber 81 of the cylinder device 77 from the spring chamber 82 through the communication passage holes 83A and 91, throttle 93 and communication passage 94 until the oil reservoir chamber 81 is fully filled with operating oil. In this state, as shown in FIG. 17, the spool valve device 86 is retained in the closed position (d).

In the next place, brakes are applied to the inertial rotation of the hydraulic motor 1 by opening the overload relief valve 9B, and the inertial rotation of the hydraulic motor 1 is once stopped upon closing the overload relief valve 9B. Then, before the hydraulic motor 1 starts a reversing movement, the pressure in the main conduit 4B is dropped to a low level, for example, 75% to 85% of the pressure value Pc (see FIG. 7) of the overload relief valve 9B.

As a result, the pilot pressure in the pilot oil chamber 79 is dropped below the preset pressure (the second pressure value Pd) of the pressure setting springs 84 and 85, and the piston 78 of the cylinder device 77 is pushed in the direction of arrow E in FIGS. 13 and 18 toward the oil reservoir chamber 81 by the action of the pressure setting springs 84 and 85, pressurizing operating oil in the oil reservoir chamber 81 and supplying pressurized oil to the oil pressure chamber 89 of the spool valve device 86 through the communication passage 94.

At this time, part of operating oil is discharged from the communication passage 94 toward the spring chamber 82 through the throttle 93 and communication passage holes 91 and 83A. However, the flow rate of operating oil to be discharged toward the spring chamber 82 is limited by the action of the throttle 93 which is provided in the spool 87 together with the communication passage hole 91. Therefore, a relatively high pressure is developed in the oil pressure chamber 89 which is located upstream of the throttle 93, and, by this pressure, the spool 87 of the spool valve device 86 is put in a sliding displacement against the action of the valve spring 88. That is to say, the spool 87 of the spool valve device 86 is switched from the closed position (d) to the open position (e) as shown in FIGS. 18 and 19.

In this state, as shown in FIG. 13, the high pressure conduit 73 is communicated with the low pressure conduit 74 and bypass passage 76 through the pilot oil chamber 79, oil passage hole 78E of the piston 78, annular groove 90 of the spool 87, oil passage hole 78F and low pressure chamber 80, bringing the main conduits 4A and 4B (the bypass conduits 12A and 12B) temporarily into communication with each other through the left and right oil chambers 69A and 69B.

Further, at this time, the spool 87 of the spool valve device 86 is biased toward the oil pressure chamber 89 by the action of the valve spring 88. Therefore, the operating oil in the oil pressure chamber 89 tends to flow out toward the spring chamber 82 via the throttle 93 and communication passage hole 91 in the spool 87 and the communication passage hole 83A in the movable spring seat 83. However, the throttle 93 which is formed on the spool 87 limits the flow rate of operating oil flowing toward the spring chamber 82 from the oil pressure chamber 89 via the communication passage holes 91 and 83A by throttling effects.

Therefore, in the same way as explained hereinbefore in connection with the first embodiment, the open time period of the spool valve device 86 until the return of the spool 87 from the open position (e) to the closed position (d) shown in FIGS. 18 and 19 can be prolonged by open time period ΔT (see FIG. 7). As a result, as shown in FIGS. 18 and 19, the main conduits 4A and 4B are communicated with each other over a prolonged time period through the pressure selector valve 67 in the changeover position (c), high pressure conduit 73, annular groove 90 of the spool valve device 86 and low pressure conduit 74.

Thus, for example, a high pressure (a braking pressure) in the main conduit 4B is allowed to escape in the direction of arrow F in FIGS. 18 and 19 toward the low pressure conduit 74, bypass conduit 12A and main conduit 4A from the high pressure conduit 73 under throttling effects of the annular groove 90 of the spool valve device 86. During this time period, a pressure difference ΔP (see FIG. 7) which has occurred between the main conduits 4A and 4B can be reduced to prevent repetitions of a reversing movement by the hydraulic motor 1.

As the spool 87 is gradually pushed toward the oil pressure chamber 89 by the action of the valve spring 88 to return to the closed position (d) shown in FIG. 15, communication between the branch passage 73A of the high pressure conduit 73 and the low pressure conduit 74 can be blocked by the spool 87 of the spool valve device 86. Thus, communication between the main conduits 4A and 4B by way of the inertial body anti-reversing valve 61 can be blocked to hold the hydraulic motor 1 in a standstill state. Besides, the spool valve device 86 can be prevented from being erroneously opened when driving the hydraulic motor 1 next time.

Figure 20:
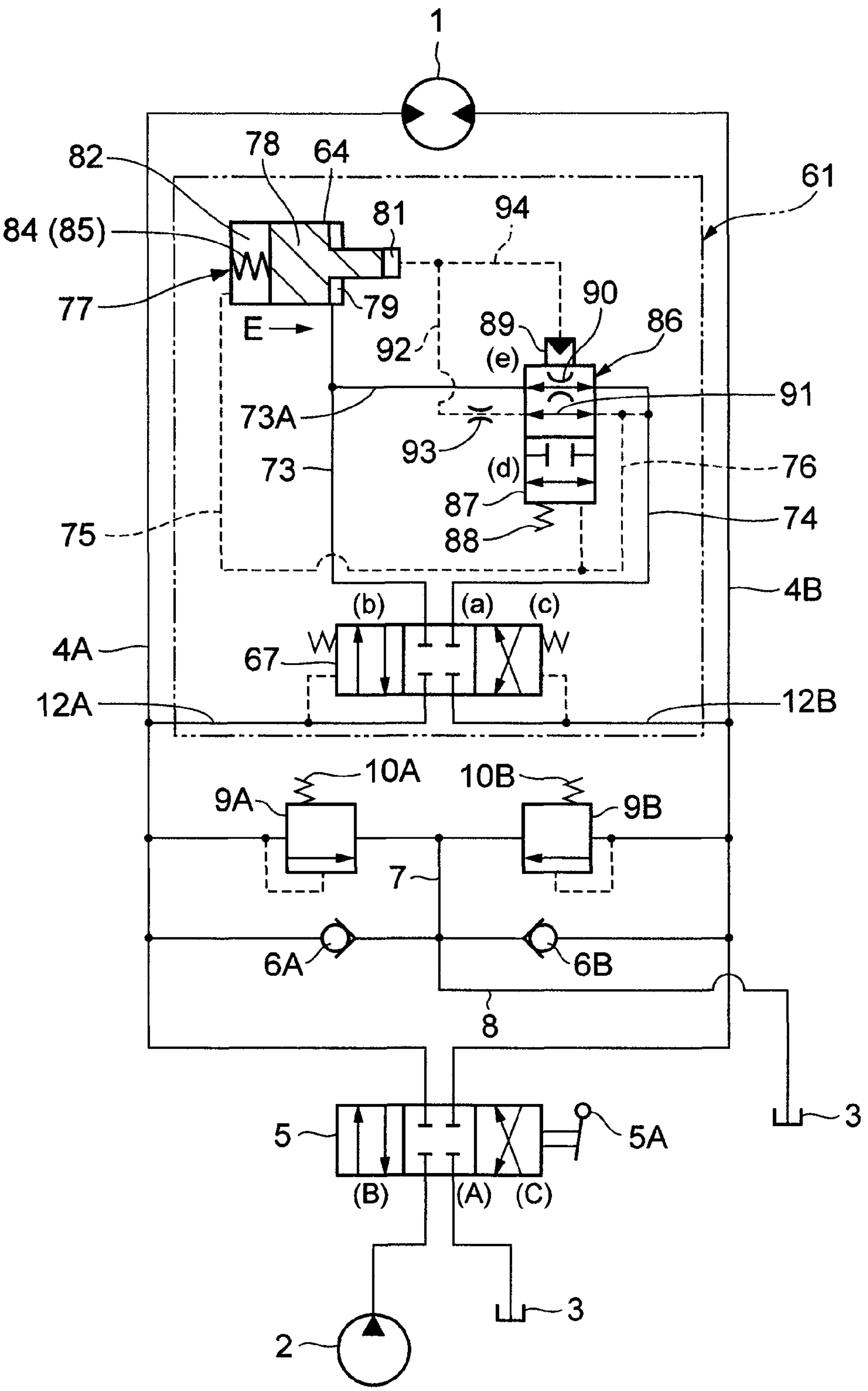
FIG. 20 is a hydraulic circuit diagram showing an operational phase in which the pressure selector valve in FIG. 19 is returned to a neutral position at the time of stopping the inertial rotation, blocking communication between the main conduits.

Further, for example, at the time of bringing an inertial body like an upper revolving structure to a stop in a cold district where ambient temperature is quite low, even if the open time period ΔT of the spool valve device 86 is prolonged redundantly, the pressure selector valve 67 is automatically returned to the neutral position (a) as shown in FIG. 20 as soon as a pressure difference between the two main conduits 4A and 4B become small. That is to say, even if the spool valve device 86 is still in the open position (e), communication between the main conduits 4A and 4B can be forcibly blocked by the pressure selector valve 67 to produce the same operational effects as in the above-described first embodiment.

Especially in the case of the fourth embodiment, the spring chamber 82 of the cylinder device 77 is used as a low pressure reservoir. And the spring chamber 82 is communicated with the low pressure conduit 74 through the spring chamber passage 75 and bypass passage 76 and with the oil reservoir chamber 81 and oil pressure chamber 89 through the throttle 93. Therefore, in this case, there is no need for connecting the spring chamber 82 of the cylinder device 77 to the tank 3 by the use of a drain conduit (e.g., like the one as shown at the drain conduit 29 in FIG. 1). A reduction in the number of parts like conduit pipes can contribute to make an assembling work more efficient.

Further, when discharging operating oil in the oil pressure chamber 89 to the spring chamber 82 (a reservoir) through the throttle 93 for returning the spool valve device 86 to the closed position (d) after once switching from the closed position (d) to the open position (c), for example, part of operating oil can also be discharged to the main conduit 4A (or 4B) on a low pressure side through the spring chamber passage 75, bypass passage 76 and low pressure conduit 74. Thus, the spring chamber 82 can be maintained constantly at a low pressure akin to the tank pressure.

That is to say, there is no need for especially providing the drain conduit 29 and the tank passage 32 which are connected to the tank 3 in the foregoing first and third embodiments. Thus, passages for discharging operating oil from the oil pressure chamber 89 of the spool valve device 86 can be integrated into a passage of a compact form, permitting to reduce the number of parts to carry out an assembling work more efficiently.

It suffices to provide one inertial body anti-reversing valve 61 between the main conduits 4A and 4B, having the pressure selector valve 67, cylinder device 77 and spool valve device 86 incorporated into one and single casing 62. That is to say, if desired, the inertial body anti-reversing valve 61 can be easily built, for example, into a housing of the hydraulic motor 1 through the casing 62.

In that case, the piston 78 in the form of a tubular valve body is placed in the piston sliding bore 64 in the casing 62, and the spool 87 of the spool valve device 86 is placed in the spool sliding bore 78D in the piston 78. Therefore, the piston 78 and the spool 87 are fitted coaxially within the piston sliding bore 64. This arrangement permits to build the whole inertial body anti-reversing valve 61 in a compact form which is reduced in size and weight, and to simplify the construction of the hydraulic circuit as a whole.

Besides, the piston 78 of the cylinder device 77 is adapted to receive a pressure from the pilot oil chamber 79 at the annular stepped portion 78C which is formed between the large diameter portion 78A and the small diameter portion 78B. Therefore, a pressure from the pilot oil chamber 79 can be received, for example, by an annular stepped portion 78C which is 0.1 mm to 0.2 mm in height. Thus, the pressure receiving area of the piston 78 (the stepped portion 78C) can be made smaller. Therefore, for the pressure setting springs 84 and 85 which determine the second pressure value Pd, there may be employed weaker springs from the standpoint of downsizing and reducing the weight of the inertial body anti-reversing valve 61 as a whole.

Now, turning to FIGS. 21 through 26, there is shown a fifth embodiment of the present invention. This fifth embodiment has a feature in that a check valve is provided in a passage which connects an oil reservoir chamber of a pressurized oil supply means and an oil pressure chamber of a valve means with a low pressure reservoir, in parallel relation with a flow resisting means, thereby establishing a smooth flow of operating oil, for example, when taking operating oil into the oil reservoir chamber from the side of the reservoir.

In the following description of the fifth embodiment, those component parts which are identical with the counterparts in the foregoing first embodiment are simply designated by the same reference numerals and characters to avoid repetitions of same explanations.

In the drawings, indicated at 101 is an inertial body anti-reversing valve which is adopted in the present embodiment. This inertial body anti-reversing valve 101 is provided with a casing 102 which is a common outer shell of a pressure selector valve 107 and a cylinder device 117, which will be described hereinafter. Similarly to the casing 62 in the fourth embodiment, the casing 102 is formed integrally with a housing (not shown) of the hydraulic motor 1.

Figure 21:
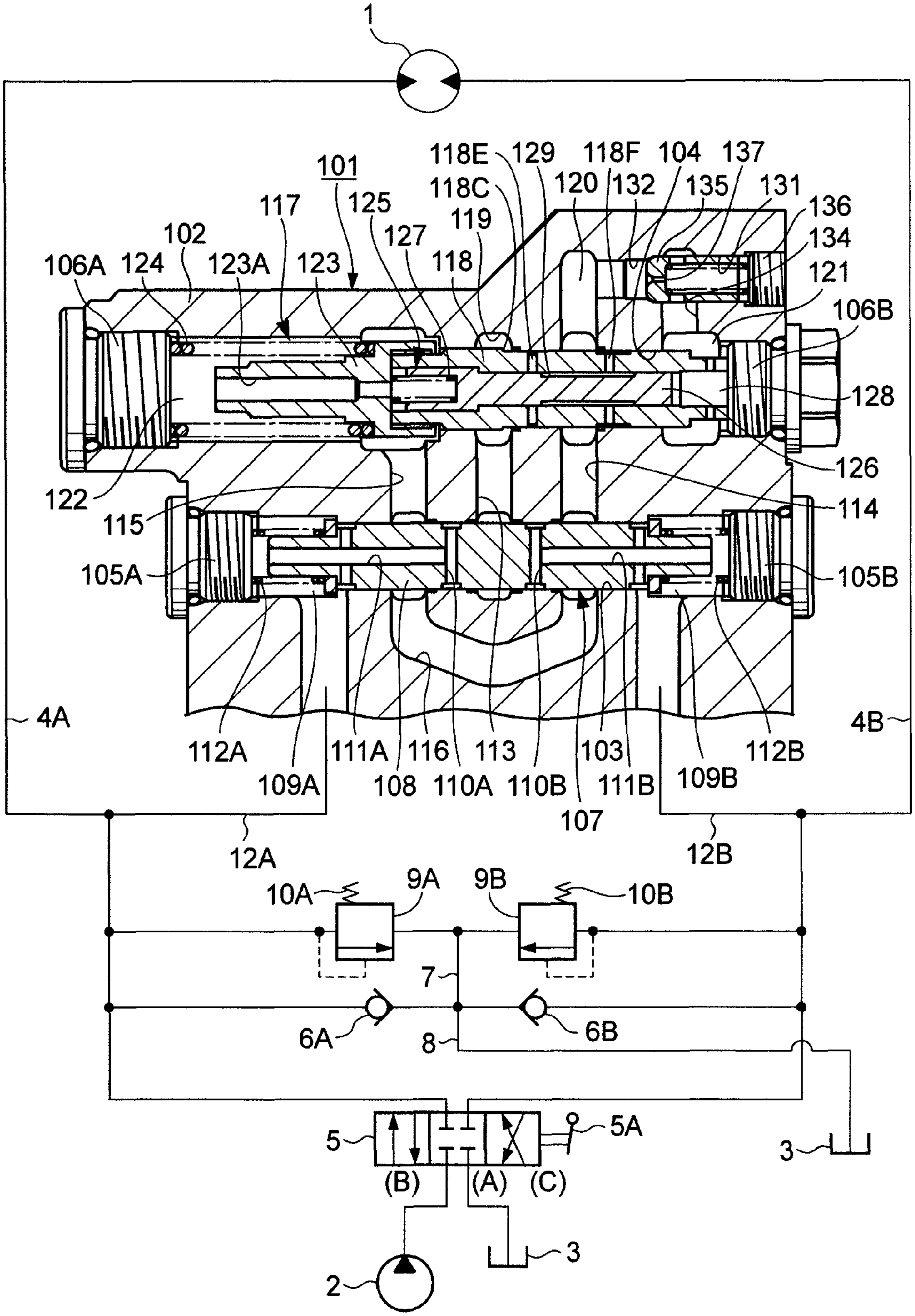
FIG. 21 is a hydraulic circuit diagram showing general construction of an inertial body anti-reversing valve adopted in a fifth embodiment of the invention.

Namely, the inertial body anti-reversing valve 101 is composed of a pressure selector valve 107, a cylinder device 117 and a spool valve device 125 which are built into the common casing 102. As shown in FIG. 21, check valves 6A and 6B and overload relief valves 9A and 9B are also incorporated into the casing 102.

Figure 22:
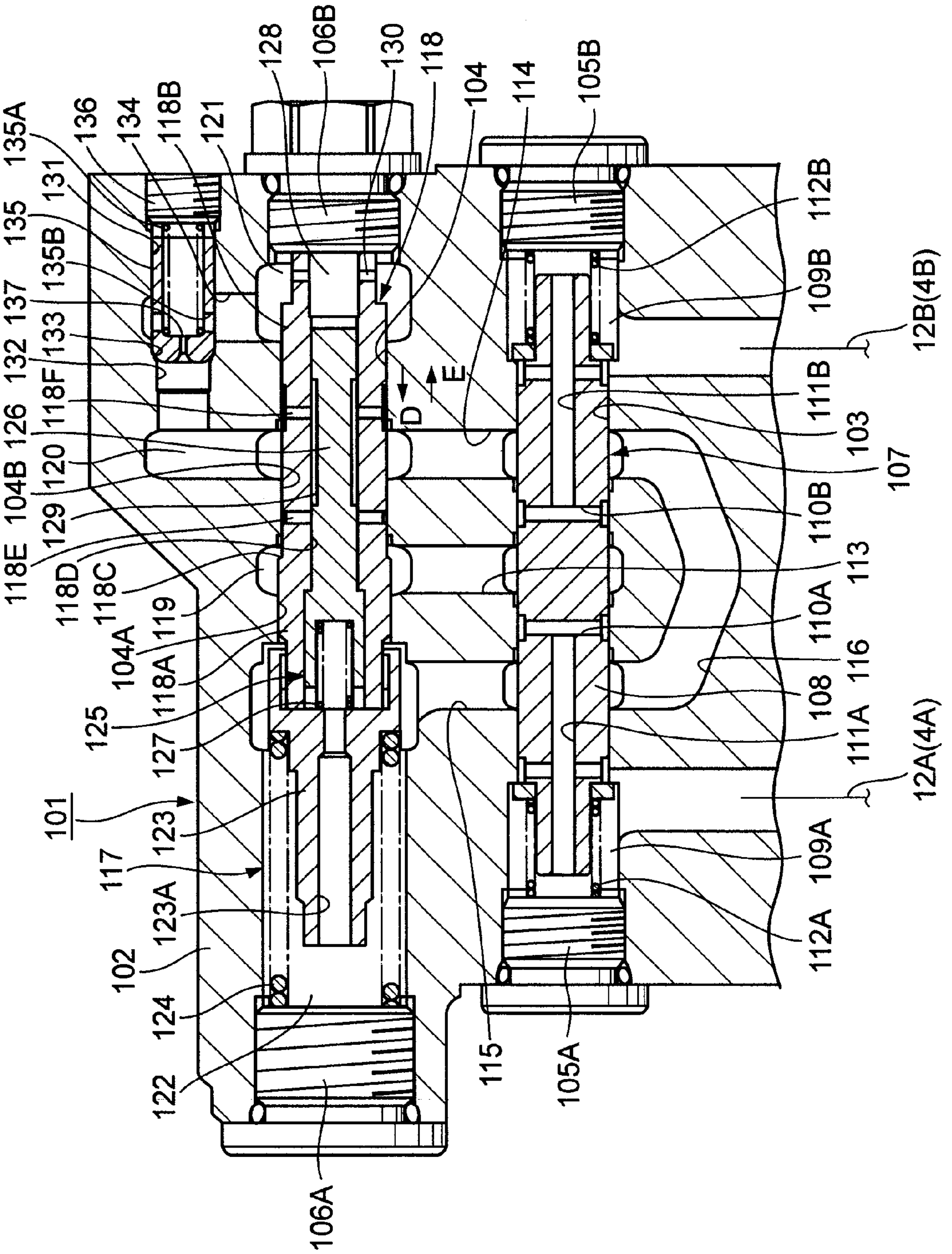
FIG. 22 is a sectional view showing essential parts in FIG. 21 on an enlarged scale.

In this instance, as shown in FIGS. 21 and 22, within the casing 102, a valve sliding bore 103 and a piston sliding bore 104 are formed to extend in leftward and rightward directions (in axial directions) and in parallel relation with each other. The valve sliding bore 103 and piston sliding bore 104 are radially communicated with each other by way of a high pressure conduit 113 and a low pressure conduit 114, which will be described hereinafter.

Figure 26:
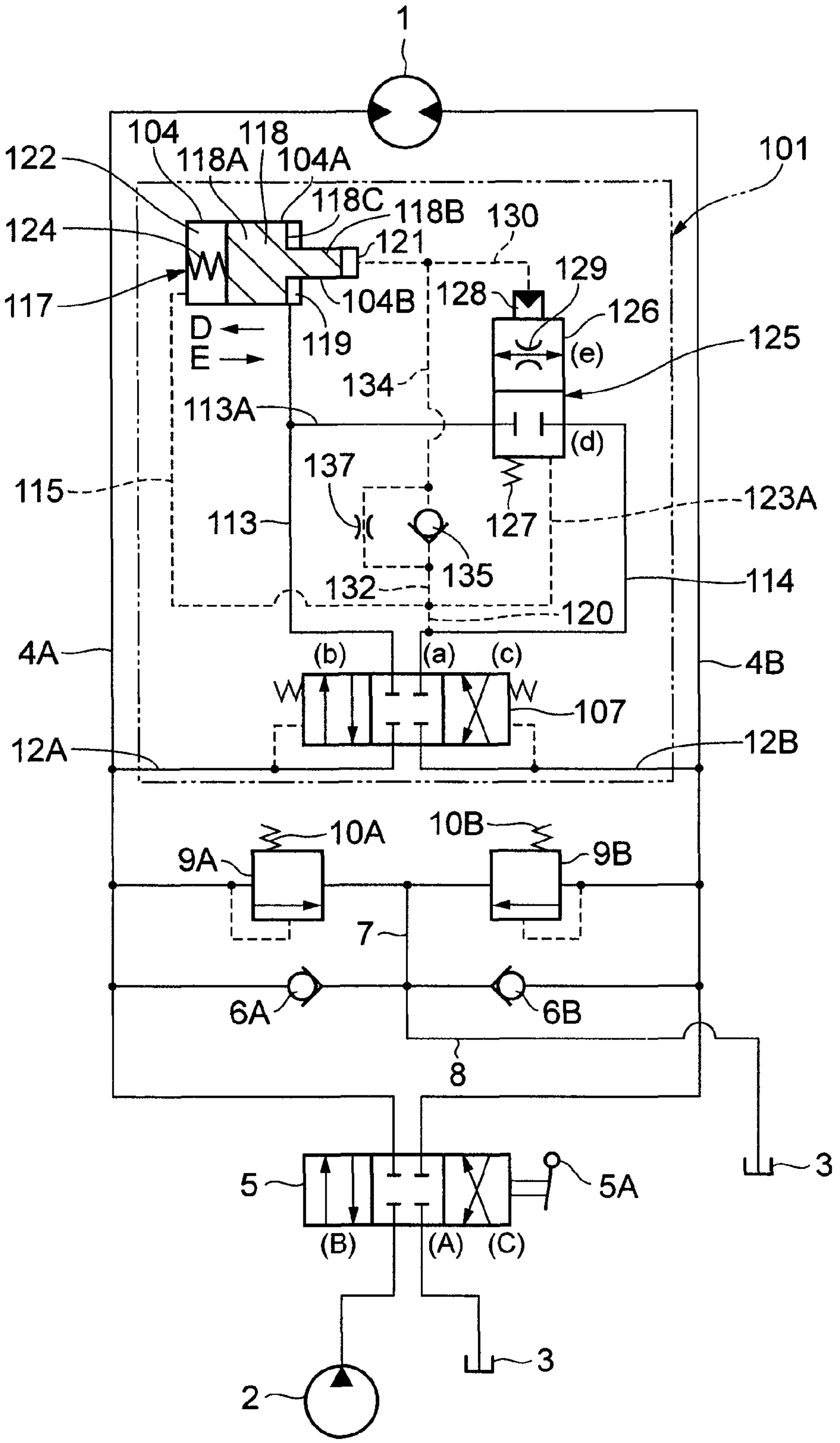
FIG. 26 is a hydraulic circuit diagram corresponding to FIG. 21, showing an inertial body anti-reversing valve adopted in a fifth embodiment of the invention.
Figure 27:
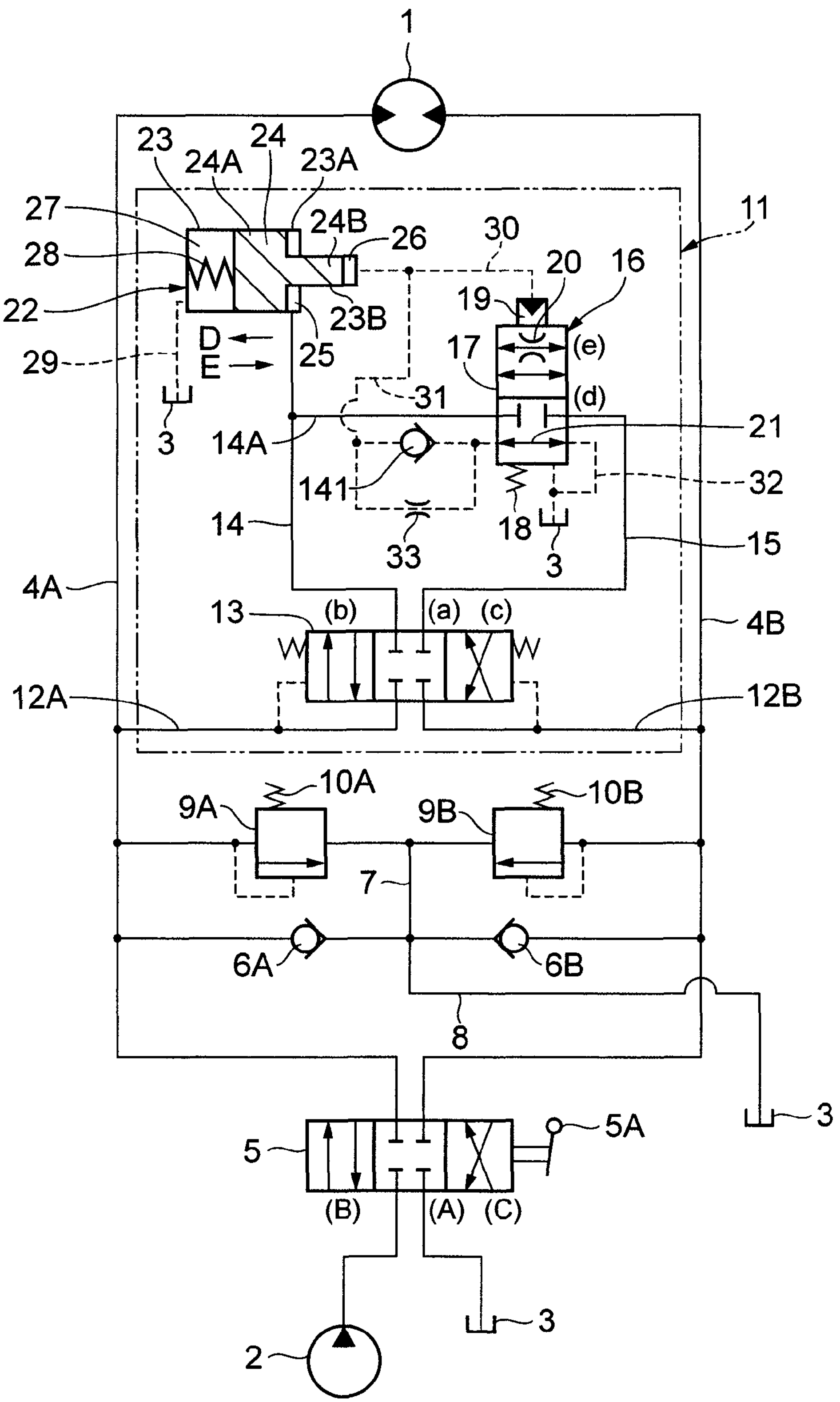
FIG. 27 is a hydraulic circuit diagram showing an inertial body anti-reversing valve in a first modification of the invention.
Figure 28:
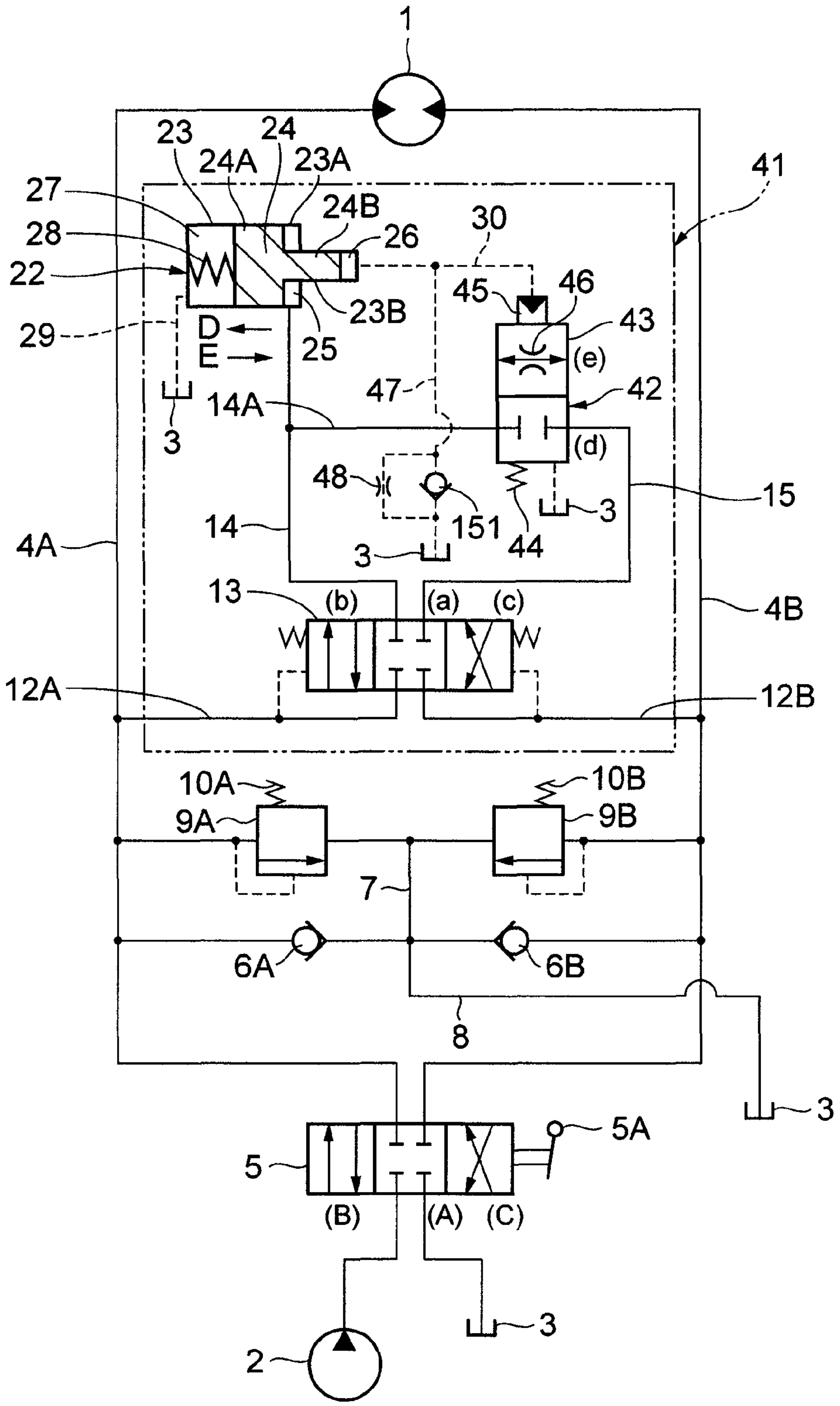
FIG. 28 is a hydraulic circuit diagram showing an inertial body anti-reversing valve in a second modification of the invention.

Opposite axial ends of the valve sliding bore 103 of the casing 102 are closed with closure members 105A and 105B, respectively, while opposite axial ends of the piston sliding bore 104 are closed with closure members 106A and 106B, respectively. As shown in FIGS. 22 and 26, the piston sliding bore 104 is in the form of a stepped bore having a large diameter bore portion 104A and a small diameter bore portion 104B corresponding to the large diameter cylinder portion and the small diameter cylinder portion, respectively.

The pressure selector valve 107 which is adopted in the fifth embodiment as a pressure selector means is constructed in the manner as follows.

Similarly to the pressure selector valve 67 in the fourth embodiment, the pressure selector valve 107 is constructed as a hydraulically piloted directional control valve. Namely, as shown in FIGS. 21 and 26, the pressure selector valve 107 is located between hydraulic motor 1 and directional control valve 5 and connected between main conduits 4A and 4B through bypass conduits 12A and 12B. According to a pressure difference between the main conduits 4A and 4B, the pressure selector valve 107 is switched to a left or right changeover position (b) or (c) from a neutral position (a).

In this instance, the pressure selector valve 107 is formed by fitting a spool valve 108 in the valve sliding bore 103 in the casing 102, defining a pair of left and right oil chambers 109A and 109B between the opposite ends of the spool valve 108 and the closure members 105A and 105B. Of these oil chambers 109A and 109B, one oil chamber 109A is communicated with one main conduit 4A through the bypass conduit 12A, while the other oil chamber 109B is communicated with the other main conduit 4B through the bypass conduit 12B.

Further, the spool valve 108 of the pressure selector valve 107 is provided with a pair of radial passage holes 110A and 110B in spaced positions in an intermediate portion in the axial direction (in a lateral direction in FIG. 22), along with axial passage holes 111A and 111B which are extended toward the opposite axial ends of the spool valve 108 from the radial passage holes 110A and 110B, respectively. One axial passage hole 111A is constantly communicated with one oil chamber 109A, while the other axial passage hole 111B is constantly communicated with the other oil chamber 109B.

Further, springs 112A and 112B are provided in the oil chambers 109A and 109B between the opposite axial ends of the spool valve 108 and the closure members 105A and 105B, respectively. By these springs 112A and 112B, the spool valve 108 is biased in rightward and leftward directions to return the pressure selector valve 107 to a neutral position (a) shown in FIG. 26.

Figure 23:
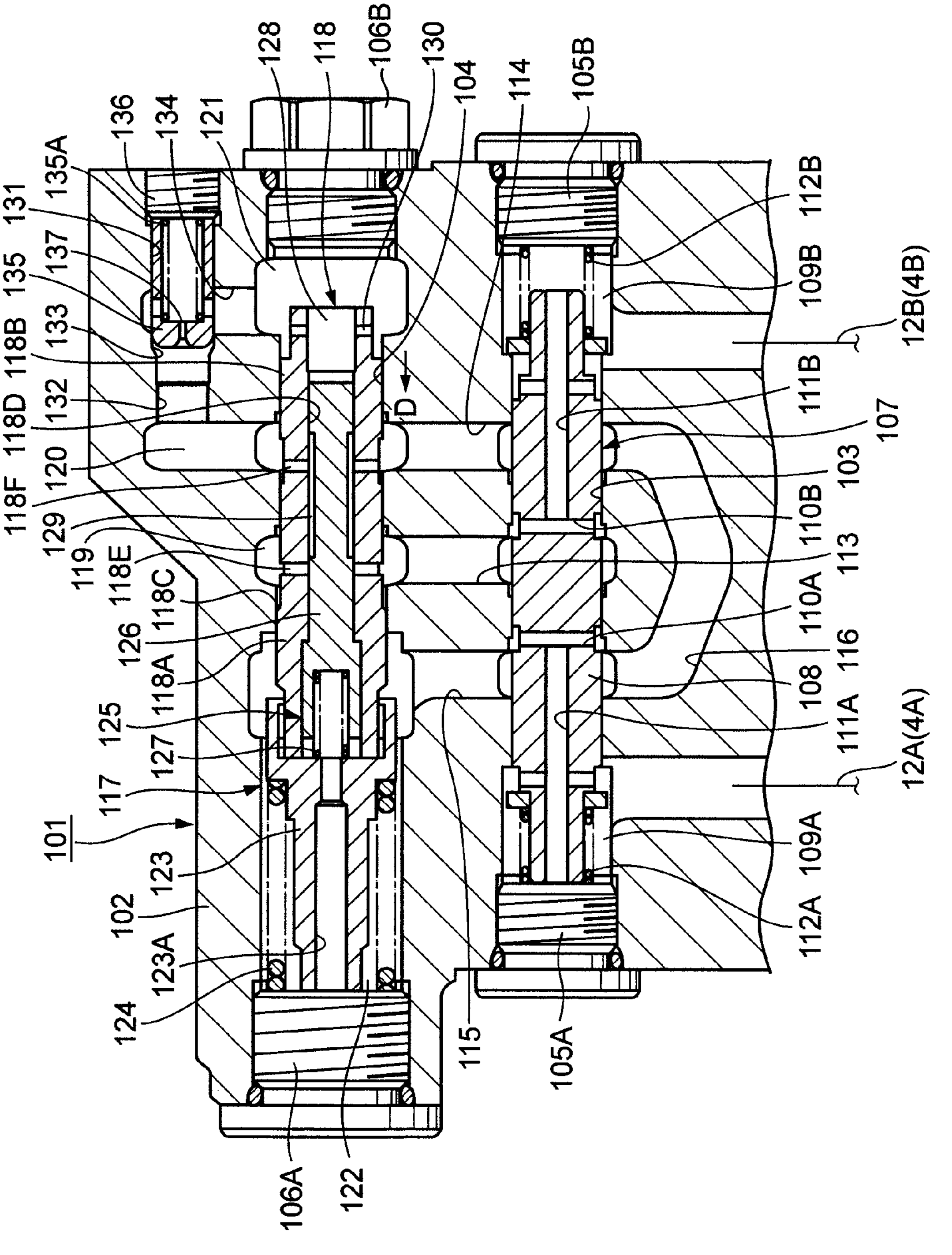
FIG. 23 is a sectional view showing an operational phase in which oil is sucked into an oil reservoir chamber by a piston which has been displaced as far as its stroke end by inertial rotation of the hydraulic motor.

Indicated at 113 is a high pressure conduit which is communicated with a main conduit on a high pressure side by way of the pressure selector valve 107. As shown in FIG. 22, one end of the high pressure conduit 113 is connected (opened) to the valve sliding bore 103 at an axially median position (between the axial passage holes 111A and 111B) of the valve sliding bore 103, while the other end is connected to a pilot oil chamber 119 of a cylinder device 117, which will be described hereinafter. As the spool valve 108 is put in an axial sliding displacement as shown in FIG. 23, the high pressure conduit 113 is brought into communication with one of the radial passage holes 110A and 110B (e.g., with the radial passage hole 110B). As a consequence, the high pressure conduit 113 is communicated with a main conduit on a high pressure side (e.g., with the main conduit 4B) through the axial passage hole 111B.

Namely, when the pressure selector valve 107 is switched to either one of the changeover positions (b) and (c) shown in FIG. 26, the high pressure conduit 113 is brought into communication with one of the main conduits 4A and 4B whichever is on a high pressure side to draw pressurized oil into the high pressure conduit 113 from the high pressure side. On the other hand, as soon as the pressure selector valve 107 is returned to the neutral position (a), the high pressure conduit 113 is blocked against communication with both of the main conduits 4A and 4B. Further, as shown in FIG. 26, a branch passage 113A, which is branched off the high pressure conduit 113, is brought into and out of communication with the low pressure conduit 114 through a spool valve device 125, which will be described hereinafter.

Denoted at 114 is a low pressure conduit which is communicated with a main conduit on a low pressure side through the pressure selector valve 107. As shown in FIGS. 21 and 22, the low pressure conduit 114 is spaced from the high pressure conduit 113 in a rightward direction. One end of the low pressure conduit 114 on the side of the piston sliding bore 104 is communicated with a low pressure chamber 120, which will be described hereinafter, while the other end on the side of the valve sliding bore 103 is communicated with a bypass passage 116, which will also be described later on.

In this instance, when the spool valve 108 is put in an axial sliding displacement as shown in FIG. 23, the low pressure conduit 114 is brought into communication with one of the radial passage holes 110A and 110B (e.g., with the radial passage hole 110A) through a bypass passage 116, which will be described hereinafter. As a result, the low pressure conduit 114 is communicated with the main conduit (e.g., with the main conduit 4A) on a low pressure side through the axial passage hole 111A. As soon as a spool 126, which will be described hereinafter, is put in a sliding displacement to the position of FIG. 24, the low pressure conduit 114 permits pressurized oil in the high pressure conduit 113 to circulate toward the bypass passage 116 and a main conduit on a low pressure side (e.g., the main conduit 4A) through a pilot oil chamber 119, annular groove 129 and low pressure chamber 120, which will be described hereinafter.

Namely, when the pressure selector valve 107 is switched to either one of the changeover positions (b) and (c) from the neutral position (a) shown in FIG. 26, the low pressure conduit 114 is communicated with one of the main conduits 4A and 4B whichever is on a low pressure side and maintained at a low pressure level akin to the tank pressure. In this state, as a spool valve 125, which will be described hereinafter, is switched to an open position (e) from a closed position (d) shown in FIG. 26, the low pressure conduit 114 permits pressurized oil in the high pressure conduit 113 to circulate toward the low pressure conduit 114 and a main conduit on a low pressure side (e.g., the main conduit 4A) through the branch passage 113A.

Further, by the biasing actions of the springs 112A and 112B, the spool valve 108 of the pressure selector valve 107 is returned to the position shown in FIGS. 21 and 22. As soon as the pressure selector valve 107 is returned to the neutral position (a) shown in FIG. 26, the low pressure conduit 114 is blocked against communication with both of the main conduits 4A and 4B, and also blocked against communication with the high pressure conduit 113.

Indicated at 115 is a spring chamber passage which is provided at an opposite side of the low pressure conduit 114, across the high pressure conduit 113. As shown in FIGS. 21 and 22, the spring chamber passage 115 is spaced from the high pressure conduit 113 in a leftward direction. One end of the spring chamber passage 115 is communicated with a spring chamber 122, while the other end on the side of the valve sliding bore 103 is communicated with a bypass passage 116, which is described below.

Denoted at 116 is a bypass passage which communicates the low pressure conduit 114 with the spring chamber passage 115. The low pressure conduit 114 is constantly communicated with the spring chamber passage 115 by way of the bypass passage 116 which is routed around the circumference of the valve sliding bore 103 to bypass the high pressure conduit 113.

Now, described below is a cylinder device 117 which is adopted in the fifth embodiment as a pressurized oil supply means.

The cylinder device 117 is built of a stepped piston 118 which is fitted in the piston sliding bore 104 of the casing 102. Substantially in the same way as the cylinder device 77 in the fourth embodiment, the cylinder device 117 is constituted by the piston 118 which is slidably fitted in the piston sliding bore 104, pilot oil chamber 119, oil reservoir chamber 121, spring chamber 122 and pressure setting spring 124, which will be described hereinafter.

Here, as shown in FIG. 22, the piston 118 is formed as a spool valve of a stepped tubular shape, and provided with a large diameter portion 118A, which is fitted in a large diameter bore portion 104A of the piston sliding bore 104, and a small diameter portion 118B which is fitted in a small diameter bore portion 104B of the piston sliding bore 104. In this case, the large diameter portion 118A has an outside diameter which is, for example, 0.2 mm to 0.4 mm larger than that of the small diameter portion 118B.

Provided on the outer periphery of the piston 118 is an annular stepped portion 118C at a position between the large and small diameter portions 118A and 118B. This stepped portion 118C is formed by an annular stepped wall, for example, of approximately 0.1 mm to 0.2 mm in height. Further, a spool sliding bore 118D in the shape of a stepped bore is formed internally of the piston 118 for a spool 126, which will be described hereinafter. On the other hand, a pair of radial oil passage holes 118E and 118F is formed across the small diameter portion 118B of the piston 118 at axially spaced positions.

In this instance, the piston 118 is put in an axial displacement within the piston sliding bore 104 against the action of the pressure setting spring 124 when a pressure is applied to the annular stepped portion 118C from a pilot oil chamber 119, which will be described hereinafter. At this time, the oil passage hole 118E which is located closer to the stepped portion 118C is brought into and out of communication with the pilot oil chamber 119. On the other hand, the other oil passage hole 118F is brought into and out of communication with a low pressure chamber 120, which will be described later on.

By axial sliding displacements of the piston 118 between the initial position of FIG. 22 and a stroke end position shown in FIG. 23, the cylinder device 117 supplies pressurized oil to and discharges from an oil pressure chamber 128 of a spool valve device 125, which will be described hereinafter, thereby controls opening and closing the spool valve device 125.

Indicated at 119 is a pilot oil chamber which forms a hydraulic pilot portion of the cylinder device 117 (a pressurized oil supply means). This pilot oil chamber 119 is in the form of an annular groove which is formed in and around an inner peripheral wall of the piston sliding bore 104 in such a way as to circumvent the stepped portion 118C of the piston 118 from outside in the radial direction as an annular oil chamber.

In this instance, as shown in FIG. 22, the pilot oil chamber 119 is constantly communicated with the high pressure conduit 113. Accordingly, pressurized oil (a pilot pressure) is supplied to the pilot oil chamber 119 from the high pressure conduit 113 thereby to put the piston 118 in a sliding displacement within the piston sliding bore 104 against a pressure setting spring 124, which will be described hereinafter.

Denoted at 120 is a low pressure chamber which is formed around the piston sliding bore 104 in communication with the low pressure conduit 114. Similarly to the pilot oil chamber 119, this low pressure chamber 120 is in the form of an annular groove which is formed in and around an inner peripheral wall of the piston sliding bore 104. The low pressure chamber 120 is constantly communicated with the low pressure conduit 114, and at the same time constantly communicated with a spring chamber 122, which will be described hereinafter, through the bypass passage 116 and spring chamber passage 115.

Figure 24:
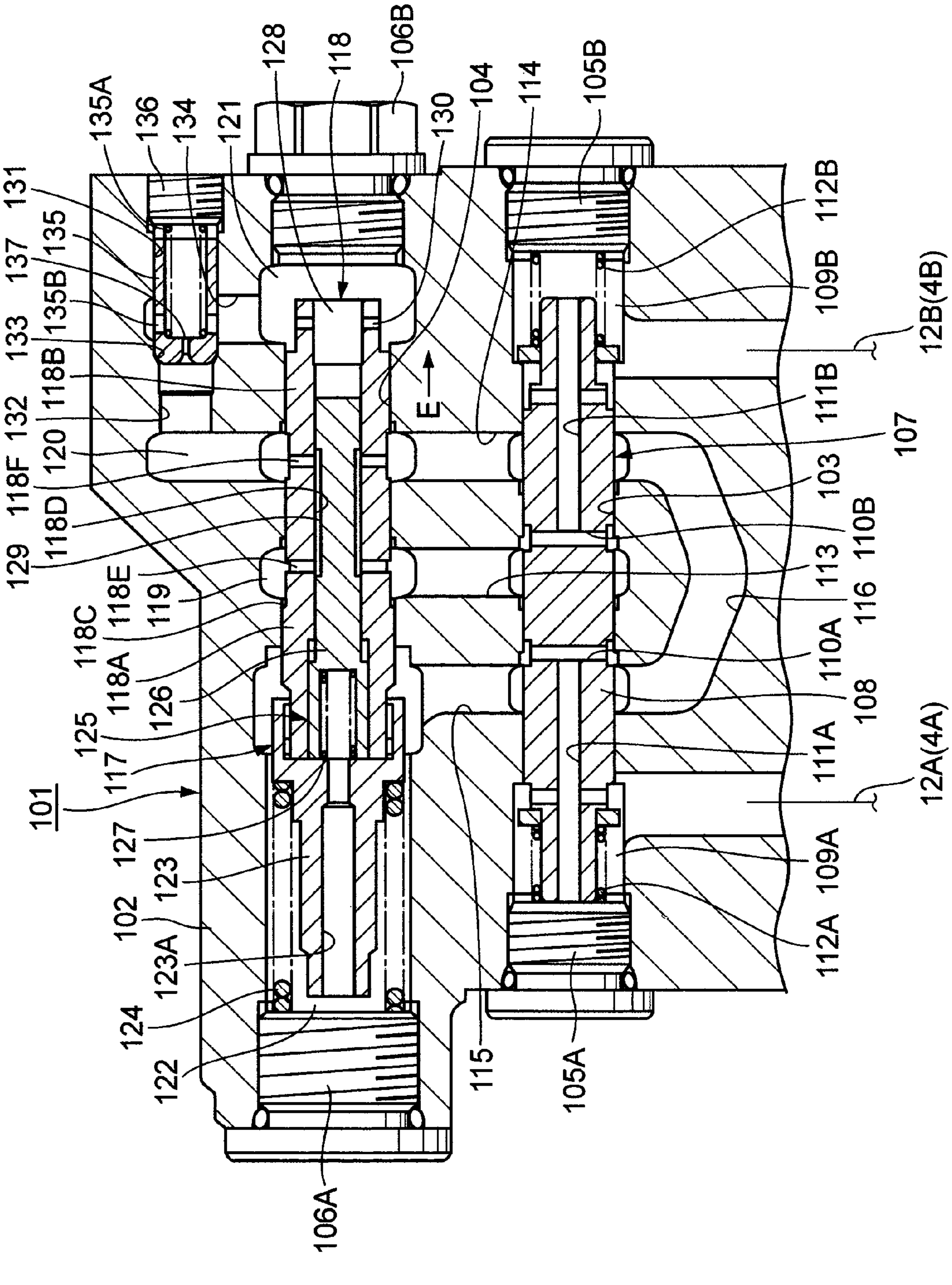
FIG. 24 is a sectional view showing an operational phase in which, in order to stop inertial rotation, a high pressure conduit and a low pressure conduit are brought into communication with each other by a sliding displacement of a spool within a piston under the influence of influent operating oil from the oil reservoir chamber.

As shown in FIG. 22, the low pressure chamber 120 is also communicated with the oil reservoir chamber 121 through intake/discharge passages 132 and 134, check valve 135 and throttle 137, which will be described later on. When the piston 118 and a spool 126, which will be described hereinafter, are put in sliding displacements as shown in FIG. 24, the low pressure chamber 120 is brought into communication with the pilot oil chamber 119 through the oil passage holes 118E and 118F in the piston 118 and an annular groove 129, which will be described hereinafter. At this time, the high pressure conduit 113 and the low pressure conduit 114 are temporarily brought into communication with each other.

Indicated at 121 is an oil reservoir chamber which is formed at an axial end of the piston sliding bore 104, between the small diameter portion 118B of the piston 118 and the closure member 106B. When the piston 118 is put in an axial sliding displacement (in the direction of arrow D or E) within the piston sliding bore 104, the volumetric capacity (the oil storage capacity) of this oil reservoir chamber 121 is varied in step with the axial displacement of the piston 118.

Namely, as the piston 118 is put in a displacement in the direction of arrow D within the piston sliding bore 104, the oil reservoir chamber 121 takes operating oil thereinto from the side of the low pressure chamber 120 (including the low pressure conduit 114, bypass passage 116, spring chamber passage 115 and spring chamber 122, which will be described later) through a check valve 135. Then, as the piston 118 is put in a displacement in the direction of arrow E, operating oil in the oil reservoir chamber 121 is pressurized and supplied to an oil pressure chamber 128 of the spool valve device 125, which will be described hereinafter.

Indicated at 122 is a spring chamber which is provided at the opposite axial end of the oil reservoir chamber 121, across the piston 118. This spring chamber 122 is formed as a cylindrical space of a large volumetric capacity on the side of the large diameter bore portion 104A of the piston sliding bore 104, between the large diameter portion 118A of the piston 118 and the closure member 106A. The spring chamber 122 is a low pressure reservoir and filled with low pressure operating oil.

Namely, the spring chamber 122 is constantly in communication with the low pressure conduit 114 through the spring chamber passage 115 and the bypass passage 116. The spring chamber 122 is also communicated with the oil reservoir chamber 121 and oil pressure chamber 128 through first and second intake/discharge passages 132 and 134, check valve 135 and throttle 137.

Indicated at 123 is a movable spring seat which is located within the spring chamber 122. As shown in FIGS. 21 through 25, the movable spring seat 123 is fixedly attached to an end of the piston 118 (to the large diameter portion 118A), for example, threaded engagement with the latter, and displaceable together with the piston 118 within the piston sliding bore 104. A communication passage hole 123A is bored axially through the entire length of the movable spring seat 123. By way of the communication passage hole 123A, the spring chamber 122 is in constant communication with an internal space of a valve spring 127 of a spool 126, which will be described hereinafter.

Denoted at 124 is a pressure setting spring which is placed in the spring chamber 122 along with the movable spring seat 123. Similarly to the pressure setting spring 28 in the first embodiment, this pressure setting spring 24 is adjusted to the second pressure value Pd (see FIG. 7) thereby to constantly bias the piston 118 toward the oil reservoir chamber 121.

Now, following is a description on a spool valve device 125 which is applied as a valve means in the fifth embodiment.

The spool valve device 125 is built by a spool 126 which is fitted in the spool sliding bore 118D in the piston 118. The spool valve device 125 is arranged substantially in the same way as the spool valve device 16 in the first embodiment, bringing the high pressure conduit 113 and the low pressure conduit 114 into and out of communication with each other through an annular groove 129, which will be described hereinafter.

In this instance, the spool valve device 125 is constituted by a spool 126 which is fitted in a spool sliding bore 118D in the piston 118, a valve spring 127 located within the spool sliding bore 118D in the piston 118 and interposed between the spool 126 and the movable spring seat 123 as a biasing means to bias the spool 126 in the direction of arrow E in FIG. 22 (in the rightward direction), and an oil pressure chamber 128 defined between the spool sliding bore 118D of the piston 118 and an end face of the spool 126 to put the spool 126 in a sliding displacement in the direction of arrow D (in the leftward direction) against the action of the valve spring 127.

Figure 25:
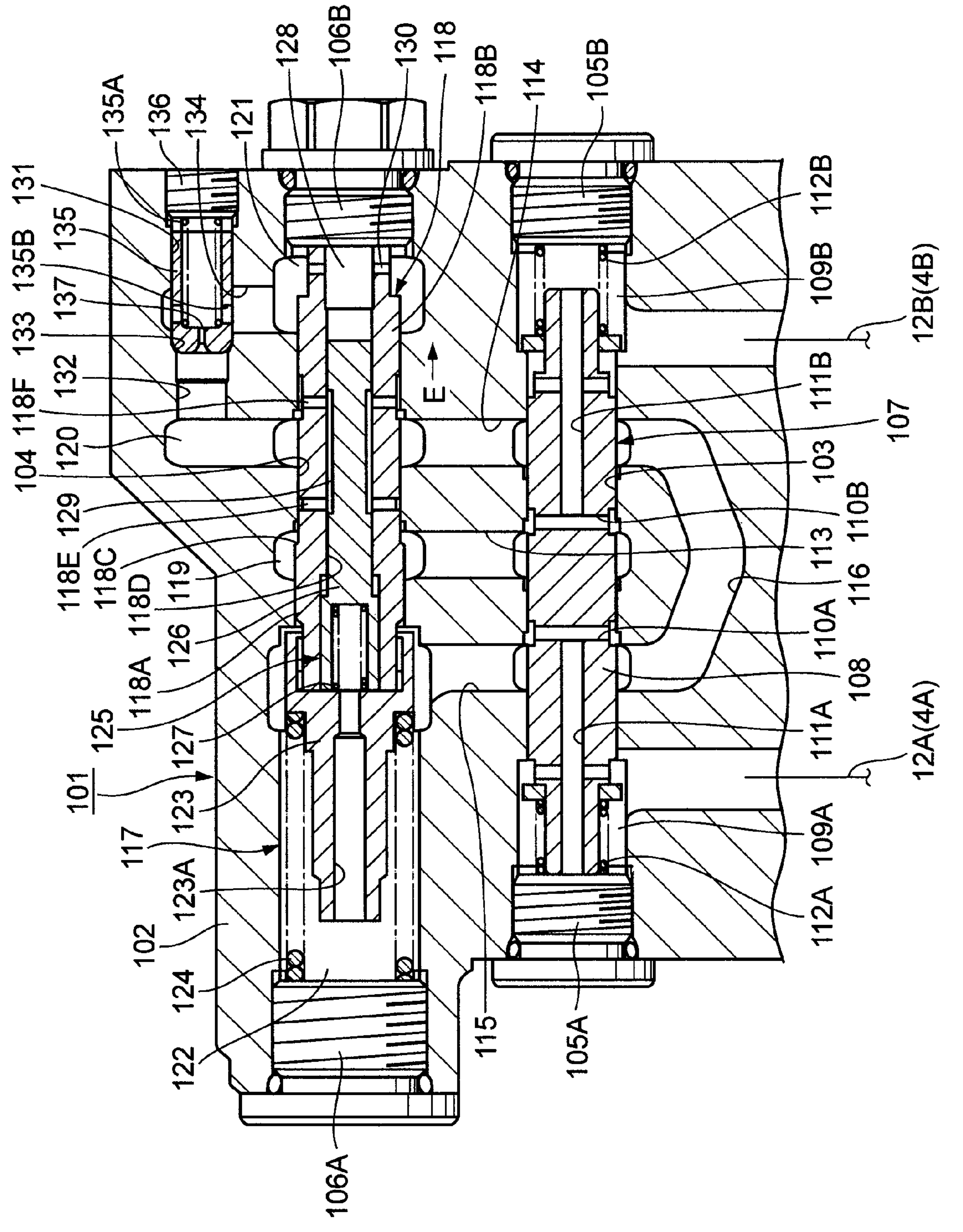
FIG. 25 is a sectional view showing an operational phase in which a piston is pushed back toward the oil reservoir chamber prior to stoppage of inertial rotation.

Formed on the outer peripheral side of the spool 126 is an annular groove 129 which is extended axially between the oil passage holes 118E and 118F of the piston 118. When the piston 118 and the spool 126 are put in relative axial sliding displacements as shown in FIGS. 23 to 25, the pilot oil chamber 119 and the low pressure chamber 120 are brought into and out of communication with each other by this annular groove 129 through the oil passage holes 118E and 118F.

Namely, these oil passage holes 118E and 118F and annular groove 129 have substantially the same functions as the throttle passage 20 in the first embodiment. As the spool 126 is put in a sliding displacement in the axial direction, the spool valve device 125 is switched to either the closed position (d) shown in FIG. 26 or the open position (e). In the open position (e), the branch passage 113A of the high pressure conduit 113 is communicated with the low pressure conduit 114 through the annular groove 129.

Indicated at 130 is a communication passage hole which communicates the oil pressure chamber 128 of the spool valve device 125 with the oil reservoir chamber 121. As shown in FIG. 22, this communication passage hole 130 is formed by radially boring a right end portion of the small diameter portion 118B of the piston 118 to communicate an oil pressure chamber 128 in the piston 118 constantly with the outer oil reservoir chamber 121.

In this instance, the spool 126 of the spool valve device 125 is put in an axial displacement within the spool sliding bore 118D of the piston 118, for example, by supplying and discharging pressurized oil to and from the oil reservoir chamber 121 and the oil pressure chamber 128 through the communication passage hole 130. At this time, the spool valve device 125 is selectively switched to either the closed position (d) shown in FIG. 26 or the open position (e).

Designated at 131 is a check valve casing bore which is provided in the casing 102. As seen in FIGS. 22 to 25, this check valve casing bore 131 is located in a position radially outward of the piston sliding bore 104, and in the shape of a stepped bore extending toward the low pressure chamber 120, for example, from the right end of the casing 102 (the end on the side of the closure member 106B) of FIG. 22 in parallel relation with the piston sliding bore 104.

Indicated at 132 is a first intake/discharge passage which is extended in the same direction as the check valve casing bore 131 in the casing 102. This first intake/discharge passage 132 is communicated with the low pressure chamber 120. Formed between the first intake/discharge passage 132 and the check valve casing bore 131 is an annular valve seat 133 to be seated on and off by a check valve 135, which will be described hereinafter.

Indicated at 134 is a second intake/discharge passage which is bored in a radial direction of the check valve casing bore 131. By way of this second intake/discharge passage 134, the check valve casing bore 131 is communicated with the oil reservoir chamber 121. That is to say, the oil reservoir chamber 121 is communicable with the low pressure chamber 120 through the check valve casing bore 131, intake/discharge passages 132 and 134 and check valve 135. Thus, the check valve casing bore 131 and the intake/discharge passages 132 and 134 have the same functions as the intake/discharge passage 31 in the first embodiment.

Indicated at 135 is a check valve which is provided in the check valve casing bore 131 of the casing 102. This check valve 135 is placed in the check valve casing bore 131 through the open end of the latter to the side of the valve seat 133. The open end of the check valve casing bore 131 is closed with a plug 136 afterwards. The check valve 135 is biased to seat on the valve seat 133, for example, by the use of a weak biasing spring 135A. Oil passages 135B are bored radially through the peripheral wall of the check valve 135. And, the oil passages 135B are communicated the inside of the check valve 135 constantly with the oil reservoir chamber 121 through the second intake/discharge passage 134.

In this instance, when the piston 118 of the cylinder device 117 is displaced in the direction of arrow D as shown in FIG. 23, developing a negative pressure in the oil reservoir chamber 121, the check valve 135 is opened against the action of the spring 135A to permit operating oil flow into the oil reservoir chamber 121 from the side of the low pressure conduit 114 (the spring chamber 122) through the intake/discharge passages 132 and 134.

On the other hand, when the piston 118 is displaced in the direction of arrow E as shown in FIGS. 24 and 25, pressurizing oil in the oil reservoir chamber 121, the check valve 135 is seated on the valve seat 133 and retained in a closed state. Therefore, pressurized oil in the oil reservoir chamber 121 is discharged to the side of the low pressure conduit 114 (the spring chamber 122) through a throttle 137, which is described below.

Indicated at 137 is a throttle which is provided as a flow resisting means, parallel with the check valve 135. As shown in FIG. 22, this throttle 137 is constituted by an oil passage of a small diameter which is bored centrally through the check valve 135 at a position between the intake/discharge passages 132 and 134. The throttle 137 has the same functions as the throttle 33 in the first embodiment, constantly communicating the intake/discharge passages 132 and 134 with each other across the check valve 135.

Namely, for example, when operating oil in the oil pressure chamber 128 flows out toward the low pressure conduit 114 and the spring chamber 122 from the low pressure chamber 120 through the intake/discharge passages 134 and 132 on the front and rear sides of the check valve 135 in a closed state, the throttle 137 acts to limit the flow rate of the effluent oil by throttling action. This throttling action of the throttle 137 prolongs the time period taken by the spool 126 of the spool valve device 125 in returning from an open state to a closed state.

Being arranged in the manner as described above, the present embodiment, using the spring chamber 122 of the cylinder device 117 as a low pressure reservoir, can produce substantially the same operational effects as the foregoing first to fourth embodiments. Especially, in the case of the present embodiment, in passages which connects the oil reservoir chamber 121 of the cylinder device 117 and the oil pressure chamber 128 of the spool valve device 125 with the low pressure conduit 114 (the spring chamber 122), the check valve 135 is provided in the check valve casing bore 131 which is provided between the intake/discharge passages 132 and 134, and the throttle 137 is provided parallel with the check valve 135.

Therefore, when operating oil in the spring chamber 112 as a reservoir and in the low pressure chamber 120 is sucked into the oil reservoir chamber 121 of the cylinder device 117, for example, the check valve 135 is opened to let operating oil flow smoothly into the oil reservoir chamber 121 from the side of the low pressure conduit 114, preventing the oil sucking action from taking a redundantly long time period, namely, realizing a quick action in sucking operating oil into the oil reservoir chamber 121.

On the other hand, at the time of discharging pressurized oil toward the spring chamber 122 from the oil pressure chamber 128 of the spool valve device 125 and the oil reservoir chamber 121, for example, the check valve 135 is closed to cut off a flow of operating oil through the check valve 135. At this time, pressurized oil in the oil pressure chamber 128 and oil reservoir chamber 121 can be discharged toward the spring chamber 122 slowly through the throttle 137 to prolong the open time period of the spool valve device 125.

In the first embodiment described above, as shown in FIGS. 1 to 5, the throttle 33 is by way of example provided in the course of the intake/discharge passage 31 as a flow resisting means. However, the present invention is not limited to the particular example shown. Alternatively, as in a first modification shown in FIG. 27, a check valve 141 may be provided parallel with the throttle 33 in the course of the intake/discharge passage 131.

In this case, the check valve 141 is opened at the time of sucking operating oil into the oil reservoir chamber 26 of the cylinder device 22 from the tank 3 to let the operating oil flow smoothly toward the oil reservoir chamber 26 from the tank 3 in a short period of time, producing substantially the same operational effects as the check valve 135 in the fifth embodiment.

In the second embodiment described above, as shown in FIG. 8, the throttle 48 is by way of example provided in the course of the intake/discharge passage 47 as a flow resisting means. However, the present invention is not limited to this particular example. Namely, as in a second modification shown in FIG. 28, a check valve 151 may be provided parallel with the throttle 48 in the course of the intake/discharge passage 47.

On the other hand, in the fourth embodiment described above, as shown in FIGS. 10 to 14, the pressure selector valve 67, cylinder device 77 and spool valve device 86 are built into a single common casing 62 to constitute the inertial body anti-reversing valve 61. However, the present invention is not limited to this particular example shown. Namely, various alterations can be made within the scope of the hydraulic circuit shown in FIGS. 15 to 20. For instance, instead of the coaxial disposition, the piston 78 of the cylinder device 77 may be located separately in a spaced position from the spool 87 of the spool valve device 86.

Further, in the fifth embodiment described above, as shown in FIGS. 21 to 25, the pressure selector valve 107, cylinder device 117 and spool valve device 125 are built into a single common casing 102 to constitute the inertial body anti-reversing valve 101. However, needless to say, the present invention is not limited to this particular example shown. It is possible to make various alterations within the scope of the hydraulic circuit shown in FIG. 26. For instance, the piston 118 of the cylinder device 117 may be located separately in a spaced position from the spool 126 of the spool valve device 125.

On the other hand, in the first embodiment described above, as shown in FIGS. 1 to 7, the spool 17 of the spool valve device 16 is by way of example located separately in a spaced position from the piston 24 of the cylinder device 22. However, the present invention is not limited to this particular example. For instance, as in the fourth and fifth embodiments, the spool of the valve means may coaxially incorporated into the piston of the pressurized oil supply means. The same applies to the second and third embodiments.

Further, in the second embodiment described above, as shown in FIG. 8, by way of example the intake/discharge passage 47 is branched off at a midway point of the communication passage 30. However, the present invention is not limited to this particular example. For instance, the intake/discharge passage 47 may be directly connected to the oil reservoir chamber 26 of the cylinder device 22 instead of the communication passage 30. On the other hand, the intake/discharge passage 47 may be directly connected to the oil pressure chamber 45 of the spool valve device 42. These are also applicable to the first, third, fourth and fifth embodiments.

Moreover, in the third embodiment described above, the pressure compensation type flow control valve 52 is provided in the way of the intake/discharge passage 31 shown in FIG. 9 as a flow resisting means. However, the present invention is not limited to this particular example. For instance, a pressure compensation type flow control valve may be provided in the way of the intake/discharge passage 47 shown in FIG. 8 as a flow resisting means. Further, a pressure compensation type flow control valve may be adopted in place of the throttle 93 exemplified in FIG. 15.

The invention claimed is:

1. An inertial body drive system, comprising: a hydraulic pressure source; a hydraulic motor supplied with pressurized oil from said hydraulic pressure source to rotationally drive an inertial body; first and second main conduits connecting said hydraulic motor with said hydraulic pressure source; a directional control valve connected between said main conduits and adapted to open the supply of pressurized oil to said hydraulic motor from said hydraulic pressure source when switched from a neutral position to a changeover position and to stop the supply of pressurized oil to said hydraulic motor when returned to said neutral position; and overload relief valves connected between said main conduits, at a position between said directional control valve and said hydraulic motor to limit a maximum pressure in said main conduits to a first preset pressure value; characterized in that said inertial body drive system comprises:

- a pressure selector means connected between said main conduits, at a position between said directional control valve and said hydraulic motor to connect one of said main conduits, on a high pressure side to a high pressure conduit while connecting the other main conduit on a low pressure side to a low pressure conduit when switched from a neutral position to a changeover position;
- a valve means connected between said high pressure conduit and said low pressure conduit and comprised of a spool to be put in sliding displacement between an open position and a closed position and said spool being constantly biased toward said closed position under a biasing action of a biasing member, and said spool being switched from said closed position to said open position against the biasing action of said biasing member upon pressurization of oil in an oil pressure chamber;
- a pressurized oil supply means comprised of an oil reservoir chamber in communication with said oil pressure chamber of said valve means and adapted to supply pressurized oil in said oil reservoir chamber to said oil pressure chamber of said valve means as soon as a pressure in said high pressure conduit drops below a second pressure value lower than a first pressure value preset by said overload relief valves;
- a passage connecting said oil reservoir chamber of said pressurized oil supply means and said oil pressure chamber of said valve means constantly to a low pressure reservoir; and
- a flow resisting means provided in said passage to throttle a flow of operating oil to be discharged toward said reservoir.

2. An inertial body drive system as defined in claim 1, wherein said pressure selector means is constituted by a pressure selector valve adapted to be switched from a neutral position to one of changeover positions according to a pressure difference between said main conduits, said pressure selector valve blocking said high pressure conduit and said low pressure conduit against communication with said main conduits when returned to said neutral position.

3. An inertial body drive system as defined in claim 1, wherein said hydraulic pressure source includes a tank holding a stock of operating oil, and a hydraulic pump operative to suck up operating oil from said tank and supply pressurized oil, and said reservoir is constituted by said tank.

4. An inertial body drive system as defined in claim 1, wherein, of said passages connected to said reservoir, a passage which is located between said flow resisting means and said reservoir is connected to said low pressure conduit.

5. An inertial body drive system as defined in claim 1, wherein said pressurized oil supply means is composed of a casing forming an outer shell, a piston slidably received in said casing in such a way as to define said oil reservoir chamber by one axial end thereof and a spring chamber by the other axial end thereof, and a pressure setting spring provided in said spring chamber adapted to bias said piston toward said oil reservoir chamber with a spring force corresponding to said second pressure value, and said reservoir is constituted by said spring chamber.

6. An inertial body drive system as defined in claim 5, wherein said piston of said pressurized oil supply means is internally provided with a spool sliding bore to slidably receive therein said spool of said valve means, defining said oil pressure chamber of said valve means in said spool sliding bore at one end of said spool to receive a supply of pressurized oil from said oil reservoir chamber.

7. An inertial body drive system as defined in claim 5, wherein a hydraulic pilot portion is provided between said casing and said piston of said pressurized oil supply means in communication with said high pressure conduit, said piston being put in a sliding displacement against the action of said pressure setting spring to suck operating oil into said oil reservoir chamber from said spring chamber, as soon as a pressure in excess of said second pressure value is supplied to said hydraulic pilot portion from said high pressure conduit.

8. An inertial body drive system as defined in claim 7, wherein said piston is in the form of a stepped tube having an annular stepped portion around an outer periphery thereof, and said hydraulic pilot portion is constituted by an annular pilot oil chamber formed in said casing in such a way as to circumvent said stepped portion of said piston radially from outside.

9. An inertial body drive system as defined in claim 1, wherein said flow resisting means is constituted by a pressure compensation type flow control valve provided in the way of said passage.

10. An inertial body drive system as defined in claim 1, wherein a check valve is connected to said passage parallel with said flow resisting means, permitting a flow of operating oil in the direction toward said oil reservoir chamber from the side of said reservoir and blocking a reverse flow of operating oil.

* * * * *